United States Patent
Yamada et al.

(10) Patent No.: US 11,061,212 B2
(45) Date of Patent: Jul. 13, 2021

(54) ZOOM LENS AND IMAGE PICKUP APPARATUS

(71) Applicant: CANON KABUSHIKI KAISHA, Tokyo (JP)

(72) Inventors: Tomoya Yamada, Utsunomiya (JP); Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 16/507,508

(22) Filed: Jul. 10, 2019

(65) Prior Publication Data
US 2020/0018937 A1 Jan. 16, 2020

(30) Foreign Application Priority Data
Jul. 13, 2018 (JP) .............................. JP2018-133623

(51) Int. Cl.
G02B 15/20 (2006.01)
G02B 27/00 (2006.01)
G02B 13/18 (2006.01)

(52) U.S. Cl.
CPC ........... *G02B 15/20* (2013.01); *G02B 27/005* (2013.01); *G02B 13/18* (2013.01)

(58) Field of Classification Search
CPC ....... G02B 15/20; G02B 27/005; G02B 15/14
USPC .................................................. 359/676, 684
See application file for complete search history.

(56) References Cited

U.S. PATENT DOCUMENTS

| | | | |
|---|---|---|---|
| 9,645,369 B2 | 5/2017 | Takemoto | |
| 9,709,781 B2 | 7/2017 | Takemoto | |
| 9,739,986 B2 | 8/2017 | Wakazono et al. | |
| 9,897,803 B2 | 2/2018 | Sanjo et al. | |
| 9,904,044 B2 | 2/2018 | Kikuchi et al. | |
| 10,095,010 B2 | 10/2018 | Takemoto | |
| 10,168,546 B2 | 1/2019 | Takemoto et al. | |
| 2009/0034091 A1* | 2/2009 | Sakamoto | G02B 15/173 359/687 |
| 2015/0015969 A1* | 1/2015 | Komatsu | G02B 15/167 359/683 |
| 2016/0124199 A1 | 5/2016 | Sanjo et al. | |
| 2018/0045929 A1 | 2/2018 | Takemoto | |
| 2018/0292627 A1 | 10/2018 | Takemoto | |
| 2018/0356617 A1 | 12/2018 | Yamada et al. | |

FOREIGN PATENT DOCUMENTS

JP 2015094868 A 5/2015

* cited by examiner

*Primary Examiner* — James R Greece
(74) *Attorney, Agent, or Firm* — Carter, DeLuca & Farrell LLP

(57) ABSTRACT

A zoom lens includes in order from an object side to an image side, a first lens unit having a positive refractive power; a second lens unit having a negative refractive power and configured to move for zooming; and at least one lens unit configured to move for zooming. The distance between each pair of the lens units adjacent to each other is changed for zooming. The first lens unit includes a negative lens and an Abbe number and a partial dispersion ratio of the negative lens are properly determined.

13 Claims, 22 Drawing Sheets

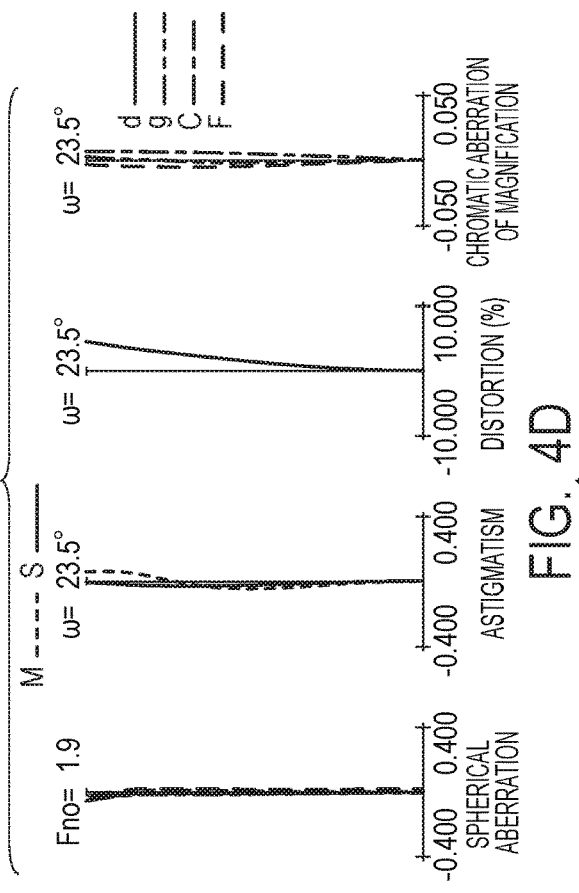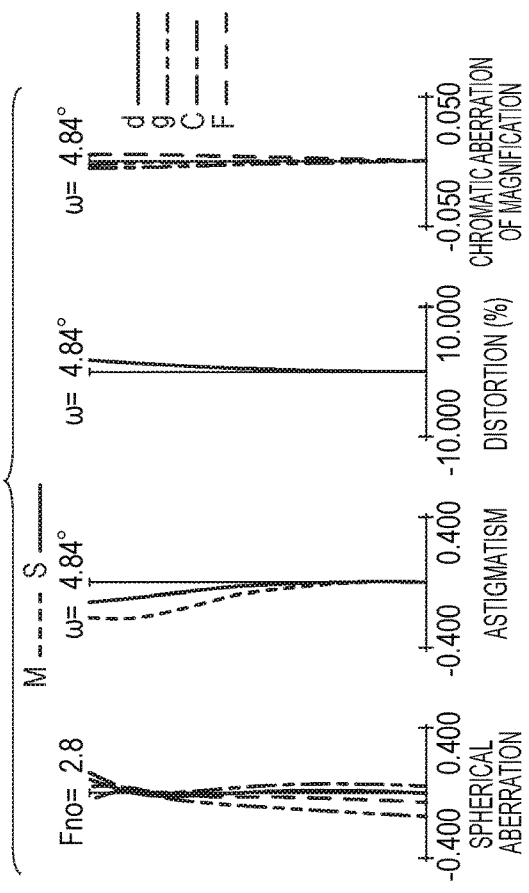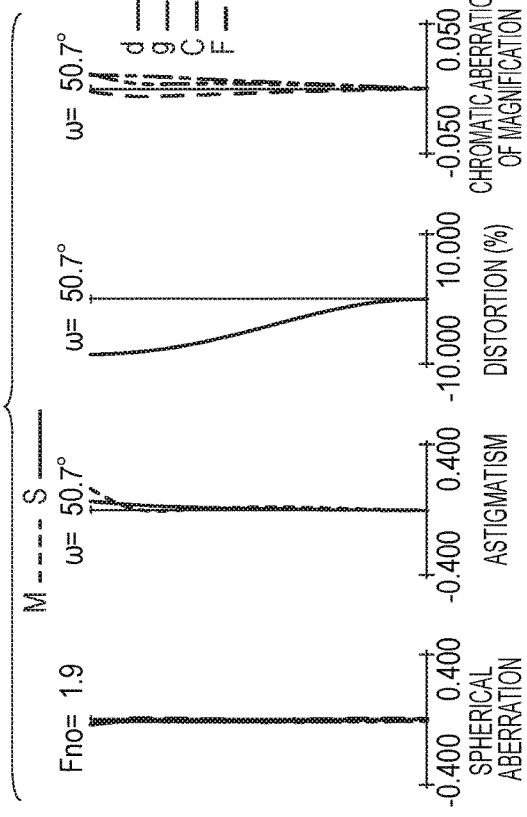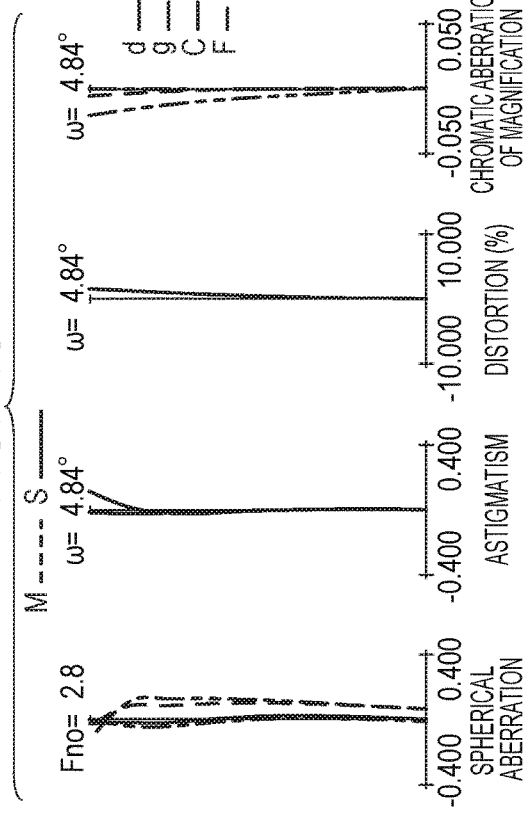

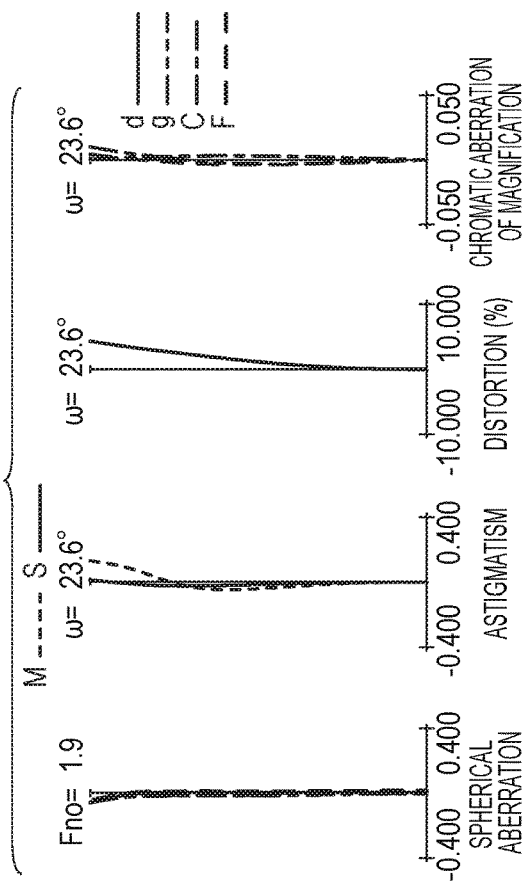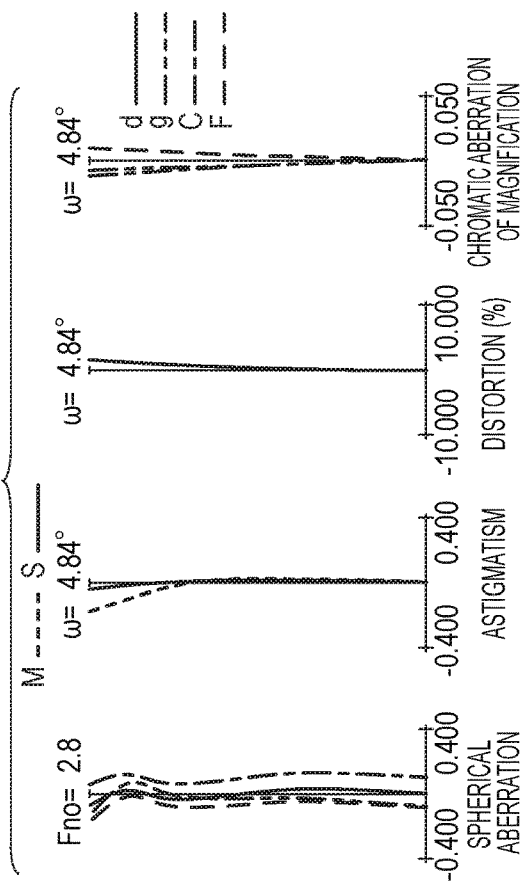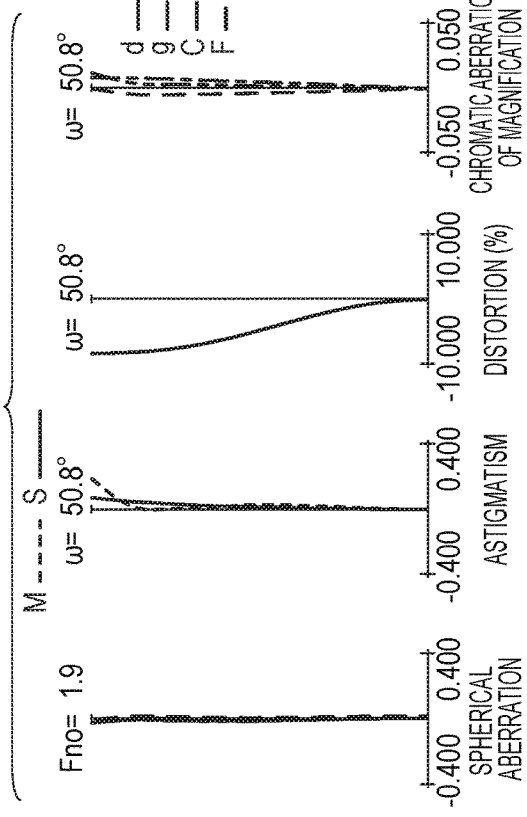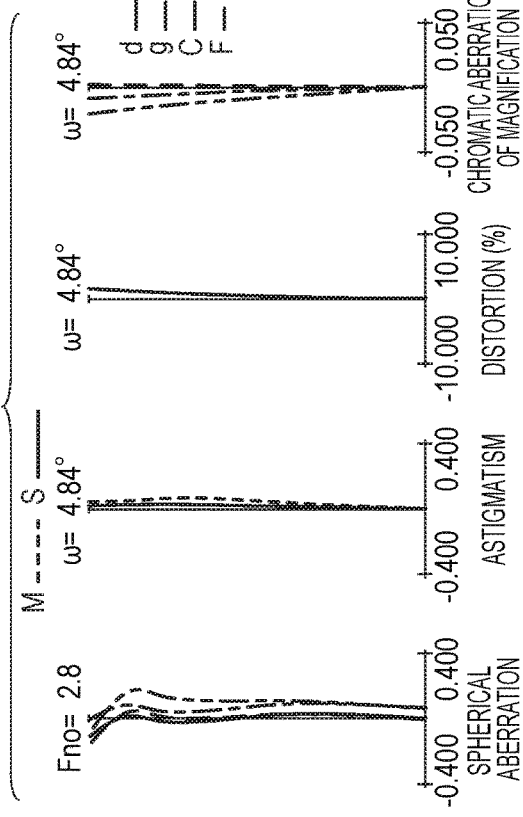

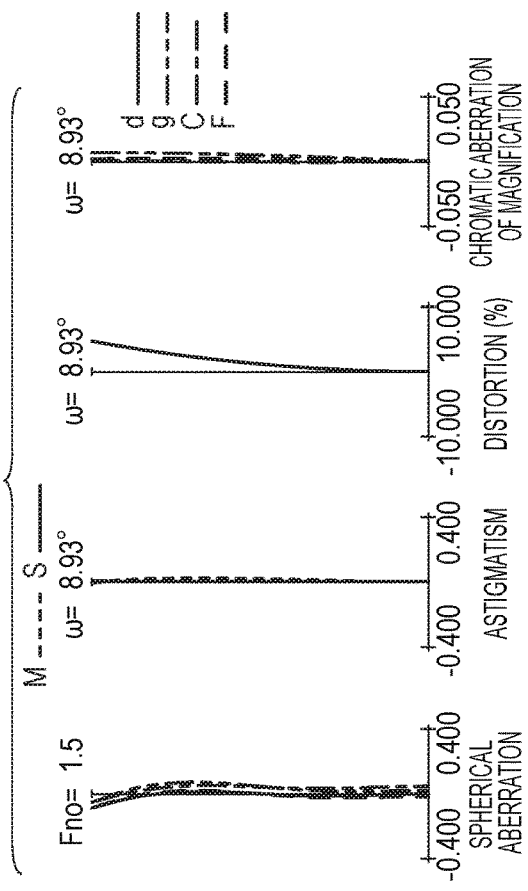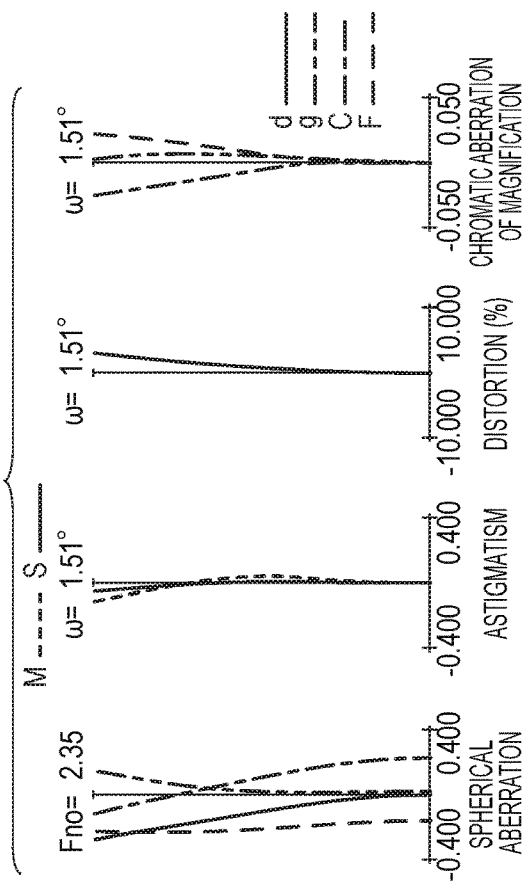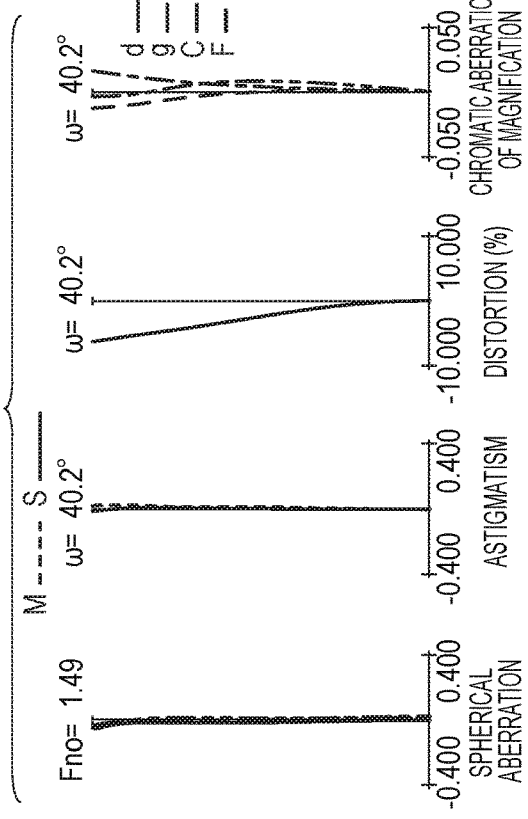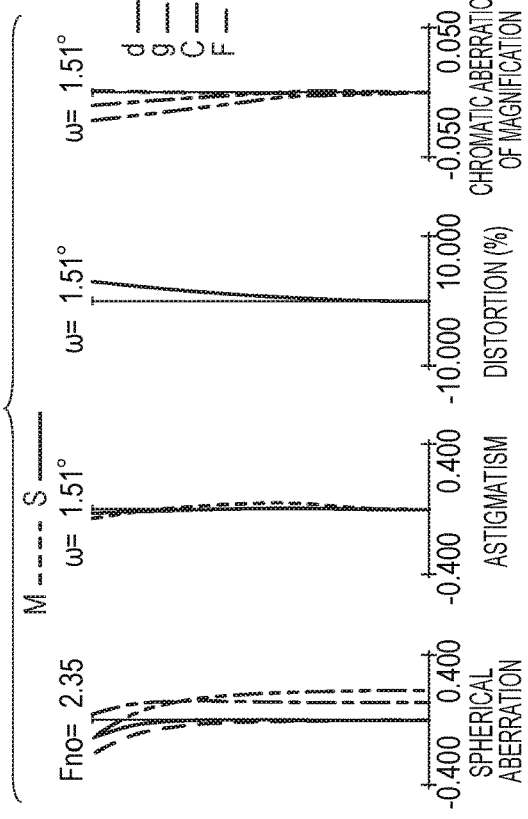

ZOOM LENS AND IMAGE PICKUP APPARATUS

BACKGROUND OF THE INVENTION

Field of the Invention

An aspect of embodiments relates to a zoom lens and an image pickup apparatus.

Description of the Related Art

For sophistication of image pickup apparatuses including image pickup elements, such as still cameras, video cameras, television cameras, cinema cameras, and security cameras, for example, the zoom lenses used therein are required to have a high zoom ratio, a high aperture ratio, and high optical performances. Image pickup devices, such as CCD and CMOS devices, which are used in professional-use television and cinema cameras, in particular, are excellent in uniformity of resolving power over the entire image pickup range. Zoom lenses are therefore required to provide uniform resolving power on the image plane and produce less chromatic aberration.

A so-called positive-lead type zoom lens is known, which includes, in order from the object side to the image side, a lens unit having a positive refractive power, a lens unit having a negative refractive power, and a rear lens unit including at least one lens unit. As the configuration of the rear lens unit, a configuration including at least one lens unit having a negative refractive power and at least one lens unit having a positive refractive power or a configuration including plural lens units having a positive refractive power is known (see Japanese Patent Application Laid-Open No. 2015-94868).

Japanese Patent Application Laid-Open No. 2015-94868 discloses a zoom lens which includes, in order from the object side to the image side, first to fourth lens units of positive, negative, negative, and positive refractive power or first to fourth lens units of positive, negative, positive, and positive refractive power. The zoom lens performs zooming by changing the distance between each pair of adjacent lens units. Such positive-lead type zoom lenses in which the first lens unit has positive refractive power, are advantageous in achieving a high zoom ratio in comparison to so-called negative-lead type zoom lenses in which the first lens unit has negative refractive power.

Positive-lead type zoom lenses perform zooming by moving the second and subsequent lens units to zoom in and out an image formed by the first lens unit. In positive-lead type zoom lenses, aberration caused by the first lens unit is expanded by the subsequent lens units. The configuration of the first lens unit is therefore important for aberration correction.

In order for a zoom lens having a high zoom ratio to provide high optical performances, it is important to correct variation in chromatic aberrations due to zooming. It is especially important to correct chromatic aberration of magnification at the wide-angle end. When the refractive power of a lens unit is increased with a small number of lenses, the lens unit generates large aberrations. For this reason, such a lens unit has difficulty in achieving high optical performances, and accordingly makes it difficult to correct chromatic aberration of magnification at the wide-angle end.

In positive-lead type zoom lenses, aberrations caused by the first lens unit significantly influence the optical performances. Selection of the glass material used in lenses of the first lens unit is therefore the key factor. In order to correct chromatic aberration of magnification successfully, for example, it is effective to use a material having an extraordinary dispersion property to form a negative lens included in the first lens unit. Optical glasses are plotted on a graph of FIG. 22 (hereinafter, referred to as a $\theta gF$-vd diagram) in which the vertical axis indicates partial dispersion ratio $\theta gF$ that becomes higher toward the top while the horizontal axis indicates the Abbe number that becomes larger toward the left. It is known that optical glasses are distributed along a line called a normal line in the $\theta gF$-vd diagram.

Herein, the Abbe number vd and partial dispersion ratio $\theta gF$ are expressed by the following two expressions. Herein, Ng, NF, NC, and Nd are refractive indices of the material corresponding to g-line (wavelength: 435.8 nm), F-line (wavelength: 486.1 nm), C-line (wavelength: 656.3 nm), and d-line (wavelength: 587.6 nm), respectively.

$$vd=(Nd-1)/(NF-NC)$$

$$\theta gF=(Ng-NF)/(NF-NC)$$

As one of known methods to reduce chromatic aberration of magnification among chromatic aberrations, a negative lens located at a position where off-axis rays travel at high positions on the object side of the stop is made of a material having the extraordinary dispersion property. In the $\theta gF$-vd diagram of FIG. 22, materials having the extraordinary dispersion property are plotted in regions away from the normal line.

In a long-focal-length positive-lead type zoom lens, off-axis rays travel at high positions within an effective diameter of the first lens unit at the wide-angle end and are likely to produce the secondary spectrum of chromatic aberration of magnification and variations in chromatic aberration of magnification due to the combination of wavelengths. To correct the secondary spectrum of chromatic aberration of magnification due to the first lens unit, it is effective to form the negative lens of the first lens unit by using a material which is plotted in a region away from the normal line in the direction in which the partial dispersion ratio $\theta gF$ becomes higher in the $\theta gF$-vd diagram.

In Japanese Patent Application Laid-Open No. 2015-94868, the secondary spectrum of chromatic aberration of magnification is corrected by using a glass material of a comparatively low partial dispersion ratio for the negative lens of the first lens unit. However, this approach is not sufficient for recent applications requiring high resolving power, such as HDTVs, in terms of the properties concerning chromatic aberration of magnification at the wide-angle end particularly. Japanese Patent Application Laid-Open No. 2015-94868 is therefore inadequate to provide a zoom lens which is advantageous in terms of wide angle, high zoom ratio, high aperture ratio, and high optical performances.

SUMMARY OF THE INVENTION

An aspect of embodiments provides, for example, a zoom lens beneficial in reduction in a secondary spectrum of chromatic aberration of magnification.

According to an aspect of embodiments, a zoom lens includes in order from an object side to an image side: a first lens unit having a positive refractive power; a second lens unit having a negative refractive power and configured to move for zooming; and at least one lens unit configured to move for zooming. The distance between each pair of the lens units adjacent to each other is changed for zooming. The first lens unit includes a negative lens, and the negative lens is made of a material having an Abbe number νd and a partial dispersion ratio θgF that satisfy conditional expressions $$\theta gF-(-1.665\times10^{-7}\cdot\nu d^3+5.213\times10^{-5}\cdot\nu d^2-5.656\times10^{-3}\cdot\nu d+0.737)>0$$

$$0.5490<\theta gF, \text{ and}$$

$$50.0<\nu d<85.0.$$

The Abbe number νd and the partial dispersion ratio θgF are expressed by $$\nu d=(Nd-1)/(NF-NC), \text{ and}$$

$$\theta gF=(Ng-NF)/(NF-NC),$$

where Ng, NF, NC, and Nd are refractive indices for g-line (435.8 nm), F-line (486.1 nm), C-line (656.3 nm), and d-line (587.6 nm), respectively.

Further features of the present invention will become apparent from the following description of exemplary embodiments with reference to the attached drawings.

BRIEF DESCRIPTION OF THE DRAWINGS

FIG. 4A is an aberration diagram of Embodiment 2 in a state of being focused at infinity at the wide-angle end.

FIG. 4B is an aberration diagram of Embodiment 2 in a state of being focused at infinity at an intermediate zoom position.

FIG. 4C is an aberration diagram of Embodiment 2 in a state of being focused at infinity at the telephoto end.

FIG. 4D is an aberration diagram of Embodiment 2 in a state of being focused at short distance at the telephoto end.

FIG. 10A is an aberration diagram of Embodiment 5 in a state of being focused at infinity at the wide-angle end.

FIG. 10B is an aberration diagram of Embodiment 5 in a state of being focused at infinity at an intermediate zoom position.

FIG. 10C is an aberration diagram of Embodiment 5 in a state of being focused at infinity at the telephoto end.

FIG. 10D is an aberration diagram of Embodiment 5 in a state of being focused at short distance at the telephoto end.

FIG. 18A is an aberration diagram of Embodiment 9 in a state of being focused at infinity at the wide-angle end.

FIG. 18B is an aberration diagram of Embodiment 9 in a state of being focused at infinity at an intermediate zoom position.

FIG. 18C is an aberration diagram of Embodiment 9 in a state of being focused at infinity at the telephoto end.

FIG. 18D is an aberration diagram of Embodiment 9 in a state of being focused at short distance at the telephoto end.

DESCRIPTION OF THE EMBODIMENTS

Hereinafter, a description is given of preferred embodiments of the present invention with reference to the accompanying drawings. A zoom lens according to an embodiment of the present invention includes, in order from the object side to the image side, a first lens unit having a positive refractive power, a second lens unit having a negative refractive power, and a rear lens unit including at least one lens unit. The distance between each pair of lens units adjacent to each other changes during zooming.

The first lens unit includes one or more negative lenses. The material of at least one negative lens G1n included in the first lens unit has an Abbe number vd and a partial dispersion ratio θgF that satisfy the following conditional expressions.

$$\theta gF-(-1.665\times10^{-7}vd^3+5.213\times10^{-5}\cdot vd^2-5.656\times10^{-3}vd+0.737)>0 \quad (1)$$

$$0.5490<\theta gF \quad (2)$$

$$50.0 \leq vd \leq 85.0 \quad (3)$$

Herein, the Abbe number vd and the partial dispersion ratio θgF are expressed by:

$$vd=(Nd-1)/(NF-NC), \text{ and}$$

$$\theta gF=(Ng-NF)/(NF-NC)$$

where Ng, NF, NC, and Nd are refractive indices of the material corresponding to g-line (435.8 nm), F-line (486.1 nm), C-line (656.3 nm), and d-line (587.6 nm), respectively.

The zoom lens of the present invention is used as an image pickup optical system of an image pickup apparatus, such as a video camera, a digital still camera, a television camera, a cinema camera, or a security camera.

In positive-lead type zoom lenses of Embodiments 1, 2 and 4 to 10 of the Disclosure, aberrations caused in a first lens unit L1 is expanded by lateral magnifications of the lens units subsequent to the first lens unit L1 up to the image plane. It is therefore necessary to minimize optical aberrations caused in the first lens unit L1.

In long-focal-length positive-lead type zoom lenses, like Embodiments 1, 2 and 4 to 10, off-axis rays at the wide-angle end in particular, pass through the first lens unit at high positions within the effective diameter of the first lens unit and tend to produce the secondary spectrum of chromatic aberration of magnification and differences in chromatic aberration of magnification between wavelengths.

Figure 22:
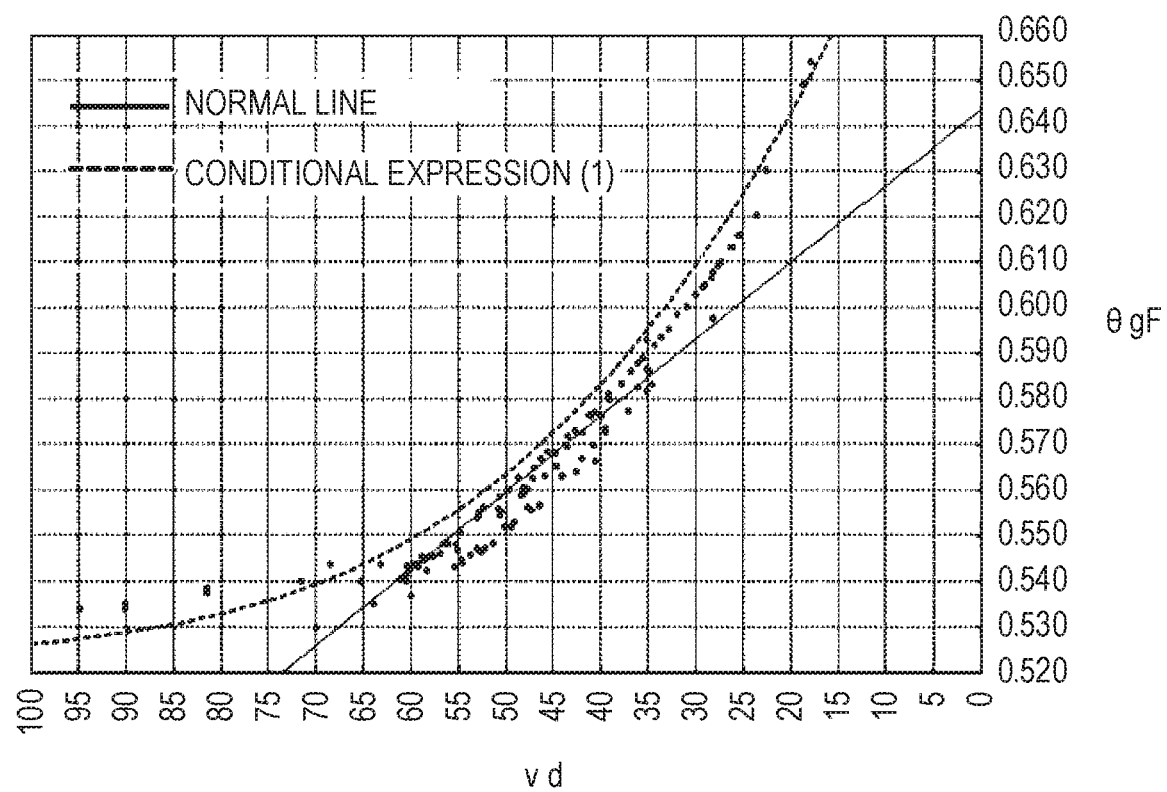
FIG. 22 is a θgF-vd diagram.

In order to minimize chromatic aberration of magnification caused due to the large angle of view and high zoom ratio, it is necessary to select a glass material with a high partial dispersion ratio in the θgF-vd diagram of FIG. 22 for a negative lens in the first lens unit L1.

Conditional Expressions (1) and (2) define the partial dispersion ratio θgF of the material of the negative lens G1n of the first lens unit L1. In FIG. 22, the dot line represents a curve of Conditional Expression (1). Applying a glass material that satisfies Conditional Expressions (1) and (2) to the negative lens G1n in the first lens unit L1 prevents insufficient correction of the secondary spectrum of chromatic aberration of magnification at the wide-angle end, thus minimizing correction of the secondary spectrum of the chromatic aberration of magnification as a zoom lens. When Conditional Expressions (1) and (2) are not satisfied, it is difficult to reduce the secondary spectrum of chromatic aberration of magnification at the wide-angle end.

Conditional Expression (3) defines the Abbe number vd of the material of the negative lens G1n in the first lens unit L1.

When the Abbe number vd exceeds the upper limit of Conditional Expression (3), it is difficult to correct chromatic aberration of magnification on the wide-angle side successfully. Furthermore, when the first lens unit L1 includes a cemented lens, the surface of the cemented lens has a large curvature, and the cemented lens is increased in thickness and thereby increased in size. This is not preferred. Materials having a large Abbe number vd generally have low refractive indices. Because of such a low refractive index, the thickness of the lens is increased overall, including the peripheral part, thus leading to an increase in size. This is not preferred.

When the Abbe number vd is smaller than the lower limit of Conditional Expression (3), the difference in the Abbe number between the materials of the negative lens G1n and positive lenses of the first lens unit L1 is excessively large, making it difficult to successfully correct the chromatic aberration of magnification at the wide-angle end.

In Embodiments 1, 2 and 4 to 10, the numerical ranges of Conditional Expressions (1) to (3) are preferably set as follows:

$$\theta gF-(-1.6650\times10^{-7}\cdot vd^3+5.2130\times10^{-5}\cdot vd^2-5.6560\times10^{-3}\cdot vd+0.7398)>0 \quad (1a)$$

$$0.5490<\theta gF<0.6000 \quad (2)$$

$$52.0 \leq vd \leq 65.0 \quad (3a)$$

More preferably, the numerical ranges of Conditional Expressions (2) and (3a) are set as follows:

$$0.5543<\theta gF<0.5950 \quad (2b)$$

$$54.0 \leq vd \leq 62.0 \quad (3b)$$

In Embodiments 1, 2 and 4 to 10, the zoom lens of each embodiment is configured as described above and thereby provides a wide angle of view, a high zoom ratio, and high optical performances.

In Embodiments 1, 2 and 4 to 10, the aforementioned configuration of each embodiment allows for minimization of variations in aberration and angle of view due to zooming and focusing.

In Embodiments 1, 2 and 4 to 10, the glass material that satisfies Conditional Expressions (1) to (3) is used in the first lens unit L1. In addition, the glass material that satisfies Conditional Expressions (1) to (3) is used in a first lens subunit L1a in Embodiments 1, 2 and 4 to 10. The glass material that satisfies Conditional Expressions (1) to (3) is used in the second lens of the first lens unit L1 in Embodiments 1, 2, and 5 to 10; and in the first lens thereof in Embodiment 4. The glass material that satisfies Conditional Expressions (1) to (3) is also used in the first lens of the first lens unit L1 in Embodiment 2; and the third lenses in Embodiments 5 and 6. The closer to the object the first lens unit L1 made of the glass material satisfying Conditional Expressions (1) to (3) is disposed, the higher the effect of correcting the secondary spectrum of chromatic aberration of magnification is. The present invention implements effective correction by using the glass material in the first to third lenses. When the glass material satisfying Conditional Expressions (1) to (3) is used in the first and second lenses in particular, the effect of reducing chromatic aberration of magnification is high because the off-axis rays pass through the first and second lenses at high positions. In addition, use of a comparatively high refractive index material reduces the weight.

In each Embodiment, preferably, at least one of the following Conditional Expressions is satisfied.

$$1.00 < |fn|/f1 \leq 7.20 \quad (4)$$

$$1.00 < |fn/f1a| \leq 5.20 \quad (5)$$

$$1.00 < f1/fW < 60.00 \quad (6)$$

$$1.00 < fT/f1 < 4.00 \quad (7)$$

$$1.00 < f1/|f2| < 7.60 \quad (8)$$

$$0.500 \leq D1x/D1 < 1.000 \quad (9)$$

$$0.700 \leq Dsx/Ds < 1.000 \quad (10)$$

$$-50.00 < (R1-R2)/(R1+R2) < 50.00 \quad (11)$$

$$0.50 < \alpha < 5.00 \quad (12)$$

$$1.450 \leq nd \leq 1.750 \quad (13)$$

Conditional Expression (4) defines the ratio of focal length fn of the negative lens G1n that is made of an extraordinary dispersion material in the first lens unit L1 to focal length f1 of the first lens unit L1. When Conditional Expression (4) is satisfied, the negative lens Gn is configured to have a proper power, and the secondary spectrum of the chromatic aberration of magnification at the wide-angle end can be corrected successfully. When the focal length fn of the negative lens G1n is increased and the ratio of |fn|/f1 exceeds the upper limit of Conditional Expression (4), the negative lens Gn cannot be configured to have a proper power and cannot sufficiently exert the effect of correcting the secondary spectrum of chromatic aberration of magnification. When the focal length fn of the negative lens G1n is excessively reduced and the ratio of |fn|/f1 falls below the lower limit of Conditional Expression (4), it is necessary to increase the refractive power of positive lenses in the first lens unit L1. This could increase spherical aberration and coma at the telephoto end, which is not preferred.

Conditional Expression (5) defines the ratio of the focal length fn of the negative lens G1n that is made of an extraordinary dispersion material in the first lens unit L1 to focal length f1a of the first lens subunit L1a. When Conditional Expression (5) is satisfied, the negative lens Gn can be configured to have a proper power, and the secondary spectrum of chromatic aberration of magnification at the wide-angle end is corrected successfully. When the focal length fn of the negative lens G1n is increased and the ratio of |fn/f1a| exceeds the upper limit of Conditional Expression (5), the negative lens Gn cannot be configured to have a proper power and does not sufficiently exert the effect of correcting the secondary spectrum of chromatic aberration of magnification. When the focal length fn of the negative lens G1n is excessively reduced and the ratio of |fn/f1a| falls below the lower limit of Conditional Expression (5), it is necessary to increase the refractive power of positive lenses of the first lens subunit L1a. This could increase spherical aberration and coma at the telephoto end, which is not preferred.

Conditional Expression (6) defines the ratio of the focal length f1 of the first lens unit L1 to focal length fW of the entire system at the wide-angle end. When the focal length f1 of the first lens unit L1 is increased and the ratio of f1/fW exceeds the upper limit of Conditional Expression (6), the focal length fW of the entire system at the wide-angle end is excessively short, leading to an increase in effective diameter of the first lens unit L1, which is not preferred. When the focal length f1 of the first lens unit L1 is reduced and the ratio of f1/fW falls below the lower limit of Conditional Expression (6), spherical aberration and coma could increase. This requires an increase in number of lenses to correct such aberrations, leading to an increase in size of the entire system, which is not preferred. Alternatively, the focal length fW of the entire system at the wide-angle end is increased, which is advantageous in radial size of the lens but makes it difficult to increase the angle of view. This is not preferred.

Conditional Expression (7) defines the ratio of the focal length f1 of the first lens unit L1 to a focal length fT of the entire system at the telephoto end. When the focal length fT of the entire system at the telephoto end is increased and the ratio of fT/f1 exceeds the upper limit of Conditional Expression (7), spherical aberration and coma could increase, which is not preferred. Alternatively, the focal length f1 of the first lens unit L1 is reduced, making it difficult to correct aberration and coma, which is not preferred. When the focal length fT of the entire system at the telephoto end is reduced and the ratio of fT/f1 falls below the lower limit of Conditional Expression (7), the zooming ratio cannot be high, which is not preferred. Alternatively, when the focal length f1 of the first lens unit L1 is increased, total lens length increases, which is not preferred.

Conditional Expression (8) defines the ratio of the focal length f1 of the first lens unit L1 to focal length f2 of the second lens unit L2. When the focal length f1 of the first lens unit L1 is increased and the ratio of f1/f2 exceeds the upper limit of Conditional Expression (8), the entire system increases in size, which is not preferred. Alternatively, the focal length f2 of the second lens unit L2 is reduced, providing a high zoom ratio. However, when the focal length f2 of the second lens unit L2 is excessively shortened, the field curvature increases, which is not preferred. In addition, when the focal length f1 of the first lens unit L1 is reduced and the ratio of f1/f2 falls below the lower limit of Conditional Expression (8), spherical aberration and coma increase. To correct such aberrations, it is necessary to increase the number of lenses, leading to an increase in effective diameter of the first lens unit L1. This is not preferred. Alternatively, the focal length f2 of the second lens unit L2 is increased, making it difficult to provide a predetermined zoom ratio while the lens is compact, which is not preferred.

Conditional Expression (9) defines the arrangement of the negative lens Gn in the first lens unit L1. D1x is the distance on the optical axis between the vertex of the image-side surface of the negative lens Gn included in the first lens unit L1 and the vertex of the image-side glass surface that is the closest to the image side in the first lens unit L1 in a state of being focused at infinity. D1 is the distance on the optical axis between the vertex of the lens surface that is the closest to the object side in the first lens unit L1 and the vertex of the image-side glass surface that is the closet to the image in the first lens unit L1 in a state of being focused at infinity. Applying the glass of a high partial dispersion ratio to a negative lens of the first lens unit L1 allows for good correction of chromatic aberration of magnification at the wide-angle end while acting against the axial chromatic aberration at the telephoto end. To improve both chromatic aberration of magnification at the wide-angle end and axial chromatic aberration at the telephoto end, the negative lens Gn is preferably located at such a position that the glass of a high partial dispersion ratio is effective on correction of chromatic aberration of magnification and has a comparatively small influence on axial chromatic aberration. Specifically, in order to reduce the secondary spectrum of chromatic aberration of magnification, it is effective that the negative lens Gn is located at such a position that off-axis pupil paraxial rays are incident on the negative lens Gn at high positions and axial rays are incident on the negative lens Gn at low positions. In Embodiments 1, 2 and 4 to 10, the closer to the object side the negative lens Gn in the first lens unit L1 is disposed, the stronger the above tendency is. Satisfying Conditional Expression (9) allows for good correction of the secondary spectrum of chromatic aberration of magnification at the wide-angle end while minimizing the influence on axial chromatic aberration at the telephoto end. When the ratio of D1x/D1 falls below the lower limit of Conditional Expression (9), it is difficult to correct the secondary spectrum of chromatic aberration of magnification at the wide-angle end, which is not preferred. The ratio of D1x/D1 cannot reach the upper limit of Conditional Expression (9) in any arrangement.

Conditional Expression (10) defines the arrangement of the negative lens Gn in the zoom lens. Dsx is the distance on the optical axis at the wide-angle end between the vertex of the image-side surface of the negative lens Gn included in the first lens unit L1 and the aperture stop in a state of being focused at infinity. Ds is the distance on the optical axis between the vertex of the lens surface that is the closest to the object side in the first lens unit L1 and the aperture stop in a state of being focused at infinity at the wide-angle end. To reduce the secondary spectrum of chromatic aberration of magnification, it is effective that the negative lens Gn is located at such a position that off-axis pupil paraxial rays are incident on the negative lens Gn at high positions. Generally, the off-axis pupil paraxial rays have a tendency of increasing in height with the distance from the aperture stop. Satisfying Conditional Expression (10) allows for good correction of the secondary spectrum of chromatic aberration of magnification at the wide-angle end. When the ratio of Dsx/Ds falls below the lower limit of Conditional Expression (10), it is difficult to correct the secondary spectrum of chromatic aberration of magnification at the wide-angle end, which is not preferred. The ratio of Dsx/Ds cannot reach the upper limit of Conditional Expression (10) in any arrangement.

Conditional Expression (11) defines the lens profile of the negative lens Gn in the first lens unit L1. R1 and R2 are radii of curvature of the object side and the image side of the negative lens Gn, respectively. The first lens unit L1 corrects field curvature, distortion, and the like at the wide-angle end and corrects coma, spherical aberration, and the like at the telephoto end, which is mainly attributable to the lens profile. When (R1−R2)/(R1+R1) is greater than the upper limit or lower than the lower limit of Conditional Expression (11), the negative lens Gn has different incident inclination angles to off-axis rays, and aberrations caused on the object-side surface and image-side surface enhance each other and are not completely corrected by other lens surfaces. This leads to deterioration of the optical performances.

Conditional Expression (12) defines a linear expansion coefficient α of the extraordinary dispersion material of the negative lens Gn in the first lens unit L1. The liner expansion coefficient α is an average linear expansion coefficient ($10^{-5}$/K) at temperature of −30° C. to 70° C. When the linear expansion coefficient exceeds the upper limit of Conditional Expression (12), the lens profile changes greatly with changes in temperature, deteriorating the optical performances. When the linear expansion coefficient falls below the lower limit of Conditional Expression (12), the lens profile changes little with changes in temperature, but it is difficult to manufacture such a material that satisfies Conditional Expressions.

Conditional Expression (13) defines a refractive index nd of the material of the negative lens Gn in the first lens unit L1. When the refractive index exceeds the upper limit of Conditional Expression (13), the entire system can be easily reduced in size. However, it is difficult to manufacture the material that can satisfy Conditional Expressions (1) to (3). When the refractive index falls below the lower limit of Conditional Expression (13), the lens thickness is increased, and the entire system is increased in size, which is not preferred.

In Embodiments 1, 2 and 4 to 10, preferably, the numerical ranges of Conditional Expressions (4) to (13) are set as follows.

$$1.30 < |fn1/f1| \le 7.00 \tag{4a}$$

$$1.40 < |fn/f1a| \le 3.70 \tag{5a}$$

$$1.50 < f1/fW < 40.00 \tag{6a}$$

$$1.00 < fT/f1 < 3.75 \tag{7a}$$

$$1.25 < f1/|f2| < 6.50 \tag{8a}$$

$$0.550 \le D1x/D1 < 1.000 \tag{9a}$$

$$0.740 \le Dsx/Ds < 1.000 \tag{10a}$$

$$-30.00 < (R1-R2)/(R1+R2) < 10.00 \tag{11a}$$

$$0.80 < \alpha < 3.00 \tag{12a}$$

$$1.480 \le nd \le 1.700 \tag{13a}$$

More preferably, the numerical ranges of Conditional Expressions (4a) to (13a) are set as follows.

$$1.40 < |fn1/f1| \le 6.00 \tag{4b}$$

$$1.60 < |fn/f1a| \le 3.00 \tag{5b}$$

$$2.00 < f1/fW < 30.00 \tag{6b}$$

$$1.00 < fT/f1 < 3.50 \tag{7b}$$

$$1.50 < f1/|f2| < 6.00 \tag{8b}$$

$$0.650 \le D1x/D1 < 1.000 \tag{9b}$$

$$0.800 \le Dsx/Ds < 1.000 \tag{10b}$$

$$-25.00 < (R1-R2)/(R1+R2) < 6.00 \tag{11b}$$

$$0.90 < \alpha < 1.60 \tag{12b}$$

$$1.550 \le nd \le 1.650 \tag{13b}$$

Embodiments 1, 2 and 4 to 10 with each element configured as described above provide compact zoom lenses of a wide angle of view, a high modification ratio, and high performance.

In Embodiment 1, 2 and 4 to 10, the first lens unit L1 includes, in order from the object side to the image side, a first lens subunit L1a and at least one second lens subunit L1b. The first lens subunit L1a is a subunit having a negative refractive power which does not move for focusing. The second lens subunit L1b is a subunit having a positive refractive power which moves on the optical axis for focusing. The first lens unit L1 desirably includes a last lens subunit L1z as a subunit having a positive refractive power, which is disposed closest to the image side in the first lens unit L1 and does not move for focusing. Focusing by the movement of the first lens unit L1 that does not move for zooming can prevent variation in zoom magnification in short-distance photography. Furthermore, since the first lens unit L1 includes: the first lens subunit L1a, which is the closest to the object side and does not move for focusing; the second lens subunit L1b, which moves to the image side for focusing; and the last lens subunit L1z, which is the closest to the image side and does not move for focusing, it is possible to reduce variations in angle of view and aberrations during focusing.

In Embodiments 1, 2 and 4 to 10, preferably, the negative lens Gn is included in the first lens subunit L1a. Employing a glass material of a high partial dispersion ratio for a negative lens within the first lens unit L1 allows for good correction of chromatic aberration of magnification at the wide-angle end but acts against axial chromatic aberration at the telephoto end. To improve both lateral aberration at the wide-angle end and axial aberration at the telephoto end, the negative lens Gn is preferably located at such a position that use of the glass material of a high partial dispersion ratio is effective on correction of chromatic aberration of magnification and has a comparatively small influence on axial chromatic aberration. Specifically, to reduce the secondary spectrum of chromatic aberration of magnification, it is effective that the negative lens Gn is located in the first lens subunit L1a where off-axis pupil paraxial rays are incident at high positions while axial rays are incident at low positions.

In each of Embodiments 1, 2 and 4 to 9, preferably, the first lens unit L1 is fixed during zooming. Fixing the first lens unit L1, which weighs heavy, during zooming simplifies the mechanism while exerting an effect of minimizing changes in weight balance during zooming. In addition, for zooming from the wide-angle and to the telephoto end, moving the second lens unit L2 having a negative refractive power to the image side or individually moving the second and third lens units L2 and L3, that provide negative refractive power in combination, to the image side facilitates ensuring a high zoom magnification.

In Embodiments 1, 2 and 4 to 10, preferably, the lens unit that is the closest to the image side is fixed. Fixing the lens unit that is the closest to the image side prevents variation in field curvature and allows for simplification of the optimal mechanism to interchangeable lenses. In addition, fixing the first lens unit L1 and the lens unit closest to the image side like Embodiments 1, 2 and 4 to 9 exerts the effect of preventing the overall length of the lens system from varying.

In Embodiments 1, 2 and 4 to 10, preferably, the lens unit that is the closet to the image has positive refractive power. The lens unit that is the closest to the image side and has positive refractive power serves as an imaging lens unit. This allows for reduction in size of the lens units on the object side of the imaging lens unit.

In Embodiments 1, 2 and 4 to 10, preferably, aperture stop SP does not move for zooming and focusing. This allows the F-number to be kept constant over the entire zoom range to the zoom position where F-drop occurs (the point of F-drop).

In each Embodiment, preferably, the lens units disposed on the image side of the aperture stop SP do not move for zooming and focusing. The aperture stop kept not being moved allows the F-number to be kept constant from wide angle end to the zoom position where F-drop occurs.

When the second and third lens units L2 and L3 both move to the image side by equal distance for zooming from the wide-angle end to the telephoto end like Embodiments 5, 6, and 9, the second and third lens units L2 and L3 can be considered as substantially one lens unit.

When the following conditional expression is satisfied (herein, the direction of movement to the image side is positive):

$$0.75 < M3/M2 < 1.25 \quad (14)$$

where M2 and M3 are movements of the second and third lens units L2 and L3 during zooming from the wide-angle end to the telephoto end, respectively, the aforementioned conditional expressions (8), (8a), and (8b) are preferably satisfied with f2 replaced with combined focal length f23w of the second and third lens units at the wide-angle end.

Preferably, the numerical range of Conditional Expression (14) is set as follows:

$$0.95 < M3/M2 < 1.05 \quad (14a)$$

In Embodiments 1, 2 and 4 to 10, the second lens unit L2, which moves for zooming, has a lens unit configuration where the lens closest to the object side is a negative lens. This can address an increase in angle of view. Desirably, the lens unit adjacent to the aperture stop SP on the image side has positive refractive power. At the wide-angle end, the axial beam turns into a divergent beam after passing through the second lens unit L2 having a negative refractive power. When the lens unit adjacent to the image side of the aperture stop SP, which is located on the image side of the second lens unit L2, has positive refractive power, the adjacent lens unit provides an effect of converging the beam, allowing the lens effective diameter of the rear lens unit to be reduced.

Hereinafter, a description is given of the lens configurations of Numerical Embodiments 1, 2 and 4 to 10 corresponding to Embodiments 1, 2 and 4 to 10.

Embodiment 1

Figure 1:
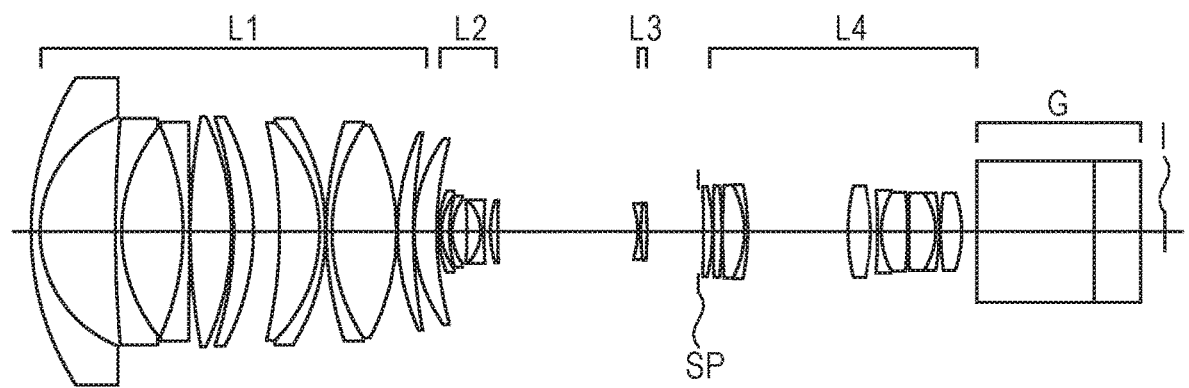
FIG. 1 is a lens cross-sectional view of Embodiment 1 in a state of being focused at infinity at a wide-angle end.
Figure 2A:
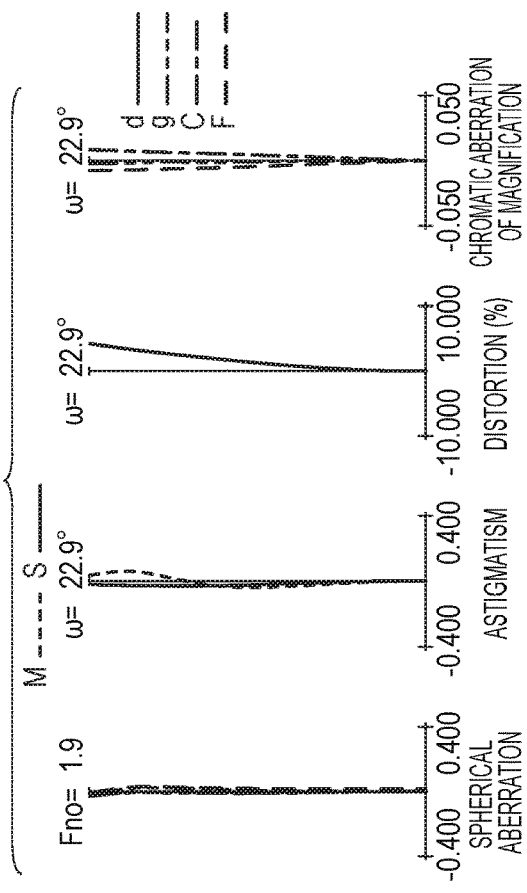
FIG. 2A is an aberration diagram of Embodiment 1 in a state of being focused at infinity at the wide-angle end.
Figure 2B:
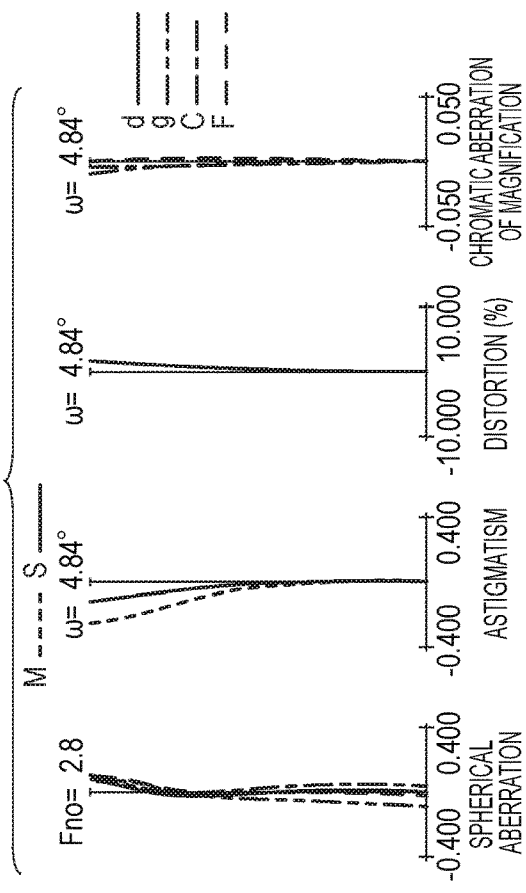
FIG. 2B is an aberration diagram of Embodiment 1 in a state of being focused at infinity.
Figure 2C:
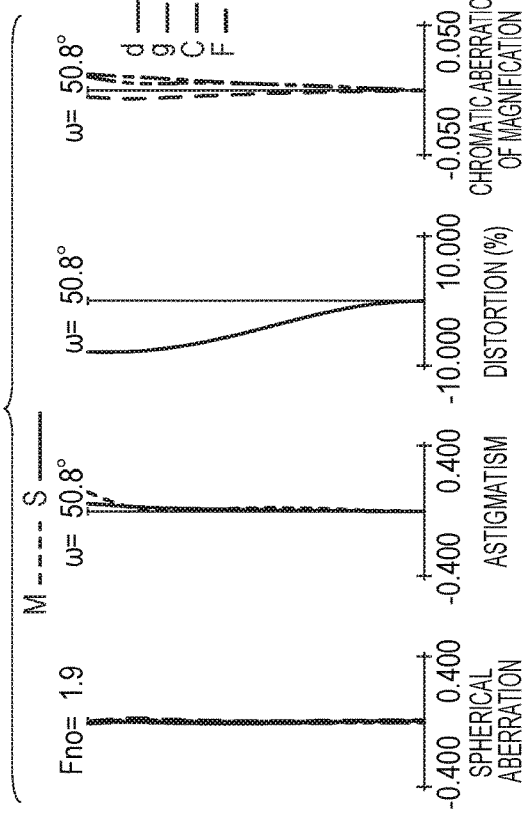
FIG. 2C is an aberration diagram of Embodiment 1 in a state of being focused at infinity at the telephoto end.
Figure 2D:
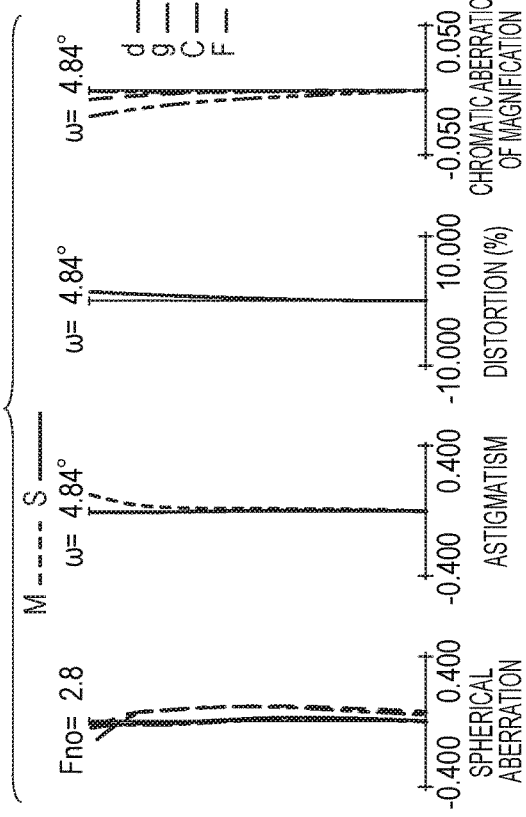
FIG. 2D is an aberration diagram of Embodiment 1 in a state of being focused at short distance at the telephoto end.

FIG. 1 is a lens cross-sectional view of Embodiment 1 at the wide-angle end in a state of being focused at infinity. In the lens cross-sectional view, the left side is the subject (object) side (the front) and an image pickup optical system side while the right side is the image side (the rear side). In the lens cross-sectional view, Li indicates an i-th lens unit where i indicates the order of the lens unit of interest from the front. SP indicates the aperture stop. I indicates the image plane. G indicates an optical block including a prism and an optical filter. The image plane I corresponds to an image pickup surface of an image pickup element (a photoelectric conversion element), such as a CCD sensor or a CMOS sensor, when the zoom lens is used as an image pickup optical system of a digital camera, a video camera, a security camera, or the like. The same applies for Embodiments described below.

The zoom lens of Embodiment 1 includes the following four lens units. The zoom lens of Embodiment 1 is composed of a first lens unit L1 having a positive refractive power, a second lens unit L2 having a negative refractive power, a third lens unit L3 having a negative refractive power, an aperture stop SP, and a fourth lens unit L4 having a positive refractive power, which are arranged in order from the object side to the image side. The first lens unit L1, fourth lens unit L4, and aperture stop SP do not move for zooming. The second lens unit L2 moves to the image side while the third lens unit L3 moves along a locus convex to the object side for zooming from the wide-angle end to the telephoto end. When the third lens unit L3 is configured to have a negative refractive power and move along a locus convex to the object side, using the space for movement of the second lens unit L2 in the middle of zooming allowing for reduction in size of the zoom lens.

The zoom lens of Embodiment 1 performs main zooming through movement of the second lens unit L2. The second lens unit L2 moves, for zooming, closer to the image at the telephoto end than at the wide-angle end, to thereby provide a large zooming effect. Furthermore, the aperture stop SP and the fourth lens unit L4 which is located on the image side of the aperture stop SP, do not move for zooming. This keeps the F-number constant within the zoom range from the wide-angle end to the point of F-drop.

The first lens unit L1 of the zoom lens of Embodiment 1 includes: a first lens subunit L1a having a negative refractive power; a second lens subunit L1b having a positive refractive power; and a third lens subunit (a last lens subunit) L1c having a positive refractive power, which are arranged in order from the object side to the image side. For focusing, the first lens subunit L1a does not move; the second lens subunit L1b moves on the optical axis; and the third lens subunit L1c does not move. The zoom lens of Embodiment 1 employs an inner focusing method that moves the second lens subunit L1b of the first lens unit L1 on the optical axis for focusing. The second lens subunit L1b moves to the image side on the optical axis for focusing from infinity to short distance. This can reduce variations in aberration and angle of view due to focusing.

The zoom lens of Embodiment 1 includes a zoom ratio of 14.47 and an aperture ratio (F-number) of 1.90 to 2.80.

The configuration of each lens unit is described below. It is assumed that the lenses are arranged in order from the object side to the image side.

The first lens unit L1 of Embodiment 1 is composed of 11 lenses, including: a negative lens, a negative lens, a negative lens, a positive lens, a positive lens, a cemented lens of positive and negative lenses, a cemented lens of negative and positive lenses, a positive lens, and a positive lens. The first lens unit L1 is composed of three subunits. The first to fourth lenses from the front constitute a first lens subunit L1a; the fifth lens constitutes a second lens subunit L1b; and the sixth to eleventh lenses constitute a third lens subunit L1c. The first lens subunit L1a and third lens subunit L1c are always fixed for focusing. The second lens subunit L1b moves to the image side for focusing from infinity to short distance. The second lens unit L2 is composed of five lenses, including a negative lens, a negative lens, a cemented lens of positive and negative lenses, and a positive lens. The third lens unit L3 is composed of a cemented lens of negative and positive lenses. The second and third lens units L2 and L3 move for zooming. The fourth lens unit L4 includes a positive lens, a positive lens, a cemented lens of positive and negative lenses, a positive lens, a cemented lens of negative and positive lenses, a cemented lens of positive and negative lenses, and a positive lens. The fourth lens unit includes a space to insert an extender lens unit to increase the focal length range.

FIGS. 2A to 2D are aberration diagrams of Embodiment 1 at the wide-angle end, an intermediate zoom position, and the telephoto end in a state of being focused at infinity and at the telephoto end in a state of being focused at 0.6 m, respectively. In the spherical aberration diagrams, solid lines represent d-line; long-dashed double-short dashed lines, g-line; long-dashed short-dashed lines, C-line; and dashed lines, F-line. In diagrams illustrating astigmatism, solid lines S represent astigmatism of d-line in the sagittal direction; and dashed lines M represent astigmatism of d-line in the meridional direction. The aberration diagrams illustrating distortion represent distortion of d-line. The chromatic aberration diagrams represent chromatic aberration of magnification of g-line with respect to d-line. ω is the half angle of view; and Fno is F-number. The spherical aberration diagrams are illustrated in a scale of 0.4 mm: the astigmatism diagrams, 0.4 mm; the distortion diagrams, 10%; and the lateral chromatic diagrams, 0.05 mm. The same applies to Embodiments described below.

Embodiment 2

Figure 3:
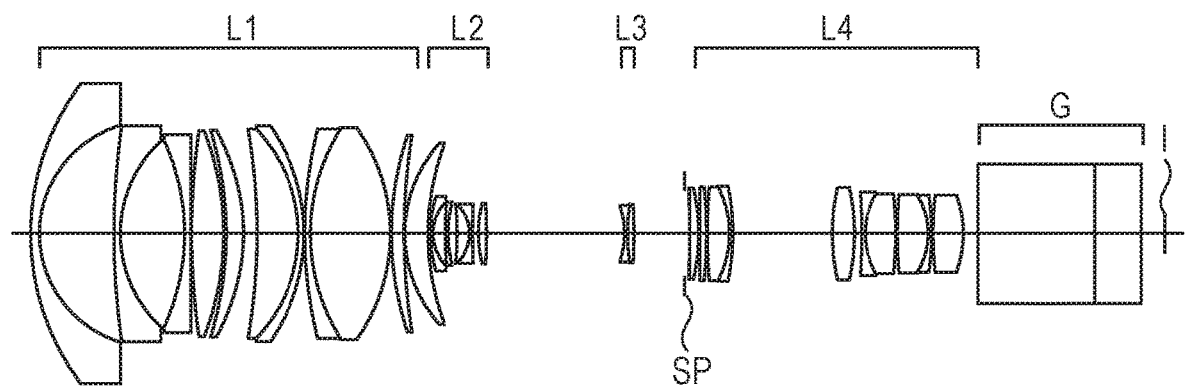
FIG. 3 is a lens cross-sectional view of Embodiment 2 in a state of being focused at infinity at the wide-angle end.

FIG. 3 is a lens cross-sectional view of Embodiment 2 at the wide-angle end in a state of being focused at infinity. FIGS. 4A to 4D are aberration diagrams of Embodiment 2 at the wide-angle end, intermediate zoom position, and telephoto end in a state of being focused at infinity and at the telephoto end in a state of being focused at 0.6 m, respectively.

The zoom lens of Embodiment 2 includes the same characteristics as those of the zoom lens of Embodiment 1 in terms of the schematic configuration, movement for zooming, and movement for focusing. The lens elements constituting each lens unit also include the same characteristics as those of Embodiment 1.

The zoom lens of Embodiment 2 has a zoom ratio of 14.46 and an F-number of 1.90 to 2.80.

Referential Example

Figure 5:
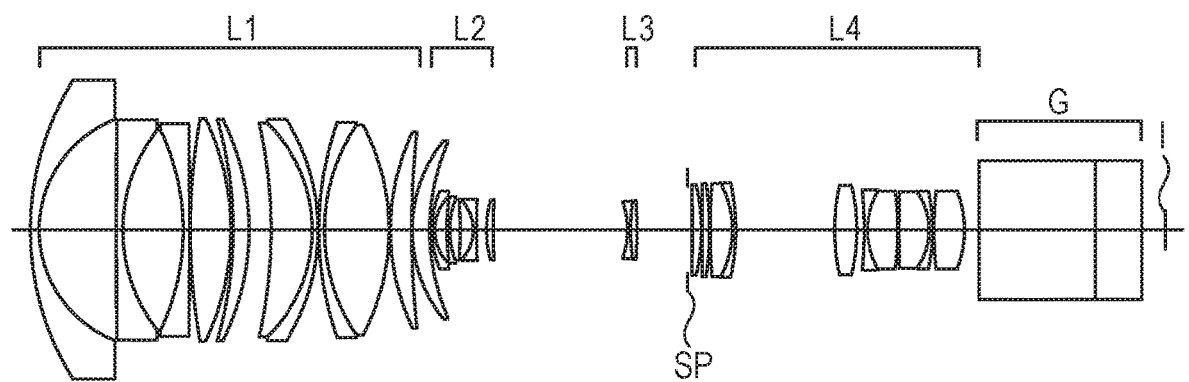
FIG. 5 is a lens cross-sectional view of Referential Example in a state of being focused at infinity at the wide-angle end.
Figure 6A:
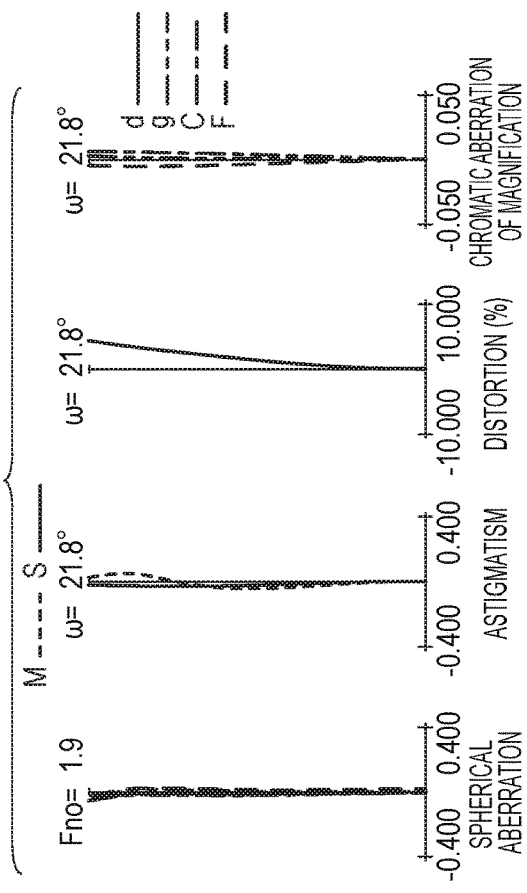
FIG. 6A is an aberration diagram of Referential Example in a state of being focused at infinity at the wide-angle end.
Figure 6B:
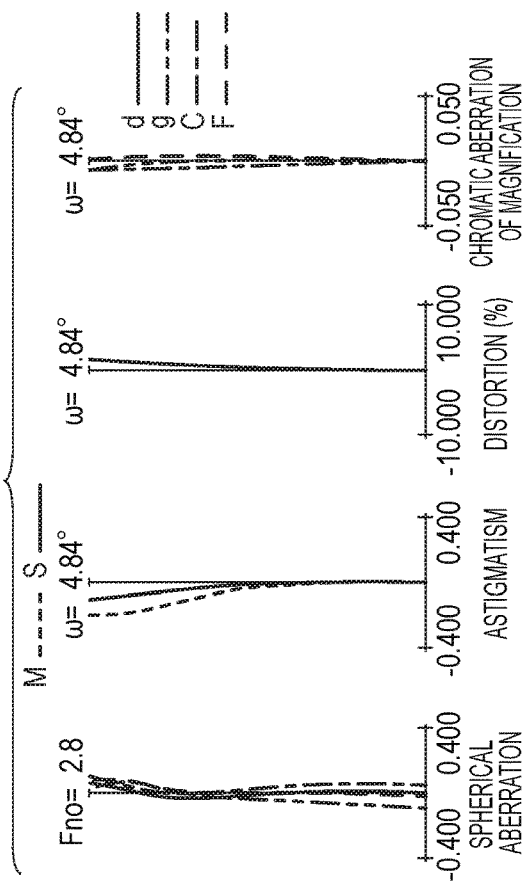
FIG. 6B is an aberration diagram of Referential Example in a state of being focused at infinity at an intermediate zoom position.
Figure 6C:
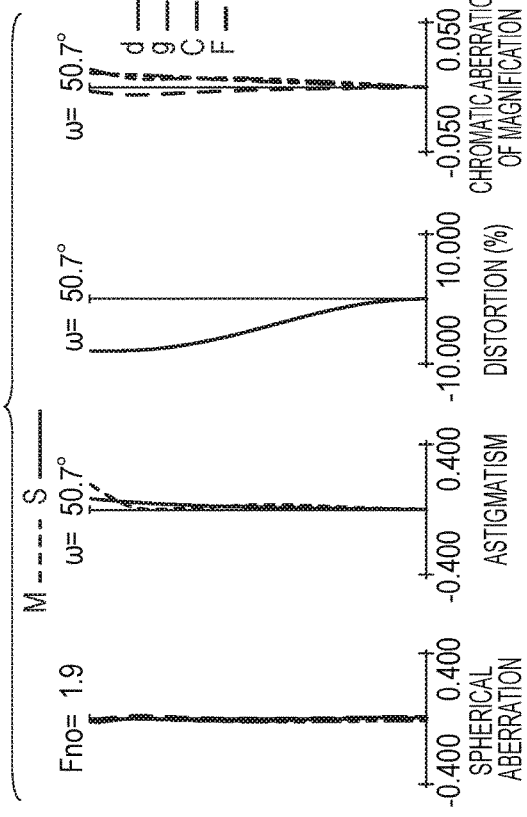
FIG. 6C is an aberration diagram of Referential Example in a state of being focused at infinity at the telephoto end.
Figure 6D:
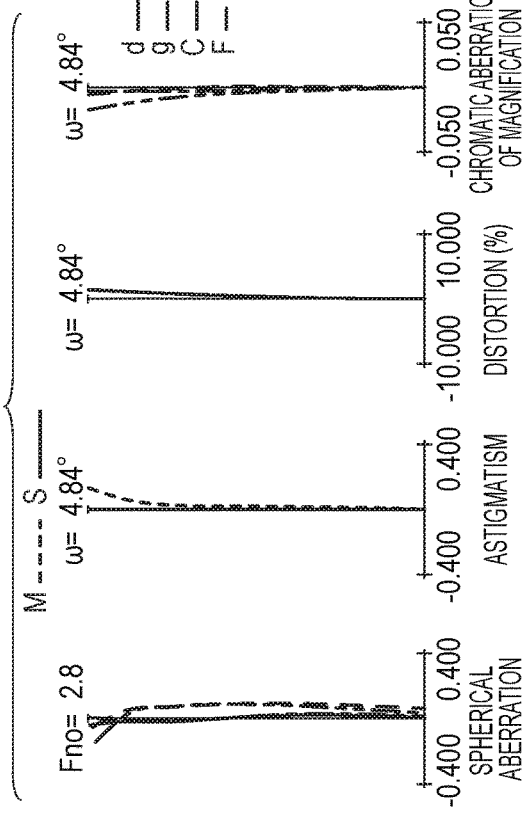
FIG. 6D is an aberration diagram of Referential Example in a state of being focused at short distance at the telephoto end.

FIG. 5 is a lens cross-sectional view of Referential Example at the wide-angle end in a state of being focused at infinity. FIGS. 6A to 6D are aberration diagrams of Referential Example at the wide-angle end, intermediate zoom position, and telephoto end in a state of being focused at infinity and at the telephoto end in a state of being focused at 0.6 m, respectively.

The zoom lens of Referential Example includes the same characteristics as those of the zoom lens of Embodiment 1 in terms of the schematic configuration, movement for zooming, and movement for focusing. The lens elements constituting each lens unit also include the same characteristics as those of Embodiment 1.

The zoom lens of Referential Example has a zoom ratio of 14.46 and an F-number of 1.90 to 2.80.

Embodiment 4

Figure 7:
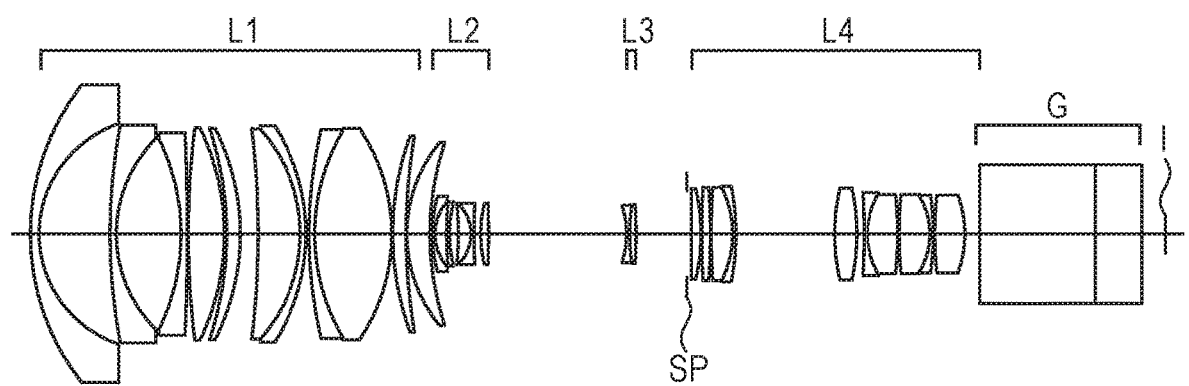
FIG. 7 is a lens cross-sectional view of Embodiment 4 in a state of being focused at infinity at the wide-angle end.
Figure 8A:
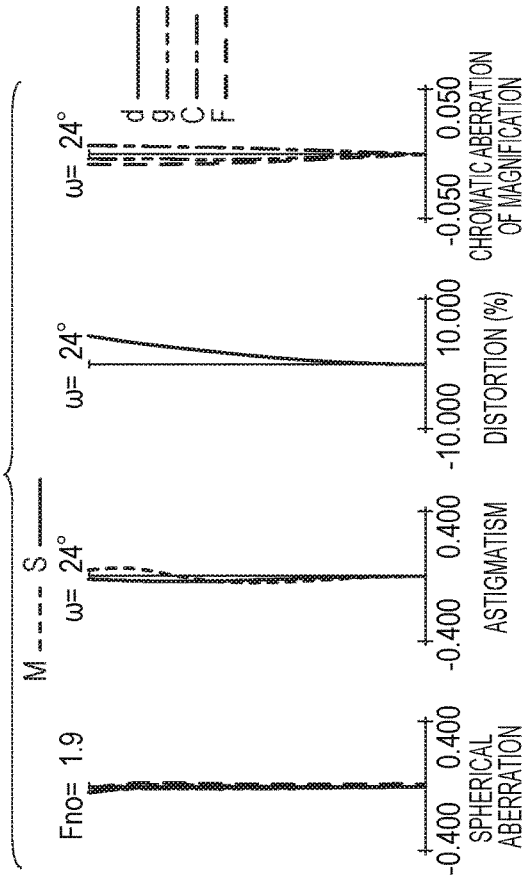
FIG. 8A is an aberration diagram of Embodiment 4 in a state of being focused at infinity at the wide-angle end.
Figure 8B:
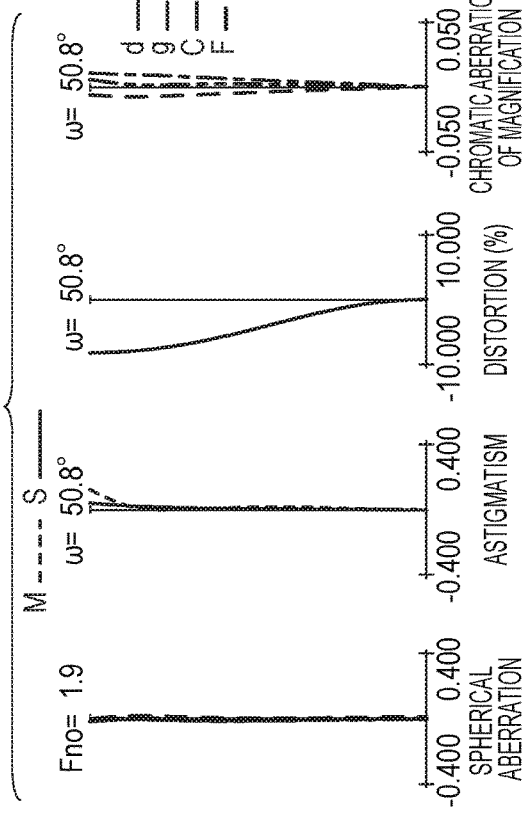
FIG. 8B is an aberration diagram of Embodiment 4 in a state of being focused at infinity at an intermediate zoom position.
Figure 8C:
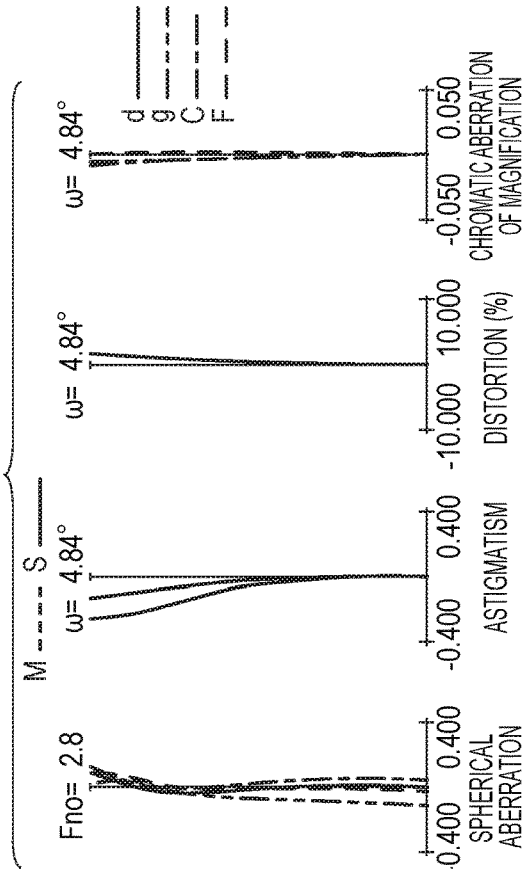
FIG. 8C is an aberration diagram of Embodiment 4 in a state of being focused at infinity at the telephoto end.
Figure 8D:
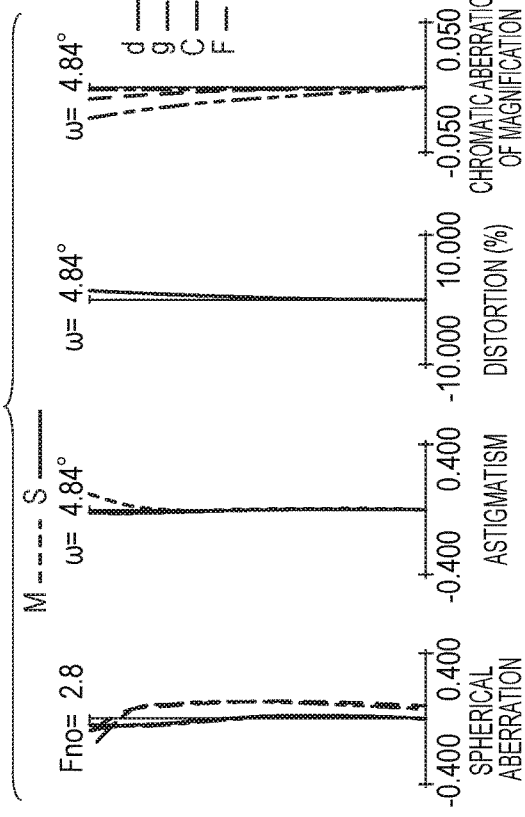
FIG. 8D is an aberration diagram of Embodiment 4 in a state of being focused at short distance at the telephoto end.

FIG. 7 is a lens cross-sectional view of Embodiment 4 at the wide-angle end in a state of being focused at infinity. FIGS. 8A to 8D are aberration diagrams of Embodiment 4 at the wide-angle end, intermediate zoom position, and telephoto end in a state of being focused at infinity and at the telephoto end in a state of being focused at 0.6 m, respectively.

The zoom lens of Embodiment 4 is composed of the following four lens units arranged in order from the object side to the image side, including a first lens unit L1 having a positive refractive power, a second lens unit L2 having a negative refractive power, a third lens unit L3 having a negative refractive power, an aperture stop SP, and a fourth lens unit L4 having a positive refractive power. The first lens unit L1, fourth lens unit L4, and aperture stop SP do not move for zooming. For zooming from the wide-angle end to the telephoto end, the second lens unit L2 moves to the image side, and the third lens unit moves along a locus convex to the object side. When the third lens unit L3 is configured to have a negative refractive power and move along a locus convex to the object side, using the space for movement of the second lens unit L2 in the middle of zoom allows for reduction in size of the zoom lens.

The zoom lens of Embodiment 4 performs main zooming through movement of the second lens unit L2. The second lens unit L2 is moved closer to the image at the telephoto end than at the wide-angle end for zooming, to thereby provide a large zooming effect. Furthermore, the aperture stop SP and the fourth lens unit L4, which is located on the image side of the aperture stop SP, do not move for zooming. This keeps the F-number constant within the zoom range from the wide-angle end to the point of F-drop.

The first lens unit L1 of the zoom lens of Embodiment 4 includes in order from the object side to the image side: a first lens subunit L1a having a negative refractive power; a second lens subunit L1b having a positive refractive power; a third lens subunit L1c having a positive refractive power, and a fourth lens subunit (a last lens subunit) L1d having a positive refractive power. For focusing, the first lens subunit L1a does not move; the second lens subunit L1b moves on the optical axis; the third lens subunit L1c moves on the optical axis; and the fourth lens subunit L1d does not move. The zoom lens of Embodiment 4 employs an inner focusing method in which the second lens subunit L1b and third lens subunit L1c of the first lens unit L1 move on the optical axis for focusing. The second lens subunit L1b and third lens subunit L1c move to the image side on the optical axis for focusing from infinity to short distance. This can reduce variations in aberration and angle of view due to focusing.

The zoom lens of Embodiment 4 includes a zoom ratio of 14.47 and an aperture ratio (F-number) of 1.90 to 2.80.

The first lens unit L1 of Embodiment 4 is composed of 11 lenses, including: a negative lens, a negative lens, a negative lens, a positive lens, a positive lens, a cemented lens of positive and negative lenses, a cemented lens of negative and positive lenses, a positive lens, and a positive lens. The first lens unit L1 is composed of four subunits. The first to fourth lenses from the front constitute the first lens subunit L1a; the fifth lens constitutes the second lens subunit L1b; the sixth and seventh lenses constitute the third lens subunit L1c; and the eighth to eleventh lenses constitute the fourth lens subunit L d. The first lens subunit L1a and fourth lens subunit L1d are always fixed for focusing. The second and third lens subunits L1b and L1c both move to the image side along different loci for focusing from infinity to short distance. The second lens unit L2 is composed of five lenses, including a negative lens, a negative lens, a cemented lens of positive and negative lenses, and a positive lens. The third lens unit L3 is composed of a cemented lens of negative and positive lenses. The second and third lens units L2 and L3 move for zooming. The fourth lens unit L4 is composed of a positive lens, a positive lens, a cemented lens of positive and negative lenses, a positive lens, a cemented lens of negative and positive lenses, a cemented lens of positive and negative lenses, and a positive lens. The fourth lens unit includes a space to insert an extender lens unit to increase the focal length.

Embodiment 5

Figure 9:
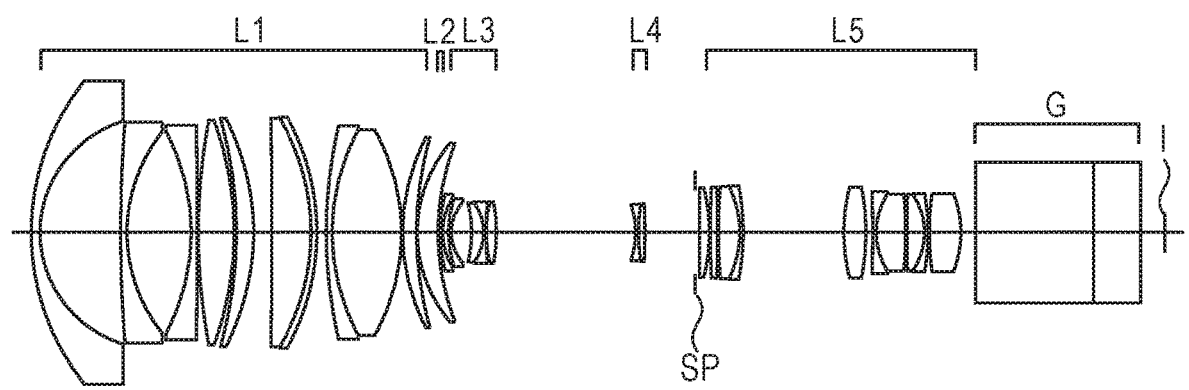
FIG. 9 is a lens cross-sectional view of Embodiment 5 in a state of being focused at infinity at the wide-angle end.

FIG. 9 is a lens cross-sectional view of Embodiment 5 at the wide-angle end in a state of being focused at infinity. FIGS. 10A to 10D are aberration diagrams of Embodiment 5 at the wide-angle end, intermediate zoom position, and telephoto end in a state of being focused at infinity and at the telephoto end in a state of being focused at 1.0 m, respectively.

The zoom lens of Embodiment 5 includes the following five lens units. The zoom lens of Embodiment 5 is composed of a first lens unit L1 having a positive refractive power, a second lens unit L2 having a negative refractive power, a third lens unit L3 having a negative refractive power, a fourth lens unit L4 of negative refractive power, an aperture stop SP, and a fifth lens unit L5 having a positive refractive power, which are arranged in order from the object side to the image side. The first lens unit L1, fifth lens unit L5, and aperture stop SP do not move for zooming. For zooming from the wide-angle end to the telephoto end, the second lens unit L2 moves to the image side; the third lens unit L3 moves to the image side; and the fourth lens unit L4 moves along a locus convex to the object side. When the fourth lens unit L4 is configured to have a negative refractive power and move along a locus convex to the object side, using the space for movement of the second and third lens units L2 and L3 at the middle of zooming allows for reduction in size of the zoom lens.

The zoom lens of Embodiment 5 performs main zooming through movement of the second and third lens units L2 and L3. The second and third lens units L2 and L3 move closer to the image at the telephoto end than at the wide-angle end for zooming, to thereby provide a large zooming effect. The second and third lens units L2 and L3 move so that the distance therebetween is shorter at the telephoto end than at the wide-angle end. This implements good aberration correction at the wide-angle end and the telephoto end and provides a high magnification. Furthermore, the aperture stop SP and the fifth lens unit L5, which is located on the image side of the aperture stop SP, do not move for zooming, so that the F-number is kept constant within the zoom range from the wide-angle end to the point of F-drop.

The first lens unit L1 of the zoom lens of Embodiment 5 includes: a first lens subunit L1a having a negative refractive power; a second lens subunit L1b having a positive refractive power; and a third lens subunit (a last lens subunit) L1c having a positive refractive power, which are arranged in order from the object side to the image side. For focusing, the first lens subunit L1a does not move; the second lens subunit L1b moves on the optical axis; and the third lens subunit L1c does not move. The zoom lens of Embodiment 5 employs an inner focusing method that moves the second lens subunit L1b of the first lens unit L1 on the optical axis for focusing. The second lens subunit L1b moves to the image side on the optical axis for focusing from infinity to short distance. This can reduce variations in aberration and angle of view due to focusing.

The zoom lens of Embodiment 5 includes a zoom ratio of 14.47 and an aperture ratio (F-number) of 1.90 to 2.80.

The first lens unit L1 of Embodiment 5 is composed of 11 lenses, including a negative lens, a negative lens, a negative lens, a positive lens, a positive lens, a cemented lens of positive and negative lenses, a cemented lens of negative and positive lenses, a positive lens, and a positive lens. The first lens unit L1 is composed of three subunits. The first to fourth lenses from the front constitute the first lens subunit L1a; the fifth lens constitutes the second lens subunit L1b; and the sixth to eleventh lenses constitute the third lens subunit L1c. The first lens subunit L1a and third lens subunit L1c are always fixed for focusing. The second lens subunit L1b moves to the image side for focusing from infinity to short distance. The second lens unit L2 is composed of a negative lens. The third lens unit L3 is composed of four lenses, including a negative lens, a cemented lens of positive and negative lenses, and a positive lens. The fourth lens unit L4 is composed of a cemented lens of negative and positive lenses. The second, third, and fourth lens units L2, L3, and L4 move for zooming. The fifth lens unit L5 includes a positive lens, a positive lens, a cemented lens of positive and negative lenses, a positive lens, a cemented lens of negative and positive lenses, a cemented lens of positive and negative lenses, and a positive lens. The fifth lens unit includes a space to insert an extender lens unit to increase the focal length.

Embodiment 6

Figure 11:
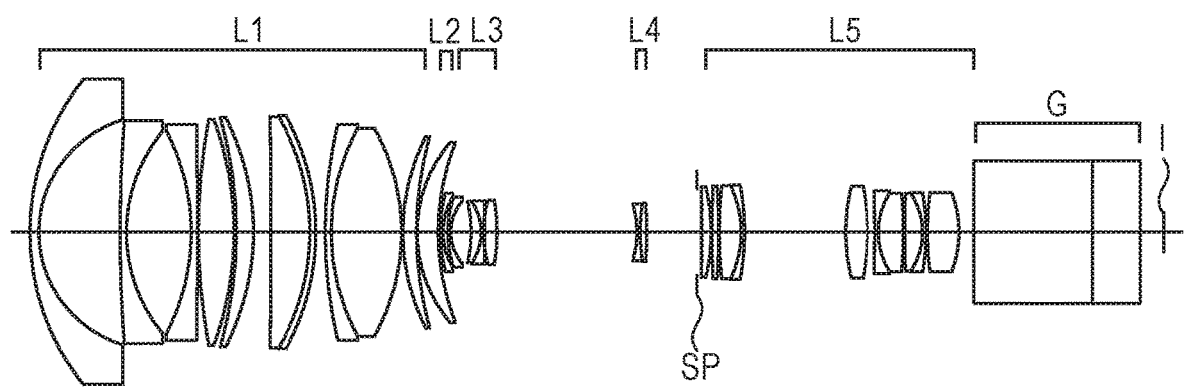
FIG. 11 is a lens cross-sectional view of Embodiment 6 in a state of being focused at infinity at the wide-angle end.
Figure 12A:
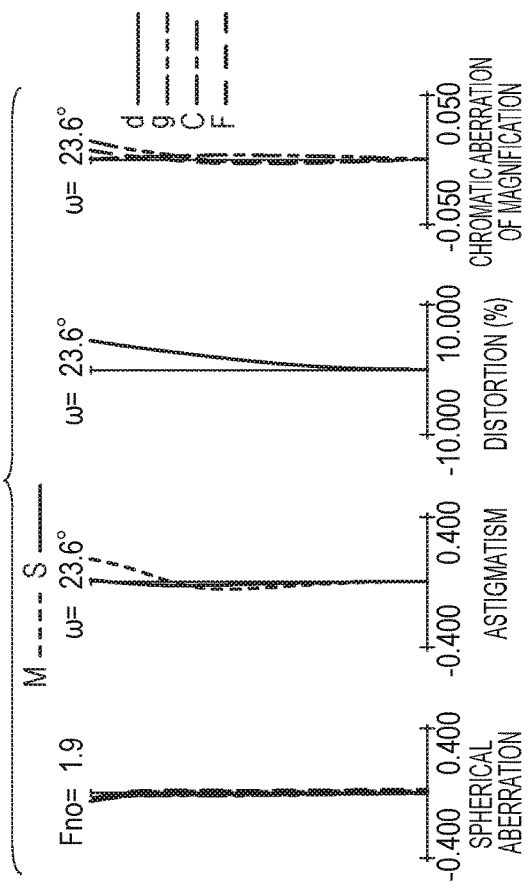
FIG. 12A is an aberration diagram of Embodiment 6 in a state of being focused at infinity at the wide-angle end.
Figure 12B:
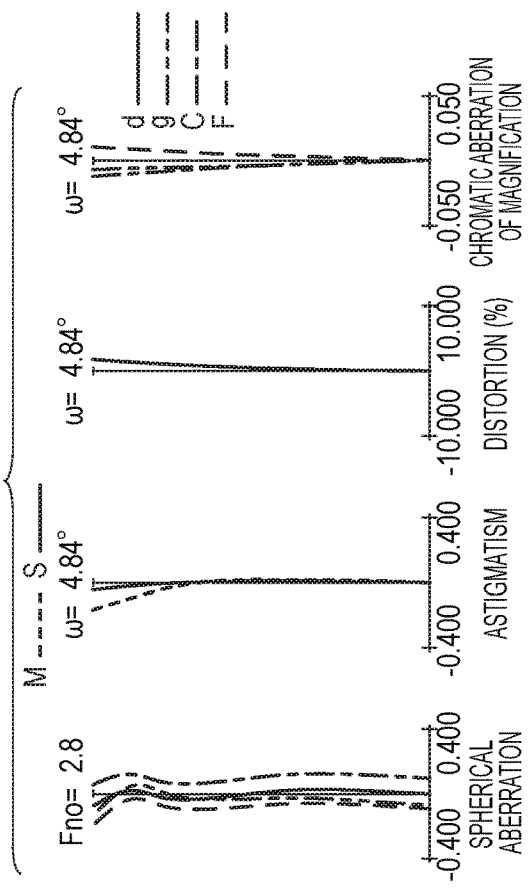
FIG. 12B is an aberration diagram of Embodiment 6 in a state of being focused at infinity at an intermediate zoom position.
Figure 12C:
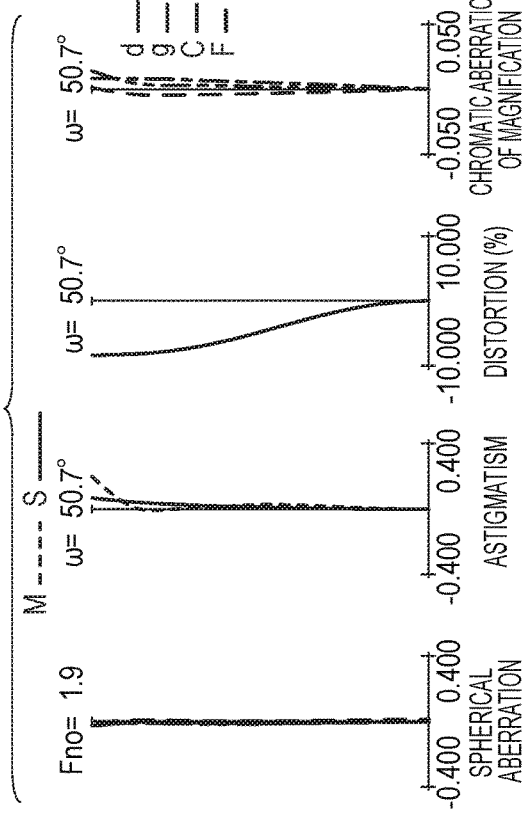
FIG. 12C is an aberration diagram of Embodiment 6 in a state of being focused at infinity at the telephoto end.
Figure 12D:
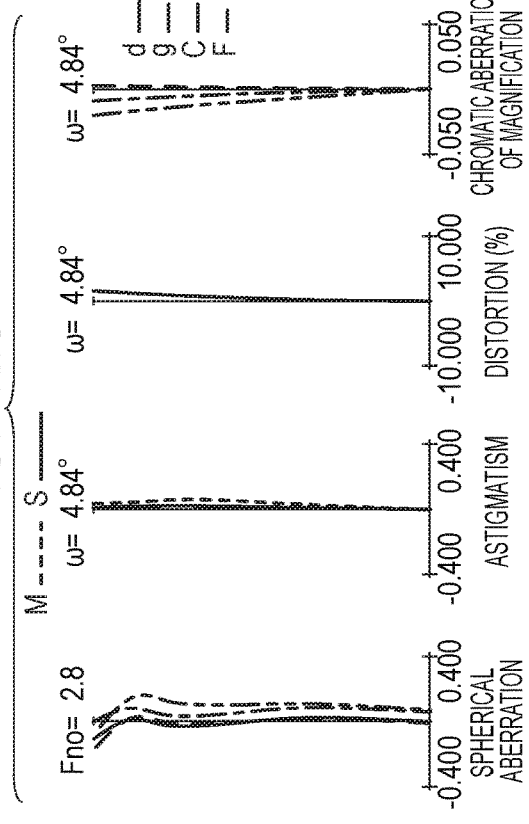
FIG. 12D is an aberration diagram of Embodiment 6 in a state of being focused at short distance at the telephoto end.

FIG. 11 is a lens cross-sectional view of Embodiment 6 at the wide-angle end in a state of being focused at infinity. FIGS. 12A to 12D are aberration diagrams of Embodiment 6 at the wide-angle end, intermediate zoom position, and telephoto end in a state of being focused at infinity and at the telephoto end in a state of being focused at 1.0 m, respectively.

The zoom lens of Embodiment 6 includes the following five lens units. The zoom lens of Embodiment 6 is composed of a first lens unit L1 having a positive refractive power, a second lens unit L2 having a negative refractive power, a third lens unit L3 having a positive refractive power, a fourth lens unit L4 having a negative refractive power, an aperture stop SP, and a fifth lens unit L5 having a positive refractive power, which are arranged in order from the object side to the image side. The first lens unit L1, fifth lens unit L5, and aperture stop SP do not move for zooming. For zooming from the wide-angle end to the telephoto end, the second lens unit L2 moves to the image side; the third lens unit L3 moves to the image side; and the fourth lens unit L4 moves along a locus convex to the object side. When the fourth lens unit L4 is configured to have a negative refractive power and move along a locus convex to the object side, using the space for movement of the second and third lens units L2 and L3 in the middle of zooming allows for reduction in size of the zoom lens.

The zoom lens of Embodiment 6 performs main zooming through movement of the second and third lens units L2 and L3. The second and third lens units L2 and L3 move closer to the image at the telephoto end than at the wide-angle end for zooming, to thereby provide a large zooming effect. The second and third lens units L2 and L3 move so that the distance therebetween is longer at the telephoto end than at the wide-angle end. This implements good aberration correction at the wide-angle end and telephoto end and provides a high magnification. Furthermore, the aperture stop SP and the fifth lens unit L5, which is located on the image side of the aperture stop SP, do not move for zooming, so that the F-number is kept constant within the zoom range from the wide-angle end to the point of F-drop.

The first lens unit L1 of the zoom lens of Embodiment 6 includes in order from the object side to the image side, a first lens subunit L1a having a negative refractive power, a second lens subunit L1b having a positive refractive power, and a third lens subunit (a last lens subunit) L1c having a positive refractive power. For focusing, the first lens subunit L1a does not move; the second lens subunit L1b moves on the optical axis; and the third lens subunit L1c does not move. The zoom lens of Embodiment 6 employs an inner focusing method that moves the second lens subunit L1b of the first lens unit L1 on the optical axis for focusing. The second lens subunit L1b moves to the image side on the optical axis for focusing from infinity to short distance. This can reduce variations in aberration and angle of view due to focusing.

The zoom lens of Embodiment 6 includes a zoom ratio of 14.46 and an aperture ratio (F-number) of 1.90 to 2.80.

The first lens unit L1 of Embodiment 6 is composed of 11 lenses, including: a negative lens, a negative lens, a negative lens, a positive lens, a positive lens, a cemented lens of positive and negative lenses, a cemented lens of negative and positive lenses, a positive lens, and a positive lens. The first lens unit L1 is composed of three subunits. The first to fourth lenses from the front constitute the first lens subunit L1a; the fifth lens constitutes the second lens subunit L1b; and the sixth to eleventh lenses constitute the third lens subunit L1c. The first lens subunit L1a and third lens subunit L1c are always fixed for focusing. The second lens subunit L1b moves to the image side for focusing from infinity to short distance. The second lens unit L2 is composed of two negative lenses. The third lens unit L3 is composed of three lenses, including a cemented lens of negative and positive lenses and a positive lens. The fourth lens unit L4 is composed of a cemented lens of negative and positive lenses. The second, third, and fourth lens units L2, L3, and L4 move for zooming. The fifth lens unit L5 is composed of a positive lens, a positive lens, a cemented lens of positive and negative lenses, a positive lens, a cemented lens of negative and positive lenses, a cemented lens of positive and negative lenses, and a positive lens. The fifth lens unit includes a space to insert an extender lens unit to increase the focal length.

Embodiment 7

Figure 13:
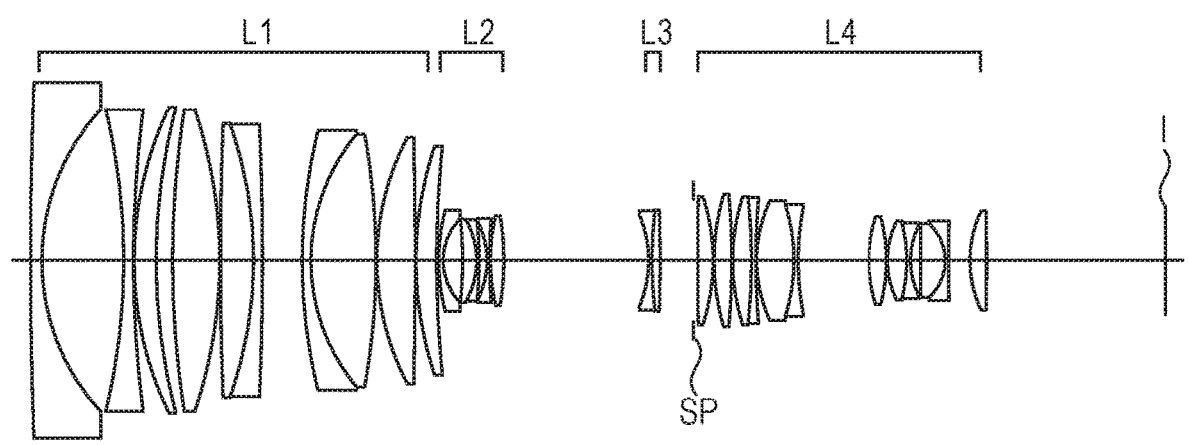
FIG. 13 is a lens cross-sectional view of Embodiment 7 in a state of being focused at infinity at the wide-angle end.
Figure 14A:
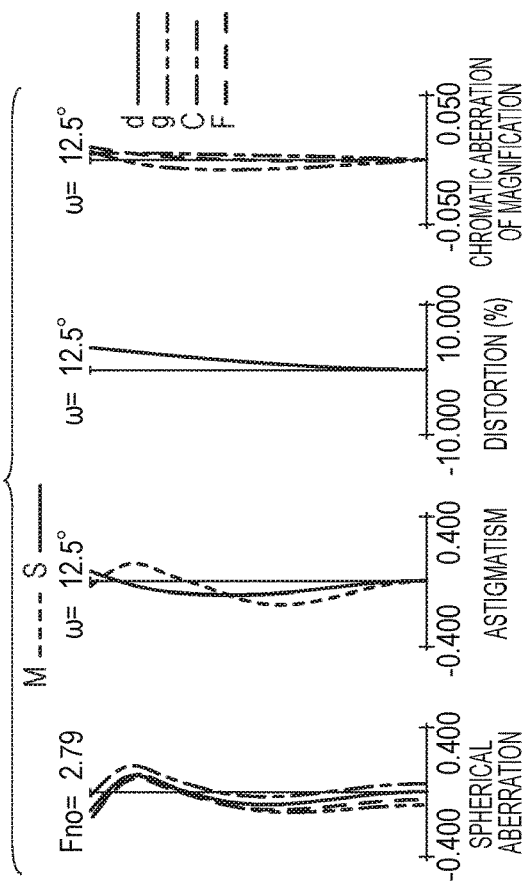
FIG. 14A is an aberration diagram of Embodiment 7 in a state of being focused at infinity at the wide-angle end.
Figure 14B:
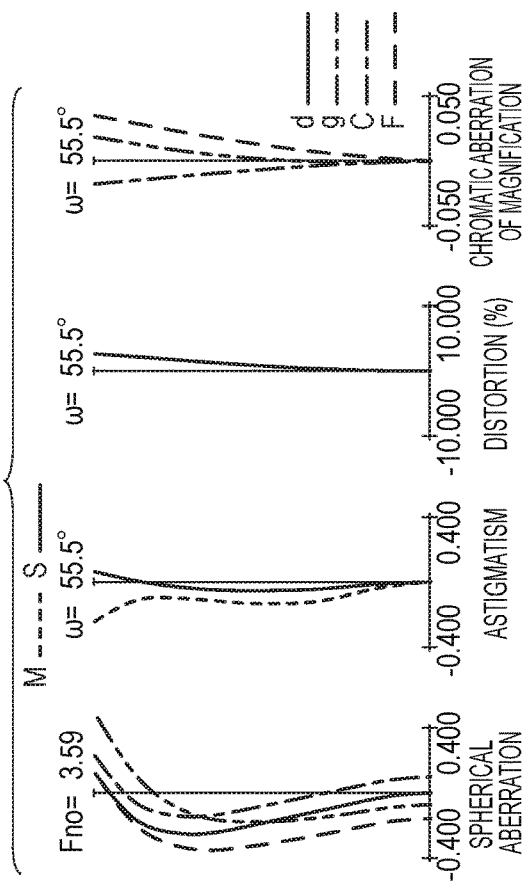
FIG. 14B is an aberration diagram of Embodiment 7 in a state of being focused at infinity at an intermediate zoom position.
Figure 14C:
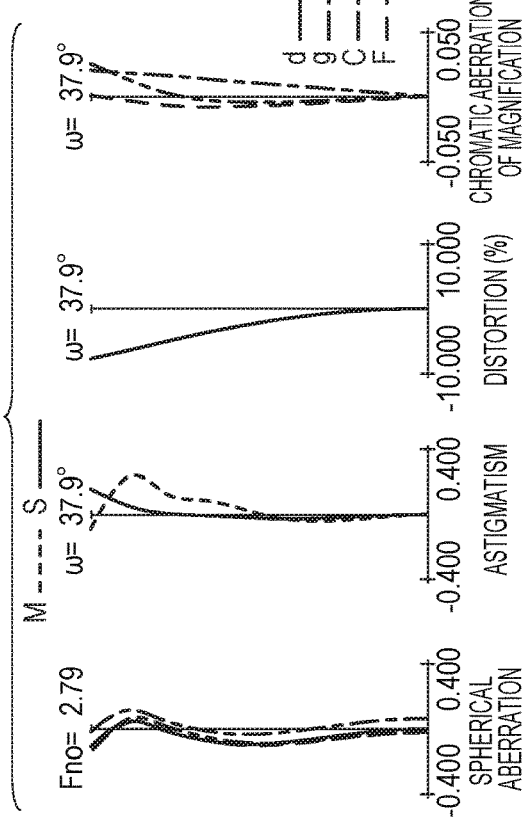
FIG. 14C is an aberration diagram of Embodiment 7 in a state of being focused at infinity at the telephoto end.
Figure 14D:
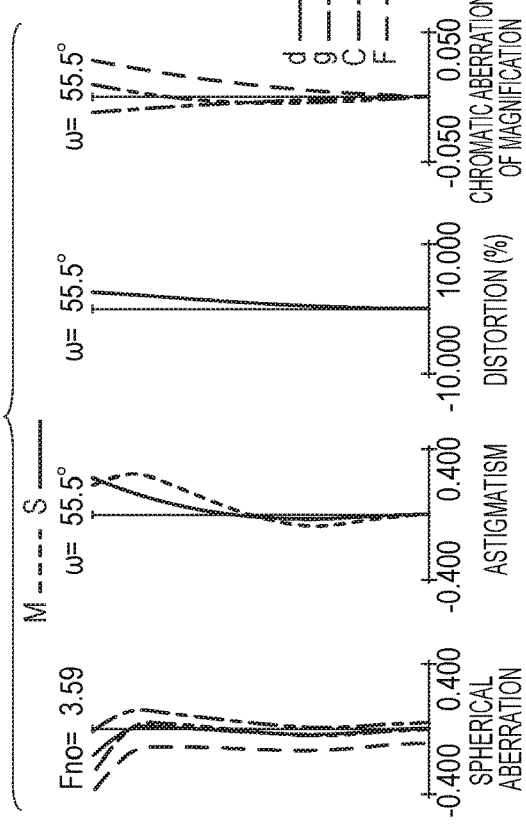
FIG. 14D is an aberration diagram of Embodiment 7 in a state of being focused at short distance at the telephoto end.

FIG. 13 is a lens cross-sectional view of Embodiment 7 at the wide-angle end in a state of being focused at infinity. FIGS. 14A to 14D are aberration diagrams of Embodiment 7 at the wide-angle end, intermediate zoom position, and telephoto end in a state of being focused at infinity and at the telephoto end in a state of being focused at infinity 1.5 m focus, respectively.

The zoom lens of Embodiment 7 includes, in order from the object side to the image side, the following four lens units. The zoom lens of Embodiment 7 is composed of a first lens unit L1 having a positive refractive power, a second lens unit L2 having a negative refractive power, a third lens unit L3 having a negative refractive power, an aperture stop SP, and a fourth lens unit L4 having a positive refractive power. The first lens unit L1, fourth lens unit L4, and aperture stop SP do not move for zooming. For zooming from the wide-angle end to the telephoto end, the second lens unit L2 moves to the image side, and the third lens unit L3 moves along a locus convex to the object side. When the third lens unit L3 is configured to have a negative refractive power and move along a locus convex to the object side, using the space for movement of the second lens unit L2 in the middle of zooming allows for reduction in size of the zoom lens.

The zoom lens of Embodiment 7 performs main zooming through movement of the second lens unit L2. The second lens unit L2 moves closer to the image at the telephoto end than at the wide-angle end for zooming, to thereby provide a large zooming effect. Furthermore, the aperture stop SP and the fourth lens unit L4, which is located on the image side of the aperture stop SP, do not move for zooming, so that the F-number is kept constant within the zoom range from the wide-angle end to the point of F-drop.

The first lens unit L1 of the zoom lens of Embodiment 7 includes in order from the object side to the image side: a first lens subunit L1a having a negative refractive power; a second lens subunit L1b having a positive refractive power; and a third lens subunit (a last lens subunit) L c having a positive refractive power. For focusing, the first lens subunit L1a does not move; the second lens subunit L1b moves on the optical axis; and the third lens subunit L1c does not move. The zoom lens of Embodiment 7 employs an inner focusing method that moves the second lens subunit L1b of the first lens unit L1 on the optical axis for focusing. The second lens subunit L1b moves to the image side on the optical axis for focusing from infinity to short distance. This can reduce variations in aberration and angle of view due to focusing.

The zoom lens of Embodiment 7 includes a zoom ratio of 8.00 and an aperture ratio (F-number) of 2.79 to 3.59.

The first lens unit L1 of Embodiment 7 is composed of 10 lenses, including: a negative lens, a negative lens, a positive lens, a positive lens, a cemented lens of positive and negative lenses, a cemented lens of negative and positive lenses, a positive lens, and a positive lens. The first lens unit L1 is composed of three subunits. The first to third lenses from the front constitute the first lens subunit L1a; the fourth to sixth lens constitutes the second lens subunit L1b; and the seventh to tenth lenses constitute the third lens subunit L1c. The first lens subunit L1a and third lens subunit L1c are always fixed for focusing. The second lens subunit L1b moves to the image side for focusing from infinity to short distance. The second lens unit L2 is composed of five lenses, including a negative lens, a cemented lens of positive and negative lenses, a negative lens, and a positive lens. The third lens unit L3 is composed of a cemented lens of negative and positive lenses. The second and third lens units L2 and L3 move for focusing. The fourth lens unit L4 is composed of a positive lens, a positive lens, a cemented lens of positive and negative lenses, a cemented lens of positive and negative lenses, a positive lens, a cemented lens of positive and negative lenses, and a positive lens.

Embodiment 8

Figure 15:
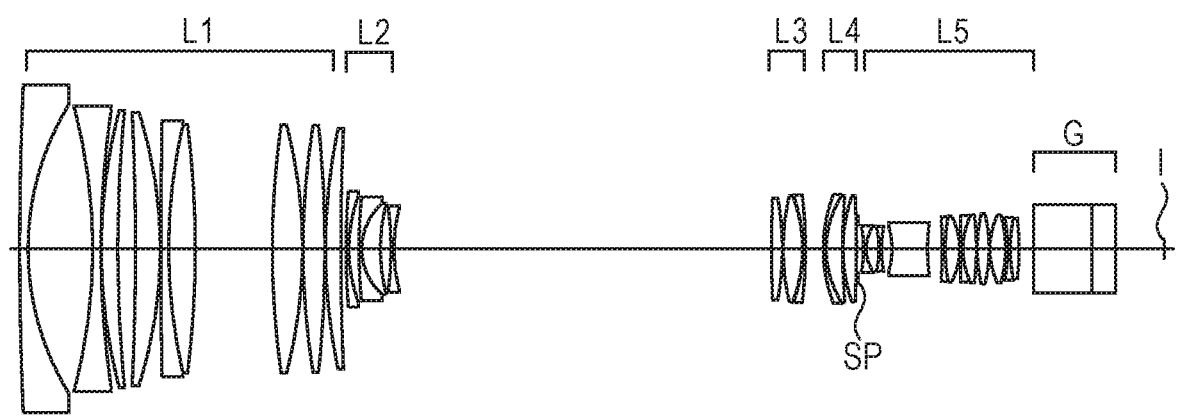
FIG. 15 is a lens cross-sectional view of Embodiment 8 in a state of being focused at infinity at the wide-angle end.
Figure 16A:
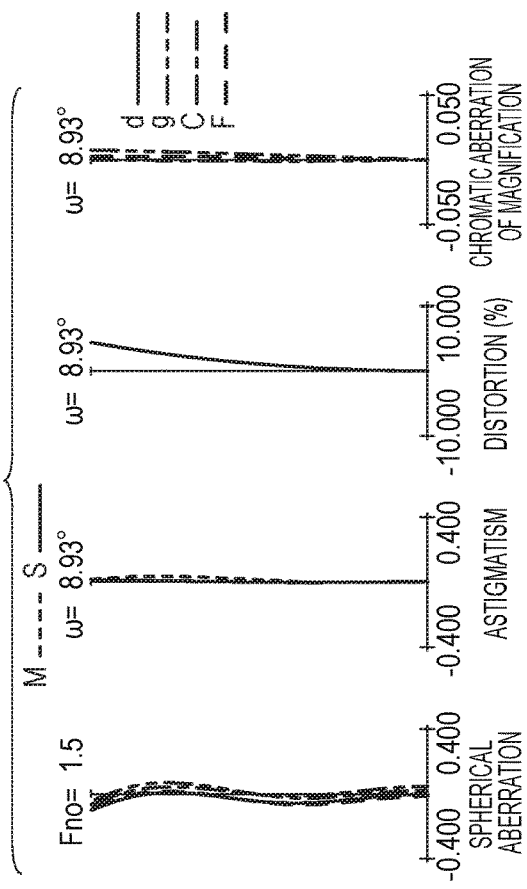
FIG. 16A is an aberration diagram of Embodiment 8 in a state of being focused at infinity at the wide-angle end.
Figure 16B:
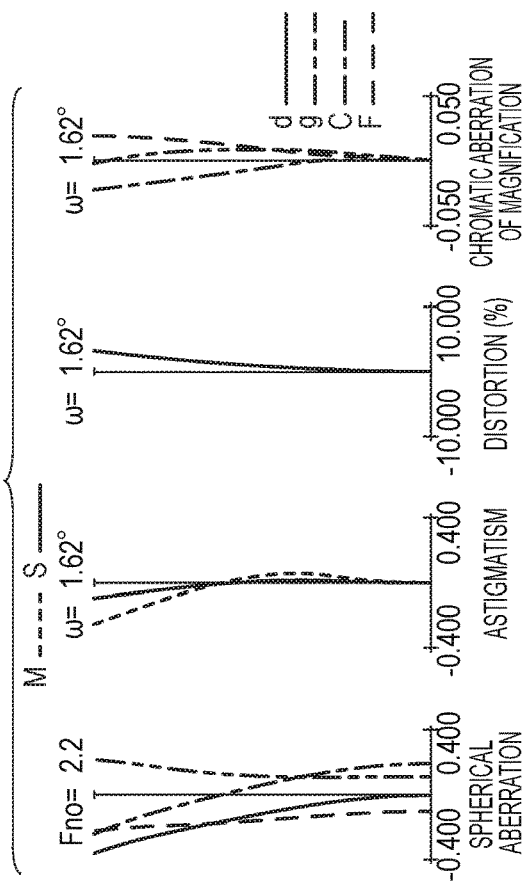
FIG. 16B is an aberration diagram of Embodiment 8 in a state of being focused at infinity at an intermediate zoom position.
Figure 16C:
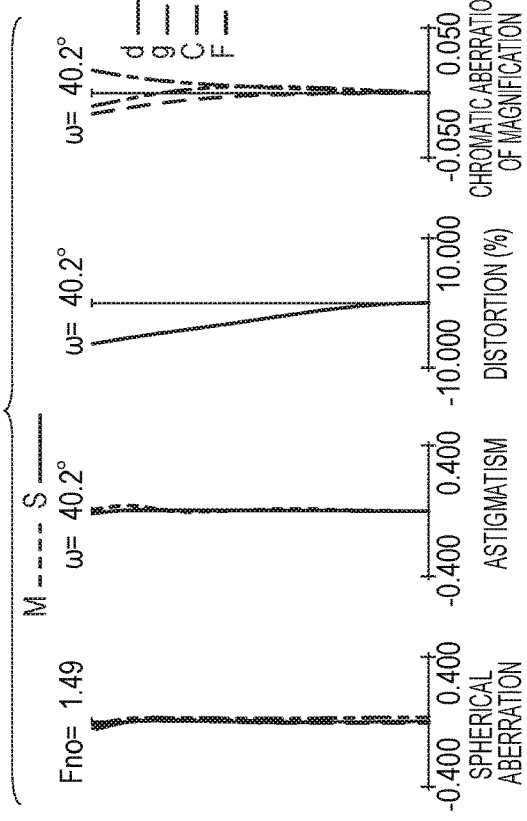
FIG. 16C is an aberration diagram of Embodiment 8 in a state of being focused at infinity at the telephoto end.
Figure 16D:
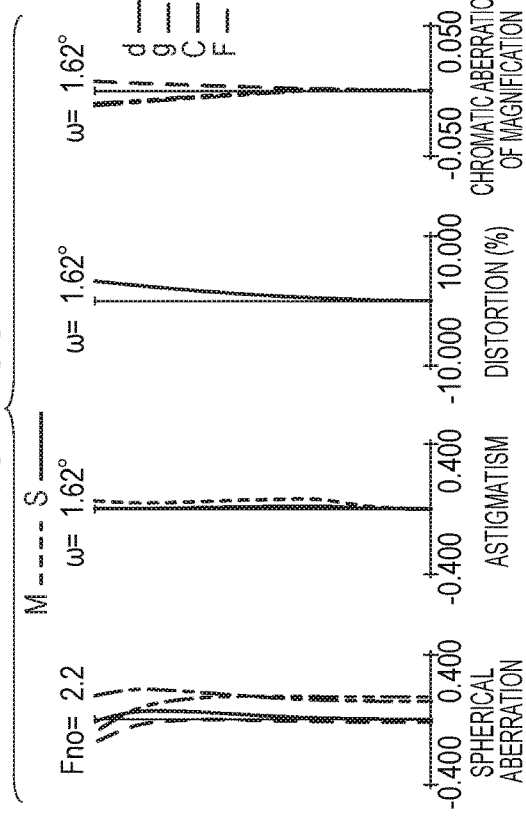
FIG. 16D is an aberration diagram of Embodiment 8 in a state of being focused at short distance at the telephoto end.

FIG. 15 is a lens cross-sectional view of Embodiment 8 at the wide-angle end in a state of being focused at infinity. FIGS. 16A to 16D are aberration diagrams of Embodiment 8 at the wide-angle end, intermediate zoom position, and telephoto end in a state of being focused at infinity and at the telephoto end in a state of being focused at 0.8 m, respectively.

The zoom lens of Embodiment 8 includes the following five lens units. The zoom lens of Embodiment 8 is composed of a first lens unit L1 having a positive refractive power, a second lens unit L2 having a negative refractive power, a third lens unit L3 having a positive refractive power, a fourth lens unit L4 having a positive refractive power, an aperture stop SP, and a fifth lens unit L5 having a positive refractive power, which are arranged in order from the object side to the image side. The first lens unit L1, fifth lens unit L5, and aperture stop SP do not move for zooming. For zooming from the wide-angle end to the telephoto end, the second lens unit L2 moves to the image side; the third lens unit L3 moves along a locus convex to the object side; and the fourth lens unit L4 moves along a locus convex to the object side. When the third and fourth lens units L3 and L4 are configured to have a positive refractive power and move along loci convex to the object side, using the space for movement of the second lens unit L2 in the middle of zooming allows for reduction in size of the zoom lens.

The zoom lens of Embodiment 8 performs main zooming through movement of the second lens unit L2. The second lens unit L2 moves closer to the image at the telephoto end than at the wide-angle end for zooming, to thereby provide a large zooming effect. Furthermore, the aperture stop SP and the fifth lens unit L5, which is located on the image side of the aperture stop SP, do not move for zooming, so that the F-number is kept constant within the zoom range from the wide-angle end to the point of F-drop.

The first lens unit L1 of the zoom lens of Embodiment 8 includes in order from the object side to the image side: a first lens subunit L1a having a negative refractive power; a second lens subunit L1b having a positive refractive power; and a third lens subunit (a last lens subunit) L c having a positive refractive power. For focusing, the first lens subunit L1a does not move; the second lens subunit L1b moves on the optical axis; and the third lens subunit L1c does not move. The zoom lens of Embodiment 8 employs an inner focusing method that moves the second lens subunit L1b of the first lens unit L1 on the optical axis for focusing. The second lens subunit L1b moves to the image side on the optical axis for focusing from infinity to short distance. This can reduce variations in aberration and angle of view due to focusing.

The zoom lens of Embodiment 8 includes a zoom ratio of 30.00 and an aperture ratio (F-number) of about 1.49 to 2.20.

The first lens unit L1 of Embodiment 8 is composed of nine lenses, including: a negative lens, a negative lens, a positive lens, a positive lens, a cemented lens of negative and positive lenses, a positive lens, a positive lens, and a positive lens. The first lens unit L1 is composed of three subunits. The first to third lenses from the front constitute the first lens subunit L1a; the fourth to sixth lenses constitute the second lens subunit L1b; and the seventh to ninth lenses constitute the third lens subunit L1c. The first lens subunit L1a and third lens subunit L1c are always fixed for focusing. The second lens subunit L1b moves to the image side for focusing from infinity to short distance. The second lens unit L2 is composed of four lenses, including a negative lens, a cemented lens of negative and positive lenses, and a negative lens. The third lens unit L3 is composed of three lenses, including a positive lens, a positive lens, and a negative lens. The fourth lens unit L4 is composed of a cemented lens of negative and positive lenses and a positive lens. The second, third, and fourth lens units L2, L3, and L4 move for zooming. The fifth lens unit L5 includes a cemented lens of negative, positive and negative lenses, a negative lens, a cemented lens of negative and positive lenses, a cemented lens of negative and positive lenses, positive lens, a positive lens, and a cemented lens of negative and positive lenses.

Embodiment 9

Figure 17:
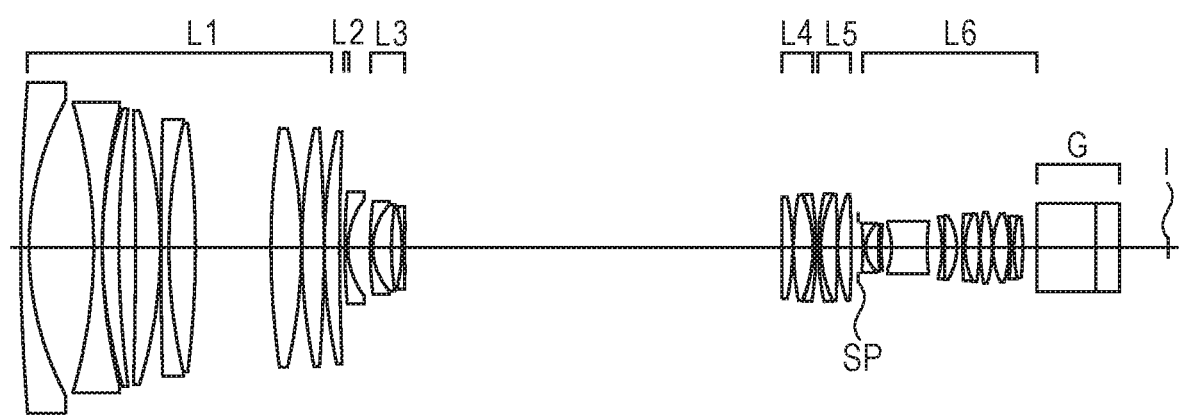
FIG. 17 is a lens cross-sectional view of Embodiment 9 in a state of being focused at infinity at the wide-angle end.

FIG. 17 is a lens cross-sectional view of Embodiment 9 at the wide-angle end in a state of being focused at infinity. FIGS. 18A to 18D are aberration diagrams of Embodiment 9 at the wide-angle end, intermediate zoom position, and telephoto end in a state of being focused at infinity and at the telephoto end in a state of being focused at 0.8 m, respectively.

The zoom lens of Embodiment 9 includes the following six lens units. The zoom lens of Embodiment 9 is composed of a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, an aperture stop SP, and a sixth lens unit L6 having a positive refractive power, which are arranged in order from the object side to the image side. The first lens unit L1, sixth lens unit L6, and aperture stop SP do not move for zooming. For zooming from the wide-angle end to the telephoto end, the second lens unit L2 moves to the image side; the third lens unit L3 moves to the image side; the fourth lens unit L4 moves along a locus convex to the object side; and the fifth lens unit L5 moves along a locus convex to the object side. When the fourth and fifth lens units L4 and L5 are configured to have a positive refractive power and move along loci of a convex to the object side, using the space for movement of the second and third lens units L2 and L3 in the middle of zooming allows the zoom lens to be compact and of a high magnification.

The zoom lens of Embodiment 9 performs main zooming through movement of the second and third lens units L2 and L3. The second and third lens units L2 and L3 move closer to the image at the telephoto end than at the wide-angle end for zooming, to thereby provide a large zooming effect. The second and third lens units L2 and L3 move so that the distance therebetween is smaller at the telephoto end than at the wide-angle end. This implements good aberration correction at the wide-angle end and telephoto end and provides a high magnification. Furthermore, the aperture stop SP and the sixth lens unit L6, which is located on the image side of the aperture stop SP, do not move for zooming, so that the F-number is kept constant within the zoom range from the wide-angle end to the point of F-drop.

The first lens unit L1 of the zoom lens of Embodiment 9 includes in order from the object side to the image side, a first lens subunit L a having a negative refractive power; a second lens subunit L1b having a positive refractive power; and a third lens subunit (a last lens subunit) L1c having a positive refractive power. For focusing, the first lens subunit L1a does not move; the second lens subunit L1b moves on the optical axis; and the third lens subunit L1c does not move. The zoom lens of Embodiment 9 employs an inner focusing method that moves the second lens subunit L1b of the first lens unit L1 on the optical axis for focusing. The second lens subunit L1b moves to the image side on the optical axis for focusing from infinity to short distance. This reduces variations in aberration and angle of view due to focusing.

The zoom lens of Embodiment 9 includes a zoom ratio of 32.00 and an aperture ratio (F-number) of 1.49 to 2.35.

The first lens unit L1 of Embodiment 9 is composed of nine lenses, including a negative lens, a negative lens, a positive lens, a positive lens, a cemented lens of negative and positive lenses, a positive lens, a positive lens, and a positive lens. The first lens unit L1 is composed of three subunits. The first to third lenses from the front constitute the first lens subunit L1a; the fourth to sixth lenses constitute the second lens subunit L1b; and the seventh to ninth lenses constitute the third lens subunit L1c. The first lens subunit L1a and third lens subunit L1c are always fixed for focusing. The second lens subunit L1b moves to the image side for focusing from infinity to short distance. The second lens unit L2 is composed of a single negative lens. The third lens unit L3 is composed of three lenses, including a cemented lens of negative and positive lenses and a negative lens. The fourth lens unit L4 is composed of three lenses, including a positive lens, a positive lens, and a negative lens. The fifth lens unit L5 is composed of a cemented lens of negative and positive lenses and a positive lens. The second, third, fourth, and fifth lens units L2, L3, L4, and L5 move for zooming. The sixth lens unit L6 is composed of a cemented lens of negative, positive, and negative lenses, a negative lens, a cemented lens of negative and positive lenses, a cemented lens of negative and positive lenses, a positive lens, a positive lens, and a cemented lens of negative and positive lenses.

Embodiment 10

Figure 19:
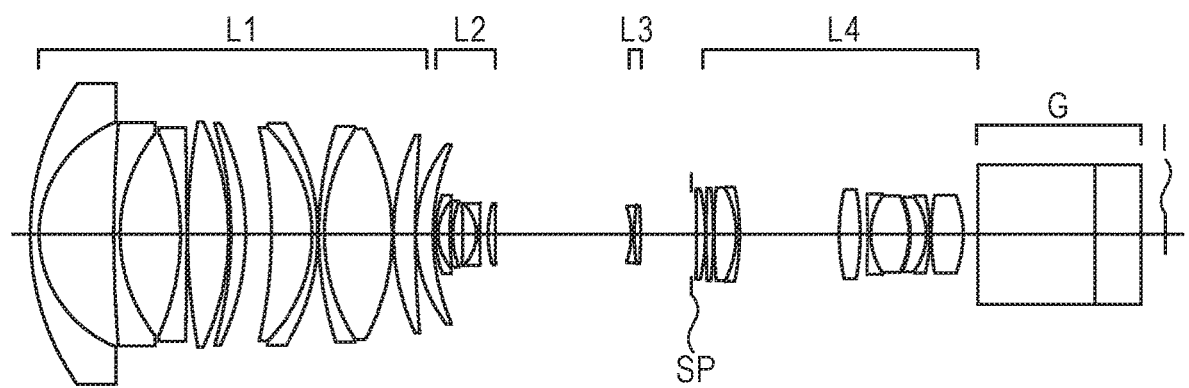
FIG. 19 is a lens cross-sectional view of Embodiment 10 in a state of being focused at infinity at the wide-angle end.
Figure 20:
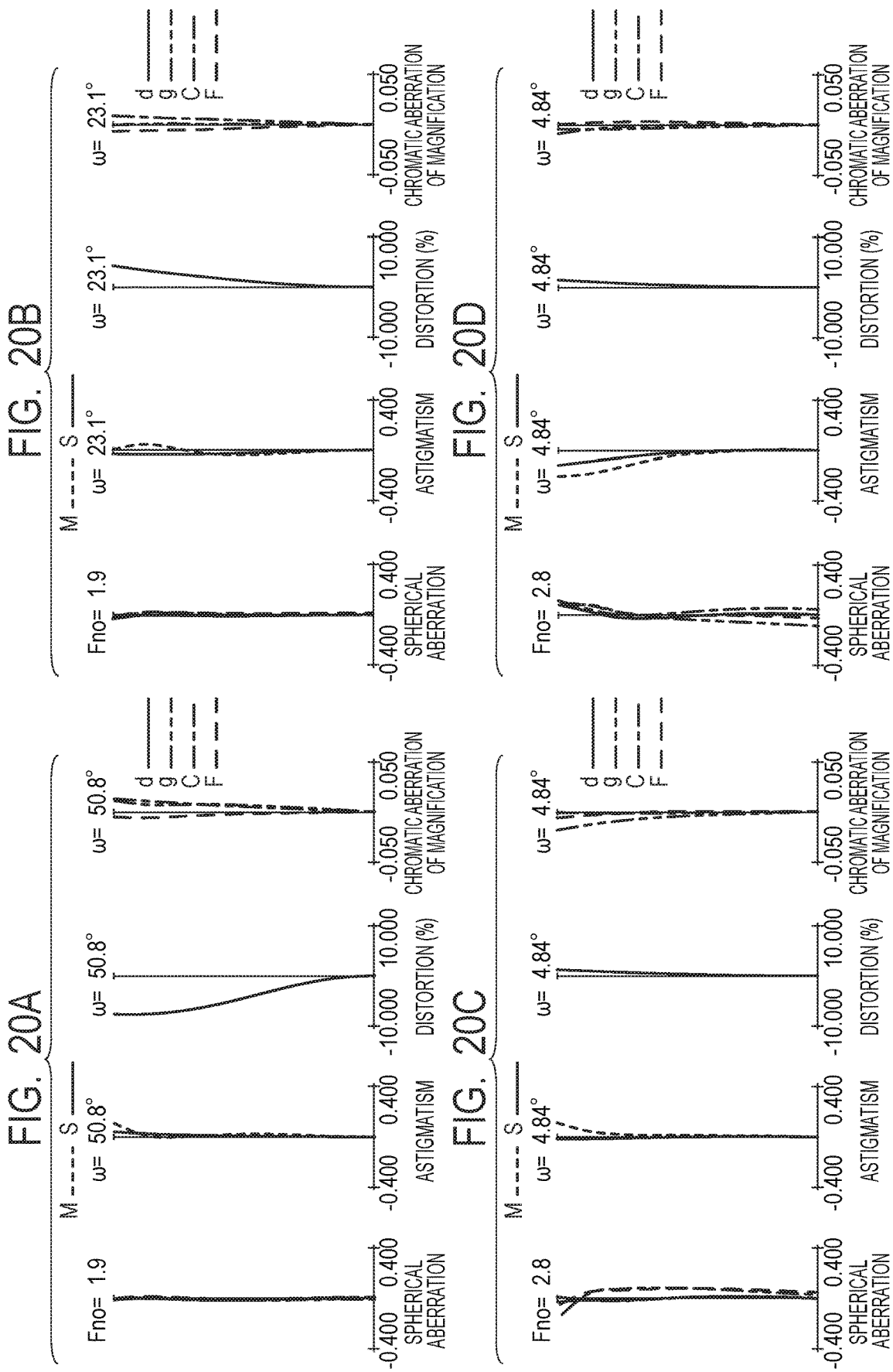
FIG. 20A is an aberration diagram of Embodiment 10 in a state of being focused at infinity at the wide-angle end.
FIG. 20B is an aberration diagram of Embodiment 10 in a state of being focused at infinity at an intermediate zoom position.
FIG. 20C is an aberration diagram of Embodiment 10 in a state of being focused at infinity at the telephoto end.
FIG. 20D is an aberration diagram of Embodiment 10 in a state of being focused at short distance at the telephoto end.

FIG. 19 is a lens cross-sectional view of Embodiment 10 at the wide-angle end in a state of being focused at infinity. FIGS. 20A to 20D are aberration diagrams of Embodiment 10 at the wide-angle end, intermediate zoom position, and telephoto end in a state of being focused at infinity and at the telephoto end in a state of being focused at 0.6 m, respectively.

The zoom lens of Embodiment 10 includes the following four lens units. The zoom lens of Embodiment 10 is composed of a first lens unit L1 having a positive refractive power, a second lens unit L2 having a negative refractive power, a third lens unit L3 having a negative refractive power, an aperture stop SP, and a fourth lens unit L4 having a positive refractive power, which are arranged in order from the object side to the image side. The fourth lens unit L4 and aperture stop SP do not move for zooming. For zooming from the wide-angle end to the telephoto end, the first lens unit L1 moves to the object side; the second lens unit L2 moves to the image side; and the third lens unit L3 moves along a locus convex to the object side. By moving the first lens unit L1 to the object side for zooming, the total lens length can be shortened at the wide-angle end and telephoto end while the image plane characteristics due to zooming are corrected successfully. When the third lens unit L3 is configured to have a negative refractive power and move to the object side with a locus convex to the object side, using the space for movement of the second lens unit L2 in the middle of zooming allows for reduction in size of the zoom lens.

The zoom lens of Embodiment 10 performs main zooming through movement of the second lens unit L2. The second lens unit L2 moves closer to the image at the telephoto end than at the wide-angle end for zooming, to thereby provide a large zooming effect. Furthermore, the aperture stop SP and the fourth lens unit L4, which is located on the image side of the aperture stop SP, do not move for zooming, so that the F-number is kept constant within the zoom range from the wide-angle end to the point of F-drop.

The first lens unit L1 of the zoom lens of Embodiment 10 includes in order from the object side to the image side, a first lens subunit L1a having a negative refractive power; a second lens subunit L1b having a positive refractive power; and a third lens subunit (a last lens subunit) L1c having a positive refractive power. For focusing, the first lens subunit L1a does not move; the second lens subunit L1b moves on the optical axis; and the third lens subunit L1c does not move. The zoom lens of Embodiment 10 employs an inner focusing method that moves the second lens subunit L1b of the first lens unit L1 on the optical axis for focusing. The second lens subunit L1b moves to the image side on the optical axis for focusing from infinity to short distance. This reduces variations in aberration and angle of view due to focusing.

The zoom lens of Embodiment 10 includes a zoom ratio of 14.47 and an aperture ratio (F-number) of 1.90 to 2.80.

The first lens unit L1 of Embodiment 10 is composed of 11 lenses, including: a negative lens, a negative lens, a negative lens, a positive lens, a positive lens, a cemented lens of positive and negative lenses, a cemented lens of negative and positive lenses, a positive lens, and a positive lens. The first lens unit L1 is composed of three subunits. The first to fourth lenses from the front constitute the first lens subunit L1a; the fifth lens constitutes the second lens subunit L1b; and the sixth to eleventh lenses constitute the third lens subunit L1c. The first lens subunit L1a and third lens subunit L1c are always fixed for focusing. The second lens subunit L1b moves to the image side for focusing from infinity to short distance. The second lens unit L2 includes five lenses, including a negative lens, a negative lens, a cemented lens of positive and negative lenses, and a positive lens. The third lens unit L3 includes a cemented lens of negative and positive lenses. The first, second, and third lens units L1, L2, and L3 move for zooming. The fourth lens unit L4 includes a positive lens, a positive lens, a cemented lens of positive and negative lenses, a positive lens, a cemented lens of negative and positive lenses, a cemented lens of positive and negative lenses, and a positive lens. The fourth lens unit L4 includes a space to insert an extender lens unit to increase the focal length.

Embodiment Relating to Image Pickup Apparatus

Figure 21:
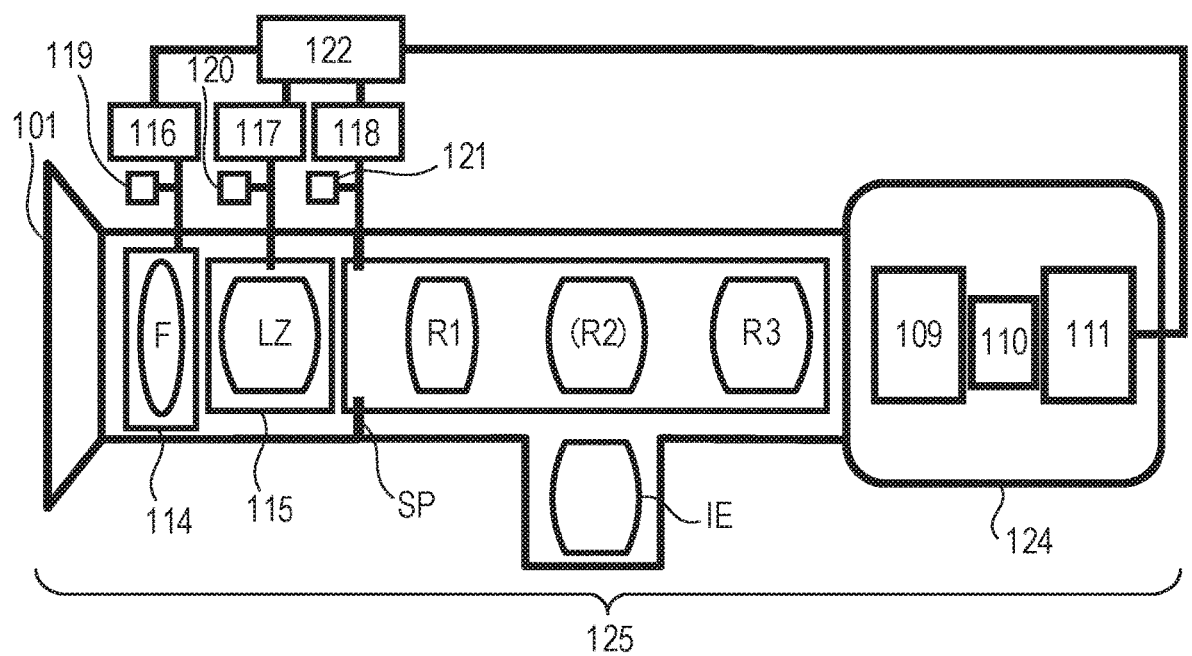
FIG. 21 is a schematic diagram of main part of the present invention.

Next, a description is given of an embodiment of a television camera (an image pickup apparatus) using the zoom lens of the present invention as an image pickup optical system with reference to FIG. 21. In FIG. 21, reference numeral 101 denotes a zoom lens of any one of Embodiments 1, 2 and 4 to 10. Reference numeral 124 denotes a camera. The zoom lens 101 is detachable from the camera 124. Reference numeral 125 denotes an image pickup apparatus including the camera 124 and the zoom lens 101 attached to the camera 124. The zoom lens 101 includes a first lens unit F, a zooming unit LZ, and imaging lens units R (lens units R1, R2, and R3). The first lens unit F includes a lens unit that moves for focusing.

The zooming unit LZ includes two or more lens units that move for zooming. On the image side of the zooming unit LZ, an aperture stop SP and lens units R are provided. The zoom lens 101 includes a lens unit IE that is removable from the optical path. The lens unit IE is inserted between the lens units R1 and R2 or between the lens units R1 and R3 to shift the focal length range of the entire system of the zoom lens 101.

Reference numerals 114 and 115 denote drive mechanisms, such as a helicoid or a cam, that drive the first lens unit F and zooming unit LZ along the optical axis, respectively. Reference numerals 116 to 118 denote motors (drivers) that electrically drive the drive mechanisms 114 and 115 and aperture stop SP, respectively.

Reference numerals 119 to 121 are detectors, such as an encoder, a potentiometer, or a photosensor, to detect the positions of the first lens unit F and zooming unit LZ on the optical axis and the aperture diameter of the aperture stop SP. In the camera 124, reference numeral 109 denotes a glass block corresponding to an optical filter or a color separation optical system within the camera 124. Reference numeral 110 denotes an image pickup element (a photoelectric conversion element), such as a CCD sensor or a CMOS sensor, that captures a subject's image formed by the zoom lens 101. Reference numerals 111 and 122 denote CPUs (controllers) that control various types of drives of the zoom lens 101 and camera 124, respectively.

By applying the zoom lens of the present invention to a television camera in such a manner, it is possible to implement an image pickup apparatus having a high optical performance.

Next, numerical data corresponding to Embodiments 1, 2, and 4 to 10 and Referential Example of the present invention are illustrated. The wide-angle end and telephoto end refer to zoom positions when the second lens unit L2 for zooming is located at both ends of the range in which the second lens unit L2 is movable on the optical axis. The same applies to all Embodiments. In data of each Numerical Embodiment, i indicates the order of the surface from the front, ri indicates a radius of curvature of the i-th lens surface from the front, di indicates a lens thickness or an air space between the i-th surface and (i+1)-th surface in order from the front, ndi, vdi, and θgFi are the refractive index, Abbe number, and partial dispersion ratio of the material of the lens between the i-th surface and (i+1)-th surface in order from the front, respectively, and BF is a back focus represented by the distance between the last lens surface and the image plane in air equivalent. The total lens length is the sum of the distance between the first lens surface and the last lens surface and back focus.

The aspherical shape in the aspherical surface data is expressed by the following expression. Herein, the optical axis is X axis, the axis orthogonal to the optical axis is H axis. The travel direction of light corresponds to the positive direction of the X axis. In addition, R is a paraxial curvature radius, k is a conical constant, and A3, A4, A5, A6, A7, A8, A9, A10, A11, and A12 are aspheric coefficients.

$$X = \frac{H^2/R}{1+\sqrt{1-(1+k)(H/R)^2}} + A3H^3 + A4H^4 + A5H^5 + A6H^6 + A7H^7 + A8H^8 + A9H^9 + A10H^{10} + A11H^{11} + A12H^{12}$$

In the aspherical surface data, [e-X] means $(\times 10^{-x})$. In addition to the specifications including the focal length and F-number, the following data include the half angle of view of the entire system and the image height as the maximum image height that determines the half angle of view. Lens unit data include the focal length of each lens unit.

"(variable)" for the distance d between optical surfaces means that the distance d varies for zooming. The distance d between the optical surfaces of interest are illustrated with the focal distances in a different table.

The calculation results of each Conditional Expression based on the lens data of the numerical data corresponding to Numerical Embodiments 1, 2, and 4 to 10 and Referential Example described below are illustrated in Table 1.

Numerical Embodiment 1

| [Unit mm] | | | | |
|---|---|---|---|---|
| Surface data | | | | |
| Surface number i | ri | di | ndi | vdi | θgFi |
| 1 | 82.406 | 2.5 | 1.7725 | 49.6 | 0.552 |
| 2 | 35.111 | 21.19 | | | |
| 3 | 354.167 | 1.8 | 1.6 | 62 | 0.5581 |
| 4 | 48.221 | 17.34 | | | |
| 5 | −71.699 | 1.7 | 1.95375 | 32.3 | 0.5898 |
| 6 | −2103.745 | 0.2 | | | |
| 7 | 177.749 | 11.73 | 1.78472 | 25.7 | 0.6161 |
| 8 | −76.687 | 0.62 | | | |
| 9 | −100.226 | 5.47 | 1.59522 | 67.7 | 0.5442 |
| 10* | −67.82 | 7.35 | | | |

-continued

[Unit mm]

| | | | | |
|---|---|---|---|---|
| 11 | −130.225 | 11.44 | 1.43875 | 94.9 | 0.534 |
| 12 | −43.997 | 1.65 | 1.85478 | 24.8 | 0.6122 |
| 13 | −61.268 | 0.15 | | | |
| 14 | 96.513 | 1.65 | 1.83403 | 37.2 | 0.5775 |
| 15 | 56.224 | 18.19 | 1.43875 | 94.9 | 0.534 |
| 16 | −64.343 | 0.2 | | | |
| 17 | 68.97 | 4.45 | 1.43387 | 95.1 | 0.5373 |
| 18 | 150.53 | 0.2 | | | |
| 19 | 46.381 | 6.33 | 1.43875 | 94.9 | 0.534 |
| 20 | 95.285 | (Variable) | | | |
| 21 | 31.068 | 0.8 | 1.95375 | 32.3 | 0.5898 |
| 22 | 17.041 | 2.2 | | | |
| 23 | 35.689 | 0.8 | 1.883 | 40.8 | 0.5667 |
| 24 | 15.881 | 4.26 | | | |
| 25 | −108.872 | 3.88 | 1.80518 | 25.4 | 0.6161 |
| 26 | −12.611 | 0.85 | 1.883 | 40.8 | 0.5667 |
| 27 | 132.699 | 1.77 | | | |
| 28 | 29.179 | 2.14 | 1.64769 | 33.8 | 0.5884 |
| 29 | 235.555 | (Variable) | | | |
| 30 | −23.688 | 0.8 | 1.734 | 51.5 | 0.5484 |
| 31 | 61.319 | 1.76 | 1.8081 | 22.8 | 0.637 |
| 32 | −122.616 | (Variable) | | | |
| 33(stop) | ∞ | 1.39 | | | |
| 34 | −645.344 | 2.71 | 1.67003 | 47.2 | 0.5627 |
| 35 | −49.989 | 0.16 | | | |
| 36 | 666.614 | 2.34 | 1.62041 | 60.3 | 0.5427 |
| 37 | −132.432 | 0.16 | | | |
| 38 | 171.996 | 6.22 | 1.51633 | 64.1 | 0.5353 |
| 39 | −28.413 | 1 | 1.883 | 40.8 | 0.5667 |
| 40 | −61.925 | 28 | | | |
| 41 | 52.217 | 6.58 | 1.56732 | 42.8 | 0.5731 |
| 42 | −52.954 | 2.03 | | | |
| 43 | −145.518 | 1 | 1.883 | 40.8 | 0.5667 |
| 44 | 23.148 | 7.44 | 1.48749 | 70.2 | 0.53 |
| 45 | −104.401 | 0.36 | | | |
| 46 | 317.592 | 7.53 | 1.497 | 81.5 | 0.5375 |
| 47 | −19.722 | 1 | 1.883 | 40.8 | 0.5667 |
| 48 | −60.153 | 0.29 | | | |
| 49 | 70.582 | 6.01 | 1.497 | 81.5 | 0.5375 |
| 50 | −33.753 | 4.16 | | | |
| 51 | ∞ | 33 | 1.60859 | 46.4 | 0.5664 |
| 52 | ∞ | 13.2 | 1.51633 | 64.1 | 0.5353 |
| 53 | ∞ | 4.95 | | | |

Aspheric surface data
10th surface

K = −9.13230e−001
A4 = −1.61022e−007
A6 = −8.59771e−011
A8 = 1.62638e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

Various data
Zoom ratio 14.71

| | Wide angle | Middle | Telephoto |
|---|---|---|---|
| Focal length | 4.49 | 13.02 | 65.00 |
| F-number | 1.90 | 1.90 | 2.80 |
| Angle of view (deg) | 50.76 | 22.90 | 4.84 |
| Image height | 5.50 | 5.50 | 5.50 |
| Total lens length | 317.45 | 317.45 | 317.45 |
| BF | 4.95 | 4.95 | 4.95 |
| d20 | 0.55 | 27.55 | 45.74 |
| d29 | 39.55 | 9.69 | 7.95 |
| d32 | 14.40 | 17.26 | 0.81 |

-continued

[Unit mm]

Zoom lens unit data

| Unit | Start surface | Focal length |
|---|---|---|
| 1 | 1 | 30.01 |
| 2 | 21 | −18.67 |
| 3 | 30 | −43.70 |
| 4 | 33 | 51.20 |

Numerical Embodiment 2

[Unit mm]

Surface data

| Surface number i | ri | di | ndi | vdi | θgFi |
|---|---|---|---|---|---|
| 1 | 72.298 | 2.5 | 1.5941 | 60.5 | 0.5551 |
| 2 | 32.684 | 21.16 | | | |
| 3 | 217.239 | 1.8 | 1.65 | 65.5 | 0.5451 |
| 4 | 37.107 | 18.24 | | | |
| 5 | −64.13 | 1.7 | 1.95375 | 32.3 | 0.5898 |
| 6 | −16624.943 | 0.2 | | | |
| 7 | 208.416 | 9.19 | 1.78472 | 25.7 | 0.6161 |
| 8 | −80.825 | 0.7 | | | |
| 9 | −101.289 | 4.87 | 1.59522 | 67.7 | 0.5442 |
| 10* | −57.936 | 3.88 | | | |
| 11 | −175.243 | 11.75 | 1.43875 | 94.9 | 0.534 |
| 12 | −43.87 | 1.65 | 1.85478 | 24.8 | 0.6122 |
| 13 | −54.893 | 0.17 | | | |
| 14 | 124.137 | 1.65 | 1.83403 | 37.2 | 0.5775 |
| 15 | 57.512 | 22.72 | 1.43875 | 94.9 | 0.534 |
| 16 | −53.206 | 0.2 | | | |
| 17 | 88.658 | 3.64 | 1.43387 | 95.1 | 0.5373 |
| 18 | 177.37 | 0.2 | | | |
| 19 | 39.542 | 6.56 | 1.43875 | 94.9 | 0.534 |
| 20 | 73.348 | (Variable) | | | |
| 21 | 34.464 | 0.8 | 1.95375 | 32.3 | 0.5898 |
| 22 | 13.516 | 3.44 | | | |
| 23 | 96.224 | 0.8 | 1.883 | 40.8 | 0.5667 |
| 24 | 33.727 | 2.62 | | | |
| 25 | −78.981 | 3.46 | 1.80518 | 25.4 | 0.6161 |
| 26 | −12.43 | 0.85 | 1.883 | 40.8 | 0.5667 |
| 27 | 174.647 | 1.61 | | | |
| 28 | 34.352 | 2.4 | 1.64769 | 33.8 | 0.5884 |
| 29 | −127.54 | (Variable) | | | |
| 30 | −23.616 | 0.8 | 1.734 | 51.5 | 0.5484 |
| 31 | 55.197 | 1.86 | 1.8081 | 22.8 | 0.637 |
| 32 | −127.729 | (Variable) | | | |
| 33(stop) | ∞ | 1.31 | | | |
| 34 | −1888.387 | 2.73 | 1.67003 | 47.2 | 0.5627 |
| 35 | −54.601 | 0.16 | | | |
| 36 | 859.7 | 2.01 | 1.62041 | 60.3 | 0.5427 |
| 37 | −125.138 | 0.16 | | | |
| 38 | 151.841 | 6.33 | 1.51633 | 64.1 | 0.5353 |
| 39 | −29.569 | 1 | 1.883 | 40.8 | 0.5667 |
| 40 | −64.18 | 28 | | | |
| 41 | 57.163 | 6.45 | 1.56732 | 42.8 | 0.5731 |
| 42 | −56.521 | 2.03 | | | |
| 43 | −177.736 | 1 | 1.883 | 40.8 | 0.5667 |
| 44 | 22.697 | 8.78 | 1.48749 | 70.2 | 0.53 |
| 45 | −95.714 | 0.36 | | | |
| 46 | 121.296 | 8.8 | 1.497 | 81.5 | 0.5375 |
| 47 | −21.254 | 1 | 1.883 | 40.8 | 0.5667 |
| 48 | −73.398 | 0.29 | | | |
| 49 | 92.324 | 8.67 | 1.497 | 81.5 | 0.5375 |
| 50 | −32.125 | 4.16 | | | |
| 51 | ∞ | 33 | 1.60859 | 46.4 | 0.5664 |
| 52 | ∞ | 13.2 | 1.51633 | 64.1 | 0.5353 |
| 53 | ∞ | 4.97 | | | |
| Image plane | ∞ | | | | |

-continued

[Unit mm]

Aspheric surface data
10th surface

K = −1.08206e+000
A4 = −1.76917e−007
A6 = −3.93439e−011
A8 = 1.96300e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

Various data
Zoom ratio 14.46

|  | Wide angle | Middle | Telephoto |
| --- | --- | --- | --- |
| Focal length | 4.49 | 12.62 | 65.00 |
| F-number | 1.90 | 1.90 | 2.80 |
| Angle of view (deg) | 50.74 | 23.55 | 4.84 |
| Image height | 5.50 | 5.50 | 5.50 |
| Total lens length | 320.13 | 320.13 | 320.13 |
| BF | 4.97 | 4.97 | 4.97 |
| d20 | 0.61 | 27.61 | 46.84 |
| d29 | 39.27 | 9.54 | 6.68 |
| d32 | 14.41 | 17.14 | 0.78 |

Zoom lens unit data

| Unit | Start surface | Focal length |
| --- | --- | --- |
| 1 | 1 | 29.80 |
| 2 | 21 | −19.22 |
| 3 | 30 | −43.27 |
| 4 | 33 | 55.04 |

Numerical Data Corresponding to Referential Example

[Unit mm]

Surface data

| Surface number i | ri | di | ndi | vdi | θgFi |
| --- | --- | --- | --- | --- | --- |
| 1 | 82.499 | 2.5 | 1.7725 | 49.6 | 0.552 |
| 2 | 34.36 | 22.05 |  |  |  |
| 3 | 8268.103 | 1.8 | 1.48116 | 80.2 | 0.5451 |
| 4 | 47.365 | 17.25 |  |  |  |
| 5 | −67.144 | 1.7 | 1.95375 | 32.3 | 0.5898 |
| 6 | −5299.833 | 0.2 |  |  |  |
| 7 | 184.647 | 11.68 | 1.78472 | 25.7 | 0.6161 |
| 8 | −73.766 | 0.61 |  |  |  |
| 9 | −112.95 | 4.49 | 1.59522 | 67.7 | 0.5442 |
| 10* | −69.725 | 6.31 |  |  |  |
| 11 | −139.392 | 11.88 | 1.43875 | 94.9 | 0.534 |
| 12 | −43.082 | 1.65 | 1.85478 | 24.8 | 0.6122 |
| 13 | −60.506 | 0.14 |  |  |  |
| 14 | 93.651 | 1.65 | 1.83403 | 37.2 | 0.5775 |
| 15 | 55.134 | 18.47 | 1.43875 | 94.9 | 0.534 |
| 16 | −64.585 | 0.2 |  |  |  |
| 17 | 65.604 | 6.07 | 1.43387 | 95.1 | 0.5373 |
| 18 | 253.492 | 0.2 |  |  |  |
| 19 | 41.521 | 4.91 | 1.43875 | 94.9 | 0.534 |
| 20 | 62.97 | (Variable) |  |  |  |
| 21 | 28.093 | 0.8 | 1.95375 | 32.3 | 0.5898 |
| 22 | 13.62 | 3.5 |  |  |  |
| 23 | 62.666 | 0.8 | 1.883 | 40.8 | 0.5667 |
| 24 | 23.579 | 3.01 |  |  |  |
| 25 | −158.173 | 3.81 | 1.80518 | 25.4 | 0.6161 |
| 26 | −12.556 | 0.85 | 1.883 | 40.8 | 0.5667 |
| 27 | 178.779 | 2.8 |  |  |  |
| 28 | 30.531 | 1.98 | 1.64769 | 33.8 | 0.5884 |
| 29 | 162.946 | (Variable) |  |  |  |
| 30 | −23.324 | 0.8 | 1.734 | 51.5 | 0.5484 |
| 31 | 57.126 | 1.84 | 1.8081 | 22.8 | 0.637 |
| 32 | −114.921 | (Variable) |  |  |  |
| 33(stop) | ∞ | 1.33 |  |  |  |
| 34 | −922.38 | 2.62 | 1.67003 | 47.2 | 0.5627 |
| 35 | −55.466 | 0.16 |  |  |  |
| 36 | −1696.658 | 2.13 | 1.62041 | 60.3 | 0.5427 |
| 37 | −90.377 | 0.16 |  |  |  |
| 38 | 166.218 | 6.36 | 1.51633 | 64.1 | 0.5353 |
| 39 | −28.453 | 1 | 1.883 | 40.8 | 0.5667 |
| 40 | −58.984 | 28 |  |  |  |
| 41 | 56.175 | 6.47 | 1.56732 | 42.8 | 0.5731 |
| 42 | −51.009 | 2.03 |  |  |  |
| 43 | −112.172 | 1 | 1.883 | 40.8 | 0.5667 |
| 44 | 22.128 | 8.69 | 1.48749 | 70.2 | 0.53 |
| 45 | −86.773 | 0.36 |  |  |  |
| 46 | 561.927 | 8.6 | 1.497 | 81.5 | 0.5375 |
| 47 | −19.149 | 1 | 1.883 | 40.8 | 0.5667 |
| 48 | −51.081 | 0.29 |  |  |  |
| 49 | 89.796 | 8.78 | 1.497 | 81.5 | 0.5375 |
| 50 | −30.885 | 4.16 |  |  |  |
| 51 | ∞ | 33 | 1.60859 | 46.4 | 0.5664 |
| 52 | ∞ | 13.2 | 1.51633 | 64.1 | 0.5353 |
| 53 | ∞ | 4.96 |  |  |  |
| Image plane | ∞ |  |  |  |  |

Aspheric surface data
10th surface

K = −1.17228e+000
A 4 = −2.17647e−007
A 6 = −8.18092e−011
A 8 = 1.16024e−014
A10 = −8.06400e−018
A12 = −4.86400e−020
A 3 = 1.44200e−007
A 5 = 1.52600e−009
A 7 = 1.69200e−012
A 9 = 7.68500e−017
A11 = 6.95900e−019

Various data
Zoom ratio 14.46

|  | Wide angle | Middle | Telephoto |
| --- | --- | --- | --- |
| Focal length | 4.50 | 13.78 | 65.00 |
| F-number | 1.90 | 1.90 | 2.80 |
| Angle of view (deg) | 50.74 | 21.76 | 4.84 |
| Image height | 5.50 | 5.50 | 5.50 |
| Total lens length | 321.69 | 321.69 | 321.69 |
| BF | 4.96 | 4.96 | 4.96 |
| d20 | 0.64 | 27.64 | 43.75 |
| d29 | 38.43 | 8.85 | 8.99 |
| d32 | 14.39 | 16.97 | 0.72 |

Zoom lens unit data

| Unit | Start surface | Focal length |
| --- | --- | --- |
| 1 | 1 | 28.85 |
| 2 | 21 | −18.23 |
| 3 | 30 | −43.85 |
| 4 | 33 | 57.48 |

Numerical Embodiment 4

[Unit mm]

Surface data

| Surface number i | ri | di | ndi | vdi | θgFi |
|---|---|---|---|---|---|
| 1 | 70.339 | 2.5 | 1.61 | 66.6 | 0.5897 |
| 2 | 33.71 | 20.24 | | | |
| 3 | 167.697 | 1.8 | 1.816 | 46.6 | 0.5568 |
| 4 | 39.356 | 18.5 | | | |
| 5 | −62.867 | 1.7 | 1.95375 | 32.3 | 0.5898 |
| 6 | −699.551 | 0.2 | | | |
| 7 | 239.408 | 10.45 | 1.78472 | 25.7 | 0.6161 |
| 8 | −70.107 | 0.64 | | | |
| 9 | −95.928 | 3.84 | 1.59522 | 67.7 | 0.5442 |
| 10* | −65.395 | 5.16 | | | |
| 11 | −241.588 | 12.09 | 1.43875 | 94.9 | 0.534 |
| 12 | −45.461 | 1.65 | 1.85478 | 24.8 | 0.6122 |
| 13 | −58.659 | 0.84 | | | |
| 14 | 131.538 | 1.65 | 1.83403 | 37.2 | 0.5775 |
| 15 | 59.692 | 21.95 | 1.43875 | 94.9 | 0.534 |
| 16 | −55.214 | 0.2 | | | |
| 17 | 81.945 | 3.85 | 1.43387 | 95.1 | 0.5373 |
| 18 | 165.152 | 0.2 | | | |
| 19 | 41.86 | 6.59 | 1.43875 | 94.9 | 0.534 |
| 20 | 82.895 | (Variable) | | | |
| 21 | 36.822 | 0.8 | 1.95375 | 32.3 | 0.5898 |
| 22 | 14.104 | 3.34 | | | |
| 23 | 93.04 | 0.8 | 1.883 | 40.8 | 0.5667 |
| 24 | 33.798 | 2.59 | | | |
| 25 | −92.124 | 3.64 | 1.80518 | 25.4 | 0.6161 |
| 26 | −12.428 | 0.85 | 1.883 | 40.8 | 0.5667 |
| 27 | 182.558 | 1.85 | | | |
| 28 | 34.863 | 2.3 | 1.64769 | 33.8 | 0.5884 |
| 29 | −188.485 | (Variable) | | | |
| 30 | −23.743 | 0.8 | 1.734 | 51.5 | 0.5484 |
| 31 | 55.933 | 1.85 | 1.8081 | 22.8 | 0.637 |
| 32 | −134.659 | (Variable) | | | |
| 33(stop) | ∞ | 1.3 | | | |
| 34 | −4874.468 | 2.8 | 1.67003 | 47.2 | 0.5627 |
| 35 | −53.366 | 0.16 | | | |
| 36 | 295.494 | 2.45 | 1.62041 | 60.3 | 0.5427 |
| 37 | −176.776 | 0.16 | | | |
| 38 | 171.554 | 6.18 | 1.51633 | 64.1 | 0.5353 |
| 39 | −30.185 | 1 | 1.883 | 40.8 | 0.5667 |
| 40 | −66.14 | 28 | | | |
| 41 | 54.888 | 6.46 | 1.56732 | 42.8 | 0.5731 |
| 42 | −58.387 | 2.03 | | | |
| 43 | −190.825 | 1 | 1.883 | 40.8 | 0.5667 |
| 44 | 22.773 | 8.7 | 1.48749 | 70.2 | 0.53 |
| 45 | −107.226 | 0.36 | | | |
| 46 | 113.822 | 8.87 | 1.497 | 81.5 | 0.5375 |
| 47 | −21.02 | 1 | 1.883 | 40.8 | 0.5667 |
| 48 | −72.927 | 0.29 | | | |
| 49 | 91.482 | 8.67 | 1.497 | 81.5 | 0.5375 |
| 50 | −32.077 | 4.16 | | | |
| 51 | ∞ | 33 | 1.60859 | 46.4 | 0.5664 |
| 52 | ∞ | 13.2 | 1.51633 | 64.1 | 0.5353 |
| 53 | ∞ | 4.95 | | | |
| Image plane | ∞ | | | | |

Aspheric surface data
10th surface

K = −1.04833e+000
A4 = −1.20215e−007
A6 = −5.38123e−011
A8 = 2.28021e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

[Unit mm]

Various data
Zoom ratio 14.47

| | Wide angle | Middle | Telephoto |
|---|---|---|---|
| Focal length | 4.49 | 12.36 | 65.00 |
| F-number | 1.90 | 1.90 | 2.80 |
| Angle of view (deg) | 50.77 | 23.98 | 4.84 |
| Image height | 5.50 | 5.50 | 5.50 |
| Total lens length | 322.26 | 322.26 | 322.26 |
| BF | 4.95 | 4.95 | 4.95 |
| d20 | 0.62 | 27.62 | 47.64 |
| d29 | 39.56 | 9.86 | 6.16 |
| d32 | 14.44 | 17.15 | 0.82 |

Zoom lens unit data

| Unit | Start surface | Focal length |
|---|---|---|
| 1 | 1 | 30.14 |
| 2 | 21 | −19.52 |
| 3 | 30 | −42.91 |
| 4 | 33 | 55.11 |

Numerical Embodiment 5

[Unit mm]

Surface data

| Surface number i | ri | di | ndi | vdi | θgFi |
|---|---|---|---|---|---|
| 1 | 69.475 | 2.5 | 1.7725 | 49.6 | 0.552 |
| 2 | 33.196 | 22.53 | | | |
| 3 | 383.131 | 1.8 | 1.65 | 55 | 0.5784 |
| 4 | 46.518 | 18.03 | | | |
| 5 | −61.278 | 1.7 | 1.62 | 64 | 0.5581 |
| 6 | −1632.221 | 0.2 | | | |
| 7 | 170.134 | 10.15 | 1.6398 | 34.5 | 0.5922 |
| 8 | −91.834 | 0.65 | | | |
| 9 | −117.331 | 4.74 | 1.59522 | 67.7 | 0.5442 |
| 10* | −68.469 | 5.09 | | | |
| 11 | −2154.454 | 11.13 | 1.43875 | 94.9 | 0.534 |
| 12 | −63.404 | 1.65 | 1.90366 | 31.3 | 0.5946 |
| 13 | −68.577 | 2.59 | | | |
| 14 | 133.305 | 1.65 | 2.001 | 29.1 | 0.5997 |
| 15 | 61.517 | 19.5 | 1.43875 | 94.9 | 0.534 |
| 16 | −60.184 | 0.2 | | | |
| 17 | 59.235 | 3.89 | 1.43387 | 95.1 | 0.5373 |
| 18 | 98.298 | 0.2 | | | |
| 19 | 39.66 | 5.82 | 1.43875 | 94.9 | 0.534 |
| 20 | 69.236 | (Variable) | | | |
| 21 | 39.423 | 0.8 | 1.95375 | 32.3 | 0.5898 |
| 22 | 18.904 | (Variable) | | | |
| 23 | 30.17 | 0.8 | 1.883 | 40.8 | 0.5667 |
| 24 | 13.285 | 5.75 | | | |
| 25 | −34.483 | 3.33 | 1.8081 | 22.8 | 0.637 |
| 26 | −15.137 | 0.85 | 1.883 | 40.8 | 0.5667 |
| 27 | 364.489 | −0.25 | | | |
| 28 | 32.683 | 2.99 | 1.64769 | 33.8 | 0.5884 |
| 29 | −46.401 | (Variable) | | | |
| 30 | −24.128 | 0.8 | 1.734 | 51.5 | 0.5484 |
| 31 | 55.406 | 1.79 | 1.8081 | 22.8 | 0.637 |
| 32 | −136.524 | (Variable) | | | |
| 33(stop) | ∞ | 1.28 | | | |
| 34 | −2573.742 | 2.8 | 1.67003 | 47.2 | 0.5627 |
| 35 | −49.764 | 0.16 | | | |
| 36 | 245.391 | 2.11 | 1.62041 | 60.3 | 0.5427 |
| 37 | −299.292 | 0.16 | | | |
| 38 | 150.335 | 6.06 | 1.51633 | 64.1 | 0.5353 |
| 39 | −30.02 | 1 | 1.883 | 40.8 | 0.5667 |
| 40 | −66.021 | 28 | | | |
| 41 | 49.868 | 6.31 | 1.56732 | 42.8 | 0.5731 |
| 42 | −63.723 | 2.03 | | | |

-continued

[Unit mm]

| | | | | | |
|---|---|---|---|---|---|
| 43 | −384.6 | 1 | 1.883 | 40.8 | 0.5667 |
| 44 | 20.866 | 8.22 | 1.48749 | 70.2 | 0.53 |
| 45 | −121.266 | 0.36 | | | |
| 46 | 277.2 | 4.95 | 1.497 | 81.5 | 0.5375 |
| 47 | −19.882 | 1 | 1.883 | 40.8 | 0.5667 |
| 48 | −62.644 | 0.29 | | | |
| 49 | 79.921 | 8.86 | 1.497 | 81.5 | 0.5375 |
| 50 | −30.756 | 4.16 | | | |
| 51 | ∞ | 33 | 1.60859 | 46.4 | 0.5664 |
| 52 | ∞ | 13.2 | 1.51633 | 64.1 | 0.5353 |
| 53 | ∞ | 4.97 | | | |
| Image plane | ∞ | | | | |

Aspheric surface data
10th surface

K = −1.06487e+000
A4 = −5.74176e−008
A6 = −1.41818e−010
A8 = 7.31155e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

Various data
Zoom ratio 14.47

| | Wide angle | Middle | Telephoto |
|---|---|---|---|
| Focal length | 4.49 | 12.58 | 65.00 |
| F-number | 1.90 | 1.90 | 2.80 |
| Angle of view (deg) | 50.76 | 23.62 | 4.84 |
| Image height | 5.50 | 5.50 | 5.50 |
| Total lens length | 316.09 | 316.09 | 316.09 |
| BF | 4.97 | 4.97 | 4.97 |
| d20 | 0.48 | 27.68 | 47.38 |
| d22 | 1.65 | 1.45 | 1.30 |
| d29 | 39.16 | 9.22 | 5.81 |
| d32 | 13.97 | 16.91 | 0.76 |

Zoom lens unit data

| Unit | Start surface | Focal length |
|---|---|---|
| 1 | 1 | 30.83 |
| 2 | 21 | −38.82 |
| 3 | 23 | −35.60 |
| 4 | 30 | −43.68 |
| 5 | 33 | 52.25 |

Numerical Embodiment 6

[Unit mm]

Surface data

| Surface number i | ri | di | ndi | vdi | θgFi |
|---|---|---|---|---|---|
| 1 | 69.679 | 2.5 | 1.7725 | 49.6 | 0.552 |
| 2 | 33.182 | 22.59 | | | |
| 3 | 398.884 | 1.8 | 1.62 | 64 | 0.5581 |
| 4 | 45.488 | 18.06 | | | |
| 5 | −61.57 | 1.7 | 1.65 | 55 | 0.5784 |
| 6 | −1703.311 | 0.2 | | | |
| 7 | 173.125 | 10.05 | 1.6398 | 34.5 | 0.5922 |
| 8 | −91.05 | 0.59 | | | |
| 9 | −117.139 | 4.75 | 1.59522 | 67.7 | 0.5442 |
| 10* | −67.842 | 4.88 | | | |
| 11 | −1952.68 | 10.94 | 1.43875 | 94.9 | 0.534 |

-continued

[Unit mm]

| | | | | | |
|---|---|---|---|---|---|
| 12 | −64.688 | 1.65 | 1.90366 | 31.3 | 0.5946 |
| 13 | −68.741 | 2.58 | | | |
| 14 | 132.708 | 1.65 | 2.001 | 29.1 | 0.5997 |
| 15 | 61.552 | 19.74 | 1.43875 | 94.9 | 0.534 |
| 16 | −59.605 | 0.2 | | | |
| 17 | 59.509 | 3.84 | 1.43387 | 95.1 | 0.5373 |
| 18 | 99.194 | 0.2 | | | |
| 19 | 39.562 | 5.82 | 1.43875 | 94.9 | 0.534 |
| 20 | 68.479 | (Variable) | | | |
| 21 | 39.939 | 0.8 | 1.95375 | 32.3 | 0.5898 |
| 22 | 19.201 | 1.33 | | | |
| 23 | 29.851 | 0.8 | 1.883 | 40.8 | 0.5667 |
| 24 | 13.283 | (Variable) | | | |
| 25 | −36.378 | 2.79 | 1.8081 | 22.8 | 0.637 |
| 26 | −15.364 | 0.85 | 1.883 | 40.8 | 0.5667 |
| 27 | 269.034 | −0.27 | | | |
| 28 | 31.248 | 3.86 | 1.64769 | 33.8 | 0.5884 |
| 29 | −49.947 | (Variable) | | | |
| 30 | −24.251 | 0.8 | 1.734 | 51.5 | 0.5484 |
| 31 | 48.41 | 1.81 | 1.8081 | 22.8 | 0.637 |
| 32 | −166.637 | (Variable) | | | |
| 33(stop) | ∞ | 1.35 | | | |
| 34 | −1292.268 | 2.72 | 1.67003 | 47.2 | 0.5627 |
| 35 | −51.439 | 0.16 | | | |
| 36 | 319.414 | 1.86 | 1.62041 | 60.3 | 0.5427 |
| 37 | −204.71 | 0.16 | | | |
| 38 | 129.607 | 6.09 | 1.51633 | 64.1 | 0.5353 |
| 39 | −30.536 | 1 | 1.883 | 40.8 | 0.5667 |
| 40 | −66.734 | 28 | | | |
| 41 | 50.184 | 6.26 | 1.56732 | 42.8 | 0.5731 |
| 42 | −64.056 | 2.03 | | | |
| 43 | −366.276 | 1 | 1.883 | 40.8 | 0.5667 |
| 44 | 20.96 | 6.95 | 1.48749 | 70.2 | 0.53 |
| 45 | −125.781 | 0.36 | | | |
| 46 | 254.951 | 4.98 | 1.497 | 81.5 | 0.5375 |
| 47 | −19.762 | 1 | 1.883 | 40.8 | 0.5667 |
| 48 | −61.821 | 0.29 | | | |
| 49 | 80.291 | 8.88 | 1.497 | 81.5 | 0.5375 |
| 50 | −30.664 | 4.16 | | | |
| 51 | ∞ | 33 | 1.60859 | 46.4 | 0.5664 |
| 52 | ∞ | 13.2 | 1.51633 | 64.1 | 0.5353 |
| 53 | ∞ | 4.97 | | | |
| Image plane | ∞ | | | | |

Aspheric surface data
10th surface

K = −9.70096e−001
A4 = −1.78386e−008
A6 = −1.38943e−010
A8 = 7.02405e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

Various data
Zoom ratio 14.46

| | Wide angle | Middle | Telephoto |
|---|---|---|---|
| Focal length | 4.49 | 12.56 | 65.00 |
| F-number | 1.90 | 1.90 | 2.80 |
| Angle of view (deg) | 50.74 | 23.64 | 4.84 |
| Image height | 5.50 | 5.50 | 5.50 |
| Total lens length | 314.35 | 314.35 | 314.35 |
| BF | 4.97 | 4.97 | 4.97 |
| d20 | 0.52 | 27.58 | 47.19 |
| d24 | 5.73 | 5.86 | 5.96 |
| d29 | 39.14 | 9.23 | 5.43 |
| d32 | 14.02 | 16.72 | 0.82 |

[Unit mm]

Zoom lens unit data

| Unit | Start surface | Focal length |
|---|---|---|
| 1 | 1 | 30.73 |
| 2 | 21 | −15.89 |
| 3 | 25 | 218.80 |
| 4 | 30 | −42.27 |
| 5 | 33 | 50.94 |

Numerical Embodiment 7

[Unit mm]

Surface data

| Surface number i | ri | di | ndi | vdi | θgFi |
|---|---|---|---|---|---|
| 1 | 1393.075 | 3.2 | 1.7725 | 49.6 | 0.552 |
| 2 | 64.961 | 23.37 | | | |
| 3 | −185.603 | 2.7 | 1.48107 | 80 | 0.5491 |
| 4 | 342.873 | 0.19 | | | |
| 5 | 103.302 | 6.2 | 1.92286 | 20.9 | 0.6282 |
| 6 | 174.073 | 4.69 | | | |
| 7 | 283.76 | 13.44 | 1.60311 | 60.6 | 0.5415 |
| 8* | −130.894 | 0.19 | | | |
| 9 | 1018.057 | 9.48 | 1.497 | 81.5 | 0.5375 |
| 10 | −117.312 | 2.5 | 1.8 | 29.8 | 0.617 |
| 11 | −888.28 | 11.4 | | | |
| 12 | 156.369 | 2.5 | 1.738 | 32.3 | 0.5899 |
| 13 | 57.423 | 18.56 | 1.497 | 81.5 | 0.5375 |
| 14 | −203.72 | 0.2 | | | |
| 15 | 76.551 | 10.9 | 1.53775 | 74.7 | 0.5392 |
| 16 | −1600.77 | 0.2 | | | |
| 17 | 103.61 | 5.84 | 1.76385 | 48.5 | 0.5587 |
| 18 | 312.199 | (Variable) | | | |
| 19* | 61.821 | 1.2 | 1.883 | 40.8 | 0.5667 |
| 20 | 17.619 | 5.58 | | | |
| 21 | −108.819 | 3.98 | 1.84666 | 23.8 | 0.6198 |
| 22 | −23.79 | 0.7 | 1.7725 | 49.6 | 0.552 |
| 23 | −104.343 | 2.24 | | | |
| 24 | −25.043 | 0.7 | 1.72916 | 54.7 | 0.5444 |
| 25 | 149.048 | 0.16 | | | |
| 26 | 52.478 | 3.97 | 1.65412 | 39.7 | 0.5737 |
| 27 | −74.712 | (Variable) | | | |
| 28 | −33.563 | 0.9 | 1.6516 | 58.5 | 0.5425 |
| 29 | 118.11 | 2.32 | 1.8081 | 22.8 | 0.637 |
| 30 | −429.292 | (Variable) | | | |
| 31(stop) | ∞ | 1.29 | | | |
| 32 | 873.73 | 4.44 | 1.755 | 52.3 | 0.5475 |
| 33 | −59.354 | 0.2 | | | |
| 34 | 66.289 | 5.11 | 1.618 | 63.3 | 0.5441 |
| 35 | −205.049 | 0.2 | | | |
| 36 | 60.805 | 5.36 | 1.497 | 81.5 | 0.5375 |
| 37 | −163.751 | 1.2 | 2.001 | 29.1 | 0.5997 |
| 38 | 205.794 | 0.2 | | | |
| 39 | 40.982 | 10.68 | 1.51633 | 64.1 | 0.5353 |
| 40 | −52.808 | 1.1 | 1.7725 | 49.6 | 0.552 |
| 41 | 76.694 | 20.29 | | | |
| 42 | 40.913 | 5.11 | 1.48749 | 70.2 | 0.53 |
| 43 | −48.216 | 0.2 | | | |
| 44 | 25.592 | 5.57 | 1.48749 | 70.2 | 0.53 |
| 45 | −41.357 | 1 | 2.00069 | 25.5 | 0.6133 |
| 46 | 22.831 | 2.83 | | | |
| 47 | 674.962 | 7.07 | 1.8081 | 22.8 | 0.637 |
| 48 | −14.602 | 1 | 1.883 | 40.8 | 0.5667 |
| 49 | 1119.205 | 6 | | | |
| 50 | 33.313 | 4.75 | 1.48749 | 70.2 | 0.53 |
| 51 | −962.957 | 37.79 | | | |
| Image plane | ∞ | | | | |

[Unit mm]

Aspheric surface data

8th surface

K = 1.37427e+000
A4 = 2.03315e−007
A6 = 7.81593e−013
A8 = −3.64353e−014
A10 = 6.96153e−017
A12 = −6.51269e−020
A14 = 2.94208e−023
A16 = −5.16095e−027

19th surface

K = 3.39569e+000
A4 = 1.78510e−006
A6 = −1.45592e−008
A8 = 7.74769e−011
A10 = −5.56554e−013
A12 = 2.52398e−015
A14 = −6.78830e−018
A16 = 8.32703e−021

Various data
Zoom ratio 8.00

| | Wide angle | Middle | Telephoto |
|---|---|---|---|
| Focal length | 20.00 | 70.00 | 160.00 |
| F-number | 2.79 | 2.79 | 3.59 |
| Angle of view (deg) | 37.87 | 12.52 | 5.55 |
| Image height | 15.55 | 15.55 | 15.55 |
| Total lens length | 310.08 | 310.08 | 310.08 |
| BF | 37.79 | 37.79 | 37.79 |
| d18 | 0.68 | 33.23 | 44.34 |
| d27 | 41.32 | 5.84 | 6.14 |
| d30 | 9.40 | 12.33 | 0.93 |

Zoom lens unit data

| Unit | Start surface | Focal length |
|---|---|---|
| 1 | 1 | 52.10 |
| 2 | 19 | −21.50 |
| 3 | 28 | −62.00 |
| 4 | 31 | 34.56 |

Numerical Embodiment 8

[Unit mm]

Surface data

| Surface number i | ri | di | ndi | vdi | θgFi |
|---|---|---|---|---|---|
| 1 | 2165.673 | 4.7 | 1.7725 | 49.6 | 0.552 |
| 2 | 158.219 | 36.35 | | | |
| 3 | −312.199 | 4.5 | 1.55 | 56.8 | 0.5581 |
| 4 | 534.879 | 0.15 | | | |
| 5 | 307.958 | 9.28 | 1.71736 | 29.5 | 0.5985 |
| 6 | 787.319 | 10 | | | |
| 7 | −1619.186 | 14 | 1.497 | 81.5 | 0.5375 |
| 8 | −254.291 | 0.2 | | | |
| 9 | 3542.539 | 4.4 | 1.80518 | 25.4 | 0.61 |
| 10 | 309.658 | 15 | 1.497 | 81.5 | 0.5375 |
| 11 | −564.751 | 43.18 | | | |
| 12 | 499.717 | 17.08 | 1.497 | 81.5 | 0.5375 |
| 13 | −277.071 | 0.15 | | | |
| 14 | 433.388 | 12.43 | 1.43875 | 94.9 | 0.534 |
| 15 | −658.639 | 0.15 | | | |
| 16 | 329.715 | 8.64 | 1.59522 | 67.7 | 0.5442 |
| 17 | 1546.906 | (Variable) | | | |
| 18* | 557.32 | 1.5 | 1.7725 | 49.6 | 0.552 |

-continued

[Unit mm]

| | | | | | |
|---|---|---|---|---|---|
| 19 | 87.579 | 5.64 | | | |
| 20 | 294.422 | 1.5 | 1.72916 | 54.7 | 0.5444 |
| 21 | 34.832 | 10.46 | 1.84666 | 23.8 | 0.625 |
| 22 | 96.973 | 6.11 | | | |
| 23 | -172.038 | 1.5 | 1.7725 | 49.6 | 0.552 |
| 24 | 86.173 | (Variable) | | | |
| 25 | 648.219 | 6.25 | 1.62041 | 60.3 | 0.5427 |
| 26 | -149.541 | 0.15 | | | |
| 27 | 124.119 | 11.11 | 1.48749 | 70.2 | 0.53 |
| 28 | -83.769 | 0.09 | | | |
| 29 | -89.892 | 1.6 | 1.80518 | 25.4 | 0.6161 |
| 30 | -238.597 | (Variable) | | | |
| 31 | 85.859 | 1.6 | 1.80518 | 25.4 | 0.6161 |
| 32 | 56.727 | 9.3 | 1.48749 | 70.2 | 0.53 |
| 33 | 372.381 | 0.15 | | | |
| 34* | 89.487 | 7.65 | 1.62041 | 60.3 | 0.5427 |
| 35 | -557.289 | (Variable) | | | |
| 36(stop) | ∞ | 2.98 | | | |
| 37 | -68.395 | 1.4 | 1.788 | 47.4 | 0.5559 |
| 38 | 23.177 | 7.31 | 1.85478 | 24.8 | 0.6122 |
| 39 | -51.895 | 1.4 | 1.788 | 47.4 | 0.5559 |
| 40 | 74.641 | 5.93 | | | |
| 41 | -40.959 | 19.74 | 1.7725 | 49.6 | 0.552 |
| 42 | 104.155 | 8.4 | | | |
| 43 | -228.581 | 1.5 | 1.53775 | 74.7 | 0.5392 |
| 44 | 95.747 | 8.29 | 1.64 | 60.1 | 0.537 |
| 45 | -40.078 | 0.2 | | | |
| 46 | 450.134 | 1.5 | 2.001 | 29.1 | 0.5997 |
| 47 | 43.856 | 7.73 | 1.51633 | 64.1 | 0.5353 |
| 48 | -141.039 | 0.2 | | | |
| 49 | 82.549 | 7 | 1.497 | 81.5 | 0.5375 |
| 50 | -77.885 | 0.2 | | | |
| 51 | 45.975 | 8.95 | 1.43875 | 94.9 | 0.534 |
| 52 | -67.784 | 1 | | | |
| 53 | -105.642 | 1.5 | 2.00069 | 25.5 | 0.6133 |
| 54 | 85.576 | 5 | 1.85896 | 22.7 | 0.6284 |
| 55 | -136.297 | 8 | | | |
| 56 | ∞ | 33 | 1.61E+00 | 46.4 | 0.5664 |
| 57 | ∞ | 13.2 | 1.51633 | 64.2 | 0.5352 |
| 58 | ∞ | 10.00 | | | |
| Image plane | ∞ | | | | |

Aspheric surface data

18th surface

K = 0.00000e+000
A4 = 2.66275e-007
A6 = 1.16139e-010
A8 = -6.58888e-014
A10 = -4.28173e-017
A12 = 1.06894e-020

34th surface

K = 0.00000e+000
A4 = -3.12379e-008
A6 = -8.29131e-010
A8 = 1.77347e-012
A10 = -1.73507e-015
A12 = 6.22006e-019

Various data
Zoom ratio 30.00

| | Wide angle | Middle | Telephoto |
|---|---|---|---|
| Focal length | 6.50 | 35.00 | 195.00 |
| F-number | 1.49 | 1.50 | 2.20 |
| Angle of view (deg) | 40.24 | 8.93 | 1.62 |
| Image height | 5.50 | 5.50 | 5.50 |
| Total lens length | 625.00 | 625.00 | 625.00 |
| BF | 10.00 | 10.00 | 10.00 |
| d17 | 3.00 | 94.38 | 217.60 |
| d24 | 211.92 | 56.10 | 6.15 |
| d30 | 9.83 | 42.89 | 1.00 |
| d35 | 1.00 | 32.38 | 1.00 |

-continued

[Unit mm]

Zoom lens unit data

| Unit | Start surface | Focal length |
|---|---|---|
| 1 | 1 | 181.44 |
| 2 | 18 | -38.98 |
| 3 | 25 | 108.58 |
| 4 | 31 | 97.16 |
| 5 | 36 | 30.15 |

Numerical Embodiment 9

[Unit mm]

Surface data

| Surface number i | ri | di | ndi | vdi | θgFi |
|---|---|---|---|---|---|
| 1 | 1108.609 | 4.7 | 1.7725 | 49.6 | 0.552 |
| 2 | 180.566 | 36.35 | | | |
| 3 | -290.377 | 4.5 | 1.55 | 56.8 | 0.5581 |
| 4 | 316.732 | 0.15 | | | |
| 5 | 274.011 | 9.28 | 1.71736 | 29.5 | 0.5985 |
| 6 | 592.672 | 9.33 | | | |
| 7 | -2624.035 | 14 | 1.497 | 81.5 | 0.5375 |
| 8 | -258.689 | 0.2 | | | |
| 9 | 2928.996 | 4.4 | 1.80518 | 25.4 | 0.61 |
| 10 | 308.117 | 15 | 1.497 | 81.5 | 0.5375 |
| 11 | -565.489 | 42.16 | | | |
| 12 | 473.488 | 17.08 | 1.497 | 81.5 | 0.5375 |
| 13 | -296.176 | 0.15 | | | |
| 14 | 328.8 | 12.43 | 1.43875 | 94.9 | 0.534 |
| 15 | -924.096 | 0.15 | | | |
| 16 | 310.978 | 8.64 | 1.59522 | 67.7 | 0.5442 |
| 17 | 1546.906 | (Variable) | | | |
| 18* | 557.32 | 1.5 | 1.7725 | 49.6 | 0.552 |
| 19 | 44.753 | (Variable) | | | |
| 20 | 200.951 | 1.5 | 1.72916 | 54.7 | 0.5444 |
| 21 | 36.419 | 10.46 | 1.84666 | 23.8 | 0.625 |
| 22 | 150.211 | 6.11 | | | |
| 23 | -88.791 | 1.5 | 1.7725 | 49.6 | 0.552 |
| 24 | -5588.22 | (Variable) | | | |
| 25 | 5406.3 | 6.25 | 1.62041 | 60.3 | 0.5427 |
| 26 | -128.657 | 0.15 | | | |
| 27 | 155.385 | 11.11 | 1.48749 | 70.2 | 0.53 |
| 28 | -76.102 | 0.09 | | | |
| 29 | -81.121 | 1.6 | 1.80518 | 25.4 | 0.6161 |
| 30 | -191.018 | (Variable) | | | |
| 31 | 134.313 | 1.6 | 1.80518 | 25.4 | 0.6161 |
| 32 | 70.723 | 9.3 | 1.48749 | 70.2 | 0.53 |
| 33 | -576.656 | 0.15 | | | |
| 34* | 90.119 | 7.65 | 1.62041 | 60.3 | 0.5427 |
| 35 | -557.289 | (Variable) | | | |
| 36(stop) | ∞ | 2.98 | | | |
| 37 | -110.163 | 1.4 | 1.788 | 47.4 | 0.5559 |
| 38 | 17.712 | 7.31 | 1.85478 | 24.8 | 0.6122 |
| 39 | 222.698 | 1.4 | 1.788 | 47.4 | 0.5559 |
| 40 | 108.54 | 5.93 | | | |
| 41 | -32.406 | 19.74 | 1.7725 | 49.6 | 0.552 |
| 42 | 110.04 | 8.4 | | | |
| 43 | -63.052 | 1.5 | 1.53775 | 74.7 | 0.5392 |
| 44 | 51005.999 | 6.8 | 1.64 | 60.1 | 0.537 |
| 45 | -35.174 | 3 | | | |
| 46 | 262.676 | 1.5 | 2.001 | 29.1 | 0.5997 |
| 47 | 43.269 | 8.21 | 1.51633 | 64.1 | 0.5353 |
| 48 | -110.818 | 0.2 | | | |
| 49 | 97.578 | 7 | 1.497 | 81.5 | 0.5375 |
| 50 | -70.108 | 0.2 | | | |
| 51 | 47.461 | 9.23 | 1.43875 | 94.9 | 0.534 |
| 52 | -62.8 | 1 | | | |
| 53 | -124.668 | 1.5 | 2.00069 | 25.5 | 0.6133 |
| 54 | 76.247 | 5 | 1.85896 | 22.7 | 0.6284 |
| 55 | -168.604 | 8 | | | |

-continued

[Unit mm]

| | | | | |
|---|---|---|---|---|
| 56 | ∞ | 33 | 1.60859 46.4 | 0.5664 |
| 57 | ∞ | 13.2 | 1.51633 64.2 | 0.5352 |
| 58 | ∞ | 10.0 | | |
| Image plane | ∞ | | | |

Aspheric surface data

18th surface

K = 0.00000e+000
A4 = 5.98074e−007
A6 = −2.72683e−010
A8 = 2.48726e−013
A10 = −1.96454e−016
A12 = 3.48792e−020

34th surface

K = 0.00000e+000
A4 = −5.07951e−008
A6 = −2.60772e−010
A8 = 6.60695e−013
A10 = −6.97143e−016
A12 = 2.61525e−019

Various data
Zoom ratio 32.00

| | Wide angle | Middle | Telephoto |
|---|---|---|---|
| Focal length | 6.50 | 35.00 | 208.00 |
| F-number | 1.49 | 1.50 | 2.35 |
| Angle of view (deg) | 40.24 | 8.93 | 1.51 |
| Image height | 5.50 | 5.50 | 5.50 |
| Total lens length | 625.00 | 625.00 | 625.00 |
| BF | 10.00 | 10.00 | 10.00 |
| d17 | 3.00 | 89.95 | 211.00 |
| d19 | 12.47 | 11.13 | 9.27 |
| d24 | 210.92 | 52.56 | 3.00 |
| d30 | 1.00 | 43.40 | 6.74 |
| d35 | 3.62 | 33.98 | 1.00 |

Zoom lens unit data

| Unit | Start surface | Focal length |
|---|---|---|
| 1 | 1 | 180.48 |
| 2 | 18 | −63.07 |
| 3 | 20 | −149.65 |
| 4 | 25 | 114.80 |
| 5 | 31 | 98.16 |
| 6 | 36 | 31.20 |

Numerical Embodiment 10

[Unit mm]

Surface data

| Surface number i | ri | di | ndi | vdi | θgFi |
|---|---|---|---|---|---|
| 1 | 76.719 | 2.5 | 1.7725 | 49.6 | 0.552 |
| 2 | 34.781 | 21.07 | | | |
| 3 | 378.999 | 1.8 | 1.64 | 66.1 | 0.5581 |
| 4 | 47.327 | 17.18 | | | |
| 5 | −70.099 | 1.7 | 1.95375 | 32.3 | 0.5898 |
| 6 | −1502.986 | 0.2 | | | |
| 7 | 178.297 | 11.7 | 1.78472 | 25.7 | 0.6161 |
| 8 | −74.714 | 0.64 | | | |
| 9 | −109.628 | 4.11 | 1.59522 | 67.7 | 0.5442 |
| 10* | −71.931 | 7.34 | | | |
| 11 | −132.783 | 11.62 | 1.43875 | 94.9 | 0.534 |
| 12 | −42.931 | 1.65 | 1.85478 | 24.8 | 0.6122 |
| 13 | −60.115 | 0.17 | | | |

-continued

[Unit mm]

| | | | | |
|---|---|---|---|---|
| 14 | 99.052 | 1.65 | 1.83403 37.2 | 0.5775 |
| 15 | 56.359 | 19.29 | 1.43875 94.9 | 0.534 |
| 16 | −62.936 | 0.2 | | |
| 17 | 67.397 | 6.21 | 1.43387 95.1 | 0.5373 |
| 18 | 310.675 | 0.2 | | |
| 19 | 42.676 | 4.78 | 1.43875 94.9 | 0.534 |
| 20 | 64.238 | (Variable) | | |
| 21 | 31.384 | 0.8 | 1.95375 32.3 | 0.5898 |
| 22 | 14.079 | 3.33 | | |
| 23 | 62.474 | 0.8 | 1.883 40.8 | 0.5667 |
| 24 | 24.767 | 2.92 | | |
| 25 | −154.448 | 3.88 | 1.80518 25.4 | 0.6161 |
| 26 | −12.509 | 0.85 | 1.883 40.8 | 0.5667 |
| 27 | 199.481 | 2.33 | | |
| 28 | 30.819 | 2.04 | 1.64769 33.8 | 0.5884 |
| 29 | 209.954 | (Variable) | | |
| 30 | −23.301 | 0.8 | 1.734 51.5 | 0.5484 |
| 31 | 59.27 | 1.81 | 1.8081 22.8 | 0.637 |
| 32 | −118.45 | (Variable) | | |
| 33(stop) | ∞ | 1.38 | | |
| 34 | −708.166 | 2.61 | 1.67003 47.2 | 0.5627 |
| 35 | −54.555 | 0.16 | | |
| 36 | 776.089 | 2.07 | 1.62041 60.3 | 0.5427 |
| 37 | −114.524 | 0.16 | | |
| 38 | 147.475 | 6.3 | 1.51633 64.1 | 0.5353 |
| 39 | −29.183 | 1 | 1.883 40.8 | 0.5667 |
| 40 | −60.118 | 28 | | |
| 41 | 53.511 | 6.1 | 1.56732 42.8 | 0.5731 |
| 42 | −65.935 | 2.03 | | |
| 43 | −632.734 | 1 | 1.883 40.8 | 0.5667 |
| 44 | 19.697 | 10.9 | 1.48749 70.2 | 0.53 |
| 45 | −24.118 | 0.36 | | |
| 46 | −26.173 | 4.55 | 1.497 81.5 | 0.5375 |
| 47 | −17.642 | 1 | 1.883 40.8 | 0.5667 |
| 48 | −45.667 | 0.29 | | |
| 49 | 60.374 | 9.1 | 1.497 81.5 | 0.5375 |
| 50 | −30.966 | 4.16 | | |
| 51 | ∞ | 33 | 1.60859 46.4 | 0.5664 |
| 52 | ∞ | 13.2 | 1.51633 64.1 | 0.5353 |
| 53 | ∞ | 4.96 | | |
| Image plane | ∞ | | | |

Aspheric surface data
10th surface

K = −9.61855e−001
A4 = −1.31875e−007
A6 = −8.08856e−011
A8 = 1.02233e−014
A10 = −8.06400e−018
A12 = −4.86400e−020
A3 = 1.44200e−007
A5 = 1.52600e−009
A7 = 1.69200e−012
A9 = 7.68500e−017
A11 = 6.95900e−019

Various data
Zoom ratio 14.47

| | Wide angle | Middle | Telephoto |
|---|---|---|---|
| Focal length | 4.49 | 12.90 | 65.00 |
| F-number | 1.90 | 1.90 | 2.80 |
| Angle of view (deg) | 50.76 | 23.09 | 4.84 |
| Image height | 5.50 | 5.50 | 5.50 |
| Total lens length | 319.66 | 320.24 | 320.63 |
| BF | 4.96 | 4.96 | 4.96 |
| d20 | 0.66 | 27.71 | 45.99 |
| d29 | 38.70 | 9.58 | 7.91 |
| d32 | 14.37 | 17.03 | 0.81 |

-continued

| [Unit mm] | | |
|---|---|---|
| Zoom lens unit data | | |
| Unit | Start surface | Focal length |
| 1 | 1 | 29.79 |
| 2 | 21 | −18.79 |
| 3 | 30 | −43.28 |
| 4 | 33 | 56.01 |

TABLE 1

| | | Embodiment | | Referential | Embodiment | | | |
|---|---|---|---|---|---|---|---|---|
| | | 1 | 2 | Example | 4 | | 5 | |
| | | | | Lens number | | | | |
| Conditional Expression | | G2 | G1 | G2 (Reference) | G2 | G1 | G2 | G3 |
| (1) | θ | 0.0110 | 0.0063 | 0.0017 | 0.0123 | 0.0474 | 0.0224 | 0.0132 |
| (2) | θgF | 0.5581 | 0.5551 | 0.5451 | 0.5451 | 0.5897 | 0.5784 | 0.5581 |
| (3) | νd | 61.95 | 60.47 | 65.49 | 80.19 | 66.61 | 54.96 | 64.02 |
| (4) | \|fn\|/f1 | 3.107 | 3.450 | 2.319 | 3.432 | 3.615 | 2.648 | 3.332 |
| (5) | \|fn/f1a\| | 1.804 | 2.715 | 1.825 | 2.034 | 2.491 | 1.902 | 2.394 |
| (6) | f1/fW | 6.680 | 6.630 | | 6.417 | 6.710 | 9.552 | |
| (7) | ft/f1 | 2.166 | 2.181 | | 2.253 | 2.157 | 2.108 | |
| (8) | f1/\|f2\| | 1.607 | 1.550 | | 1.583 | 1.544 | | |
| (8)' | f1/\|f23w\| | | | | | | 1.623 | |
| (9) | D1x/D1 | 0.7767 | 0.9778 | 0.7742 | 0.7684 | 0.9781 | 0.7647 | 0.5917 |
| (10) | Dsx/Ds | 0.8644 | 0.9865 | 0.8629 | 0.8594 | 0.9867 | 0.8559 | 0.7499 |
| (11) | (R1 − R2)/(R1 + R2) | 0.760 | 0.377 | 0.708 | 0.989 | 0.352 | 0.783 | −0.928 |
| (12) | α | 1.200 | 1.300 | 1.000 | 1.250 | 1.400 | 1.200 | 1.350 |
| (13) | nd | 1.600 | 1.594 | 1.650 | 1.481 | 1.610 | 1.650 | 1.620 |
| (14) | M3/M2 | | | | | | 0.993 | |
| | fn | −93.241 | −102.821 | −69.119 | −99.014 | −108.938 | −81.627 | −102.732 |
| | fw | 4.492 | 4.495 | 4.495 | 4.491 | 4.492 | | |
| | ft | 65.000 | 65.000 | 65.000 | 65.000 | 65.000 | | |
| | f1 | 30.012 | 29.803 | 28.846 | 30.137 | 30.828 | | |
| | f1a | −51.684 | −37.876 | −48.681 | −43.727 | −42.908 | | |
| | f2 | −18.673 | −19.224 | −18.226 | −19.521 | | | |
| | f23w | | | | | | −18.991 | |
| | D1x | 88.669 | 110.264 | 87.304 | 87.405 | 111.555 | 87.201 | 67.468 |
| | D1 | 114.155 | 112.764 | 113.752 | 114.055 | 114.030 | | |
| | Dsx | 162.429 | 183.216 | 160.255 | 161.045 | 185.007 | 159.334 | 139.602 |
| | Ds | 187.915 | 185.716 | 187.392 | 187.507 | 186.163 | | |
| | R1 | 354.17 | 72.30 | 217.24 | 8268.10 | 70.34 | 383.13 | −61.28 |
| | R2 | 48.22 | 32.68 | 37.11 | 47.36 | 33.71 | 46.52 | −1632.22 |
| | M2 | | | | | | 46.898 | |
| | M3 | | | | | | 46.551 | |

| | | Embodiment | | | | |
|---|---|---|---|---|---|---|
| | | 6 | 7 | 8 | 9 | 10 |
| Conditional Expression | | | | Lens number | | |
| | | G2 | G3 | G2 | G2 | G2 | G2 |
| (1) | θ | 0.0132 | 0.0224 | 0.0162 | 0.0047 | 0.0047 | 0.0153 |
| (2) | θgF | 0.5581 | 0.5784 | 0.5491 | 0.5581 | 0.5581 | 0.5581 |
| (3) | νd | 64.02 | 54.96 | 80.00 | 56.79 | 56.79 | 66.08 |
| (4) | \|fn\|/f1 | 2.700 | 3.200 | 4.797 | 1.972 | 1.522 | 2.799 |
| (5) | \|fn/f1a\| | 1.981 | 2.347 | 2.948 | 2.194 | 1680 | 1.656 |
| (6) | f1/fW | 9.320 | | 2.605 | 27.914 | 27.766 | 6.633 |
| (7) | ft/f1 | | 2.115 | 3.071 | 1.075 | 1.152 | 2.182 |
| (8) | f1/\|f2\| | | | 2.423 | 4.654 | | 1.585 |
| (8)' | f1/\|f23w\| | 1.598 | | | | 4.716 | |
| (9) | D1x/D1 | 0.7612 | 0.5880 | 0.7468 | 0.7472 | 0.7449 | 0.7775 |
| (10) | Dsx/Ds | 0.8554 | 0.7491 | 0.8449 | 0.9032 | 0.9028 | 0.8645 |
| (11) | (R1 − R2)/(R1 + R2) | 0.795 | −0.930 | −3.360 | −3.804 | −23.036 | 0.778 |
| (12) | α | 1.350 | 1.200 | 1.100 | 1.400 | 1.400 | 1.200 |
| (13) | nd | 1.620 | 1.650 | 1.481 | 1.550 | 1.550 | 1.640 |

TABLE 1-continued

| | | | | | | | |
|---|---|---|---|---|---|---|---|
| (14) | M3/M2 | 1.005 | | | | 0.985 | |
| | fn | −82.973 | −98.316 | −249.901 | −357.751 | −274.715 | −83.378 |
| | fw | | 4.495 | 20.000 | 6.500 | 6.500 | 4.491 |
| | ft | | 65.000 | 160.000 | 195.001 | 208.000 | 65.000 |
| | f1 | | 30.728 | 52.100 | 181.440 | 180.480 | 29.792 |
| | f1a | | −41.892 | −84.773 | −163.063 | −163.516 | −50.356 |
| | f2 | | | −21.500 | −38.983 | | −18.794 |
| | f23w | | −19.234 | | | −38.274 | |
| | D1x | 86.865 | 67.106 | 86.295 | 134.651 | 132.968 | 88.650 |
| | D1 | | 114.122 | 115.561 | 180.197 | 178.513 | 114.024 |
| | Dsx | 159.028 | 139.270 | 159.447 | 425.022 | 422.953 | 161.946 |
| | Ds | | 185.916 | 188.712 | 470.567 | 468.498 | 187.320 |
| | R1 | 398.88 | −61.57 | −185.60 | −312.20 | −290.38 | 379.00 |
| | R2 | 45.49 | −1703.31 | 342.87 | 534.88 | 316.73 | 47.33 |
| | M2 | | 46.674 | | | 207.999 | |
| | M3 | | 46.905 | | | 204.799 | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133623, filed Jul. 13, 2018, which is hereby incorporated by reference herein in its entirety.

What is claimed is:

1. A zoom lens comprising in order from an object side to an image side: a first lens unit having a positive refractive power; a second lens unit having a negative refractive power and configured to move for zooming; and at least one lens unit configured to move for zooming,
wherein a distance between each pair of the lens units adjacent to each other is changed for zooming,
wherein the first lens unit includes a negative lens, and
wherein the negative lens is made of a material having an Abbe number vd and a partial dispersion ratio θgF that satisfy conditional expressions $$\theta gF-(-1.665\times10^{-7}\cdot vd^3+5.213\times10^{-5}\cdot vd^2-5.656\times10^{-3}\cdot vd+0.737)>0,$$

$$0.5490<\theta gF, \text{ and}$$

$$50.0<vd<85.0,$$

where the Abbe number vd and the partial dispersion ratio θgF are expressed by $$vd=(Nd-1)/(NF-NC), \text{ and}$$

$$\theta gF=(Ng-NF)/(NF-NC),$$

where Ng, NF, NC, and Nd are refractive indices for g-line (435.8 nm), F-line (486.1 nm), C-line (656.3 nm), and d-line (587.6 nm), respectively.

2. The zoom lens according to claim 1, wherein a conditional expression $$1.00<|fn|/f1\leq 7.20$$

is satisfied where f1 is a focal length of the first lens unit and fn is a focal length of the negative lens.

3. The zoom lens according to claim 1, wherein the first lens unit includes, in order from the object side to the image side, a first lens subunit having a negative refractive power and configured not to move for focusing, a second lens subunit having a positive refractive power and configured to move for focusing, and a third lens subunit having a positive refractive power and configured not to move for focusing.

4. The zoom lens according to claim 3, wherein a conditional expression $$1.00<|fn/f1a|\leq 5.20$$

is satisfied where fn is a focal length of the negative lens and f1a is a focal length of the first lens subunit.

5. The zoom lens according to claim 1, wherein a conditional expression $$1.00<f1/fW<60.00$$

is satisfied where f1 is a focal length of the first lens unit and fW is a focal length of the zoom lens at a wide-angle end.

6. The zoom lens according to claim 1, wherein a conditional expression $$1.00<fT/f1<4.00$$

is satisfied where f1 is a focal length of the first lens unit and fT is a focal length of the zoom lens at a telephoto end.

7. The zoom lens according to claim 1, wherein a conditional expression $$1.00<f1/|f2|<7.60$$

is satisfied where f1 is a focal length of the first lens unit and f2 is a focal length of the second lens unit.

8. The zoom lens according to claim 1, wherein a conditional expression $$0.500\leq D1x/D1<1.000$$

is satisfied where D1x is a distance on an optical axis between a vertex of a surface of the negative lens on an image side and a vertex of a surface of the first lens unit that is the closest to the image side at infinity focus and D1 is a distance on the optical axis between a vertex of a surface of the first lens unit that is the closest to the object side and the vertex of the surface of the first lens unit that is the closest to the image side at infinity focus.

9. The zoom lens according to claim 1, wherein a conditional expression $$0.700\leq Dsx/Ds<1.000$$

is satisfied where Dsx is a distance on an optical axis between a vertex of a surface of the negative lens on the image side and a stop at infinity focus and the wide-angle end and Ds is a distance on the optical axis between a vertex of a surface of the first lens unit that is the closest to the object side and the stop at infinity focus and the wide-angle end.

10. The zoom lens according to claim 1, wherein a conditional expression $$-50.00<(R1-R2)/(R1+R2)<50.00$$

is satisfied where R1 is a radius of curvature of a surface of the negative lens on the object side and R2 is a radius of curvature of a surface of the negative lens on the image side.

11. The zoom lens according to claim 1, wherein a conditional expression $$0.50 < \alpha < 5.00$$

is satisfied where $\alpha$ is an average linear expansion coefficient ($10^{-5}$/K) of a material of the negative lens over temperature of −30° C. to 70° C.

12. The zoom lens according to claim 1, wherein a conditional expression $$1.450 \le nd \le 1.750$$

is satisfied where nd is a refractive index of a material of the negative lens.

13. An image pickup apparatus comprising:
a zoom lens comprising in order from an object side to an image side: a first lens unit having a positive refractive power; a second lens unit having a negative refractive power and configured to move for zooming; and at least one lens unit configured to move for zooming,
wherein a distance between each pair of the lens units adjacent to each other is changed for zooming,
wherein the first lens unit includes a negative lens, and
wherein the negative lens is made of a material having an Abbe number vd and a partial dispersion ratio θgF that satisfy conditional expressions $$\theta gF - (-1.665 \times 10^{-7} \cdot vd^3 + 5.213 \times 10^{-5} \cdot vd^2 - 5.656 \times 10^{-3} \cdot vd + 0.737) > 0,$$

$$0.5490 < \theta gF, \text{ and}$$

$$50.0 < vd < 85.0,$$

where the Abbe number vd and the partial dispersion ratio θgF are expressed by $$vd = (Nd-1)/(NF-NC), \text{ and}$$

$$\theta gF = (Ng-NF)/(NF-NC),$$

where Ng, NF, NC, and Nd are refractive indices for g-line (435.8 nm), F-line (486.1 nm), C-line (656.3 nm), and d-line (587.6 nm), respectively, and
an image pickup element configured to receive an image formed by the zoom lens.

* * * * *